US006804606B2

(12) United States Patent  
Jones

(10) Patent No.: US 6,804,606 B2
(45) Date of Patent: *Oct. 12, 2004

(54) NOTIFICATION SYSTEMS AND METHODS WITH USER-DEFINABLE NOTIFICATIONS BASED UPON VEHICLE PROXIMITIES

(75) Inventor: M. Kelly Jones, Delray Beach, FL (US)

(73) Assignee: ArrivalStar, Inc., Delray Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/435,780

(22) Filed: May 12, 2003

(65) Prior Publication Data

US 2003/0233190 A1 Dec. 18, 2003

Related U.S. Application Data

(60) Division of application No. 08/852,119, filed on May 6, 1997, which is a continuation-in-part of application No. 08/434,049, filed on May 2, 1995, now Pat. No. 5,623,260, and a continuation-in-part of application No. 08/432,898, filed on May 2, 1995, now Pat. No. 5,657,010, and a continuation-in-part of application No. 08/432,666, filed on May 2, 1995, now Pat. No. 5,668,543, and a continuation-in-part of application No. 08/407,319, filed on Mar. 20, 1995, now abandoned, which is a continuation-in-part of application No. 08/063,533, filed on May 18, 1993, now Pat. No. 5,400,020.
(60) Provisional application No. 60/039,925, filed on Mar. 7, 1997.

(51) Int. Cl.[7] .............................................. G08G 1/123

(52) U.S. Cl. ...................... 701/213; 701/202; 701/207; 340/989; 340/994; 342/357.17

(58) Field of Search ............................... 701/200, 201, 701/202, 204, 207, 213; 340/988, 989, 994, 996; 342/357.01, 357.06, 357.07, 357.08, 357.09, 357.1, 357.17

(56) References Cited

U.S. PATENT DOCUMENTS

| 3,568,161 A | 3/1971 | Knickel ....................... 340/994 |
| 3,644,883 A | 2/1972 | Borman et al. ................ 340/23 |
| 3,845,289 A | 10/1974 | French ..................... 235/151.2 |
| 3,886,515 A | 5/1975 | Cottin et al. ................. 340/994 |
| 3,934,125 A | 1/1976 | Macano .................... 235/150.2 |
| 4,220,946 A | 9/1980 | Henriot ....................... 340/23 |
| 4,297,672 A | 10/1981 | Fruchey et al. ............... 340/23 |
| 4,325,057 A | 4/1982 | Bishop ....................... 340/539 |
| 4,350,969 A | 9/1982 | Greer ......................... 340/23 |
| 4,525,601 A | 6/1985 | Barnich et al. ......... 379/7 MM |
| 4,585,904 A | 4/1986 | Mincone et al. ........ 179/7.1 TP |

(List continued on next page.)

FOREIGN PATENT DOCUMENTS

| EP | 0219859 A2 | 4/1987 | ............ G08G/1/12 |
| EP | 0805427 A1 | 11/1997 | .......... G08G/1/123 |
| FR | 2 559 930 | 8/1985 | ............ G08G/1/12 |

(List continued on next page.)

OTHER PUBLICATIONS

"Public Transportation Information and Management Ssytems", IEE Colloquium, Computing and Control Division, May 25, 1993, pp. 9/1–9/4, 12/1–12/2, 7/1–7/3.

(List continued on next page.)

Primary Examiner—Thomas G. Black
Assistant Examiner—Eric M. Gibson
(74) Attorney, Agent, or Firm—Thomas, Kayden, Horstemeyer & Risley, LLP

(57) ABSTRACT

Methods and systems are disclosed for permitting a user to define a plurality of different predetermined proximities corresponding respectively with a plurality of different mobile vehicles in relation to a location, for monitoring travel data associated with the plurality of mobile vehicles, and for notifying one or more communications devices associated with the user based upon the different predetermined proximities associated with the vehicles.

32 Claims, 45 Drawing Sheets

U.S. PATENT DOCUMENTS

| | | | |
|---|---|---|---|
| 4,713,661 A | 12/1987 | Boone et al. | 340/994 |
| 4,791,571 A | 12/1988 | Takahashi et al. | 364/436 |
| 4,799,162 A | 1/1989 | Shinkawa et al. | 364/436 |
| 4,804,837 A | 2/1989 | Farley | 250/251 |
| 4,812,843 A | 3/1989 | Champion, III et al. | 340/905 |
| 4,813,065 A | 3/1989 | Segala | 379/112 |
| 4,857,925 A | 8/1989 | Brubaker | 340/994 |
| 4,894,649 A | 1/1990 | Davis | 340/825.44 |
| 4,956,777 A | 9/1990 | Cearley et al. | 364/424.02 |
| 5,003,584 A | 3/1991 | Benyacar et al. | 379/119 |
| 5,006,847 A | 4/1991 | Rush et al. | 340/994 |
| 5,014,206 A | 5/1991 | Scribner et al. | 364/449 |
| 5,021,780 A | 6/1991 | Fabiano et al. | 340/994 |
| 5,048,079 A | 9/1991 | Harrington et al. | 379/112 |
| 5,068,656 A | 11/1991 | Sutherland | 340/989 |
| 5,097,429 A | 3/1992 | Wood et al. | 364/569 |
| 5,103,475 A | 4/1992 | Shuen | 379/115 |
| 5,113,185 A | 5/1992 | Ichikawa | 340/995 |
| 5,121,326 A | 6/1992 | Moroto et al. | 364/449 |
| 5,122,959 A | 6/1992 | Nathanson et al. | 364/436 |
| 5,131,020 A | 7/1992 | Liebesny et al. | 379/59 |
| 5,144,301 A | 9/1992 | Jackson et al. | 340/994 |
| 5,146,491 A | 9/1992 | Silver et al. | 379/114 |
| 5,155,689 A | 10/1992 | Wortham | 364/460 |
| 5,168,451 A | 12/1992 | Bolger | 364/436 |
| 5,179,584 A | 1/1993 | Tsumura | 379/114 |
| 5,218,629 A | 6/1993 | Dumond, Jr. et al. | 379/59 |
| 5,218,632 A | 6/1993 | Cool | 379/126 |
| 5,223,844 A | 6/1993 | Mansell et al. | 342/357 |
| 5,243,529 A | 9/1993 | Kashiwazaki | 364/449 |
| 5,271,484 A | 12/1993 | Bahjat et al. | 187/29.1 |
| 5,299,132 A | 3/1994 | Wortham | 364/460 |
| 5,323,456 A | 6/1994 | Oprea | 379/375 |
| 5,351,194 A | 9/1994 | Ross et al. | 364/449 |
| 5,361,296 A | 11/1994 | Reyes et al. | 379/96 |
| 5,381,338 A | 1/1995 | Wysocki et al. | 364/449 |
| 5,381,467 A | 1/1995 | Rosinski et al. | 379/121 |
| 5,394,332 A | 2/1995 | Kuwahara et al. | 364/449 |
| 5,398,190 A | 3/1995 | Wortham | 364/460 |
| 5,400,020 A | 3/1995 | Jones | 340/994 |
| 5,420,794 A | 5/1995 | James | 364/436 |
| 5,428,546 A | 6/1995 | Shah et al. | 364/449 |
| 5,432,841 A | 7/1995 | Rimer | 379/59 |
| 5,440,489 A | 8/1995 | Newman | 364/426.05 |
| 5,444,444 A | 8/1995 | Ross | 340/994 |
| 5,446,678 A | 8/1995 | Saltzstein et al. | 364/514 |
| 5,448,479 A | 9/1995 | Kemner et al. | 365/424.02 |
| 5,461,374 A | 10/1995 | Lewiner et al. | 340/994 |
| 5,483,234 A | 1/1996 | Correel et al. | 340/994 |
| 5,483,454 A | 1/1996 | Lewiner et al. | 364/449 |
| 5,493,295 A | 2/1996 | Lewiner et al. | 340/994 |
| 5,493,694 A | 2/1996 | Vlcek et al. | 455/53.1 |
| 5,506,893 A | 4/1996 | Buscher et al. | 379/114 |
| 5,513,111 A | 4/1996 | Wortham | 364/460 |
| 5,515,421 A | 5/1996 | Sikand et al. | 379/67 |
| 5,519,621 A | 5/1996 | Wortham | 364/460 |
| 5,526,401 A | 6/1996 | Roach, Jr. et al. | 379/59 |
| 5,539,810 A | 7/1996 | Kennedy, III et al. | 379/59 |
| 5,544,225 A | 8/1996 | Kennedy, III et al. | 379/59 |
| 5,546,444 A | 8/1996 | Roach, Jr. et al. | 379/59 |
| 5,552,795 A | 9/1996 | Tayloe et al. | 342/357 |
| 5,559,871 A | 9/1996 | Smith | 379/115 |
| 5,570,100 A | 10/1996 | Grube et al. | 364/446 |
| 5,577,101 A | 11/1996 | Bohm | 379/58 |
| 5,579,376 A | 11/1996 | Kennedy, III et al. | 379/60 |
| 5,587,715 A | 12/1996 | Lewis | 342/357 |
| 5,594,425 A * | 1/1997 | Ladner et al. | 340/825.49 |
| 5,594,650 A | 1/1997 | Shah et al. | 364/449.1 |
| 5,594,787 A | 1/1997 | Ohshima et al. | 379/114 |
| 5,602,739 A | 2/1997 | Haagenstad et al. | 364/436 |
| 5,623,260 A | 4/1997 | Jones | 340/994 |
| 5,648,770 A | 7/1997 | Ross | 340/994 |
| 5,652,707 A | 7/1997 | Wortham | 364/460 |
| 5,657,010 A | 8/1997 | Jones | 340/994 |
| 5,668,543 A | 9/1997 | Jones | 340/994 |
| 5,673,305 A | 9/1997 | Ross | 379/58 |
| 5,680,119 A | 10/1997 | Magliari et al. | 340/904 |
| 5,694,322 A | 12/1997 | Westerlage et al. | 364/464 |
| 5,694,459 A | 12/1997 | Backaus et al. | 379/427 |
| 5,699,275 A | 12/1997 | Beasley et al. | 364/514 R |
| 5,712,908 A | 1/1998 | Brinkman et al. | 379/119 |
| 5,715,307 A | 2/1998 | Zazzera | 379/265 |
| 5,719,771 A | 2/1998 | Buck et al. | 364/443 |
| 5,724,243 A | 3/1998 | Westerlage et al. | 364/446 |
| 5,724,584 A | 3/1998 | Peters et al. | 395/671 |
| 5,729,597 A | 3/1998 | Bhusri | 379/115 |
| 5,732,074 A | 3/1998 | Spaur et al. | 370/313 |
| 5,734,981 A | 3/1998 | Kennedy, III et al. | 455/445 |
| 5,736,940 A | 4/1998 | Burgener | 340/994 |
| 5,739,774 A | 4/1998 | Olandesi | 340/994 |
| 5,742,672 A | 4/1998 | Burk | 379/198 |
| 5,751,245 A | 5/1998 | Janky et al. | 342/357 |
| 5,760,742 A | 6/1998 | Branch et al. | 342/457 |
| 5,771,282 A | 6/1998 | Friedes | 379/121 |
| 5,771,455 A | 6/1998 | Kennedy, III et al. | 455/456 |
| 5,774,825 A | 6/1998 | Reynolds | 364/449.7 |
| 5,781,156 A | 7/1998 | Krasner | 342/357 |
| 5,784,443 A | 7/1998 | Chapman et al. | 379/119 |
| 5,793,853 A | 8/1998 | Sbisa | 379/120 |
| 5,796,365 A | 8/1998 | Lewis | 342/357 |
| 5,799,073 A | 8/1998 | Fleischer, III et al. | 379/113 |
| 5,799,263 A | 8/1998 | Culbertson | 701/117 |
| 5,805,680 A | 9/1998 | Penzias | 379/118 |
| 5,808,565 A | 9/1998 | Matta et al. | 340/994 |
| RE35,920 E | 10/1998 | Sorden et al. | 342/457 |
| 5,835,580 A | 11/1998 | Fraser | 379/115 |
| 5,841,847 A | 11/1998 | Graham et al. | 379/114 |
| 5,845,227 A * | 12/1998 | Peterson | 701/209 |
| 5,852,659 A | 12/1998 | Welter, Jr. | 379/116 |
| 5,864,610 A | 1/1999 | Ronen | 379/127 |
| 5,875,238 A | 2/1999 | Glitho et al. | 379/116 |
| 5,881,138 A | 3/1999 | Kearns et al. | 379/114 |
| 5,910,979 A | 6/1999 | Goel et al. | 379/120 |
| 5,912,954 A | 6/1999 | Whited et al. | 379/115 |
| 5,915,006 A | 6/1999 | Jagadish et al. | 379/127 |
| 5,920,613 A | 7/1999 | Alcott et al. | 379/114 |
| 5,922,040 A | 7/1999 | Prabhakaran | 701/117 |
| 5,937,044 A | 8/1999 | Kim | 379/121 |
| 5,943,320 A | 8/1999 | Weik et al. | 370/259 |
| 5,943,406 A | 8/1999 | Leta et al. | 379/120 |
| 5,943,657 A | 8/1999 | Freestone et al. | 705/400 |
| 5,945,919 A | 8/1999 | Trask | 340/825.491 |
| 5,946,379 A | 8/1999 | Bhusri | 379/115 |
| 5,950,174 A | 9/1999 | Brendzel | 705/34 |
| 5,955,974 A | 9/1999 | Togawa | 340/994 |
| 5,956,391 A | 9/1999 | Melen et al. | 379/114 |
| 5,982,864 A | 11/1999 | Jagadish et al. | 379/115 |
| 5,987,103 A | 11/1999 | Martino | 379/114 |
| 5,987,377 A | 11/1999 | Westerlage et al. | 701/204 |
| 5,991,377 A | 11/1999 | Malik | 379/114 |
| 5,991,380 A | 11/1999 | Bruno et al. | 379/115 |
| 5,991,381 A | 11/1999 | Bouanaka et al. | 379/115 |
| 5,995,602 A | 11/1999 | Johnson et al. | 379/116 |
| 6,006,159 A | 12/1999 | Schmier et al. | 701/200 |
| 6,094,149 A | 7/2000 | Wilson | 340/904 |
| 6,097,317 A | 8/2000 | Lewiner et al. | 340/994 |
| 6,111,538 A | 8/2000 | Schuchman et al. | 342/357 |
| 6,124,810 A | 9/2000 | Segal et al. | 340/994 |
| 6,134,501 A | 10/2000 | Oumi | 701/209 |
| 6,137,425 A | 10/2000 | Oster et al. | 340/994 |
| 6,144,301 A | 11/2000 | Frieden | 340/572.8 |

| | | | | |
|---|---|---|---|---|
| 6,178,378 B1 | 1/2001 | Leibold | | 701/202 |
| 6,184,802 B1 | 2/2001 | Lamb | | 340/994 |
| 6,191,708 B1 | 2/2001 | Davidson | | 340/994 |
| 6,222,462 B1 | 4/2001 | Hahn | | 340/904 |
| 6,240,362 B1 | 5/2001 | Gaspard, II | | 701/209 |
| 6,253,146 B1 | 6/2001 | Hanson et al. | | 701/202 |
| 6,253,148 B1 | 6/2001 | Decaux et al. | | 701/204 |
| 6,278,936 B1 | 8/2001 | Jones | | 701/201 |
| 6,313,760 B1 | 11/2001 | Jones | | 340/994 |
| 6,317,060 B1 | 11/2001 | Jones | | 340/994 |
| 6,360,101 B1 | 3/2002 | Irvin | | 445/456 |
| 6,363,254 B1 | 3/2002 | Jones et al. | | 455/456 |
| 6,363,323 B1 | 3/2002 | Jones | | 701/213 |
| 6,374,176 B1 * | 4/2002 | Schmier et al. | | 701/200 |
| 6,400,956 B1 | 6/2002 | Richton | | 455/456 |
| 6,411,891 B1 | 6/2002 | Jones | | 701/201 |
| 6,415,207 B1 | 7/2002 | Jones | | 701/1 |
| 6,486,801 B1 | 11/2002 | Jones | | 340/994 |
| 6,492,912 B1 | 12/2002 | Jones | | |
| 6,510,383 B1 | 1/2003 | Jones | | |
| 6,618,668 B1 | 9/2003 | Laird | | 701/200 |
| 2002/0016171 A1 | 2/2002 | Doganata et al. | | 455/456 |
| 2002/0069017 A1 | 6/2002 | Schmier et al. | | 701/213 |
| 2002/0070882 A1 | 6/2002 | Jones | | |
| 2002/0082770 A1 | 6/2002 | Jones | | |
| 2002/0099500 A1 | 7/2002 | Schmier et al. | | 701/200 |
| 2003/0098802 A1 | 5/2003 | Jones | | 340/994 |

FOREIGN PATENT DOCUMENTS

| | | | | |
|---|---|---|---|---|
| FR | 2674355 | | 9/1992 | |
| GB | WO 93/13510 A1 | | 7/1993 | G08G/1/123 |
| GB | 2277844 A | * | 11/1994 | G01S/5/00 |
| JP | 52066175 | | 6/1977 | |
| JP | 63288400 | | 11/1988 | G08G/1/12 |
| JP | 11034872 A | | 2/1999 | B61L/25/02 |
| WO | WO 90/01236 | | 2/1990 | H04M/1/54 |
| WO | WO 93/13503 | | 7/1993 | |
| WO | WO 94/02922 | | 2/1994 | G08G/1/123 |
| WO | WO 94/27264 | | 11/1994 | G08G/1/123 |
| WO | WO 96/04634 | | 2/1996 | G08G/5/22 |
| WO | WO 96/16386 | | 5/1996 | G08G/1/123 |
| WO | WO 98/07128 | | 2/1998 | |
| WO | WO 98/08206 | | 2/1998 | |
| WO | WO 98/14926 | | 4/1998 | G08G/1/123 |
| WO | WO 98/40837 | | 9/1998 | G06G/7/70 |

OTHER PUBLICATIONS

"Vehicle Location and Fleet Management Systems", IEE Colloquium, Computing and Control Division, Jun. 8, 1993.
The 3rd International Conference on Vehicle Navigation & Information Systems (VNIS) Norway, Sep. 2–4, 1992, pp. 312–315.
Preiss, George: Jenson, Lillian; "The Satref and GPS Information Projects", 1992 IEEE—3rd International Conference on Vehicle Navigation Information Systems, ppp. 648–655.
"Vehicle Navigation & Information Systems Conference Proceedings" (P–253), Society of Automotive Engineers, Inc., Oct. 1991, pp. 789–796.
"1992 Compendium of Technical Papers", Institute of Transportation Engineers—INRAD: A Deminostration of Two-Way Roadway to Vehicle Communication for use in Traffic Operations, Annual Meeting, Washington, D.C. pp. 214–218.
"Paving the Way for GPS in Vehicle Tracking", Showcase World, Dec. 1992.
"Advanced Vehicle Monitoring and Communication Systems for Bus Transit", Federal Transit Administration, Sep. 1991, Revised Mar. 1993.
Koncz, et al., "GIS–Based Transit Information Bolsters Travel Options", GIS World, Jul. 1995, pp. 62–64.
Helleker, Jan, Real–Time Traveller Information—in everyone's pocket?!—a pilot test using hand–portable GSM terminals, IEEE–IEE Vehicle Navigation & Information systems Conference, Ottawa, VNIS 1993, pp. 49–52.
Burgener, E.C., et al., "A Personal Transit Arrival Time Receiver", IEEE—IEE Vehicle Navigation & Information Systems Conference, Ottawa, VNIS 1993, pp. 54–55.
Peng, Zhong–Ren, "A Methodology for Design for a GIS–Based Automatic Transit Traveler Information System", Computer, Environment and Urban Systems, vol. 21, No. 5, pp. 359–372, 1997.
Lessard, Robert, "The Use of Computer for Urban Transit Operations", IEEE—IEE Vehicle Navigation & Information systems Conference, Ottawa, VNIS 1993, pp. 586–590.
Sommerville, Fraser, et al., "Reliable Information in Everyone's Pocket—a Pilot Test", IEEE, vol. 1927, Mar. 1994, pp. 425–428.
"PROMISE—Personal Mobile Traveller and Traffic Information Service—Specification of Promise Services, Ver. 7", Telematics Application Programme A2, Transport, Jul. 1, 1996.
"PROMISE—Personal Mobile Traveller and Traffic Information Service13 Generic Promise System Architecture, Ver. 2", Telematics Application Programme A2, Transport, Sep. 10, 1996.
PROMISE—Personable Mobile Traveller and Traffic Information Service—Summary of Promise Public Relation Activities, Ver. 1, Telematics Application Programme A2, Transport, Feb. 12, 1999.
"PROMISE"—A Personal Mobile Traveller and Traffic Information Service—Abstract, The Institution of Electrical Engineers, 1997.
Sommerville, Fraser, et al., "The Promise of Increased Patronage", The Institution of Electrical Engineers, 1993, pp. 3/1–3/4.
"Automatic Transit Location System", Washington State Department of Transportation, Final Report, Feb. 1996.
"Advanced Traveler Aid Systems for Public Transportation", Federal Transit Administration, Sep. 1994.
"Advanced Vehicle Monitoring and Communication Systems for Bus Transit: Benefits and Economic Feasibility", U.S. Department of Transportation, Urban Mass Transportation Administration, Sep. 1991.
Leong, Robert, et al., "An Unconventional Approach to Automatic Vehicle Location and Control for Urban Transit", IEEE 1989, pp. 219–223.
"1994 Vehicle Navigation & Information Systems Conference Proceedings", Yokahama, Japan, Aug. 31–Sep. 2, 1994, pp. 807–810.
"Vehicle Navigation & Information Systems Conference Proceedings—P–253, Part 2", Society of Automotive Engineers, Inc., Oct. 1991.
Vehicle Navigation & Information Systems—Conference Record of Papers presented at the $3^{rd}$ Vehicle Navigation & Information Systems Conference 1992., Reso Hotel, Osio Plaza., pp. 49–52.
Nelson, J. Richard, "Experiences Gained in Implementing an Economical Universal Motorist System", , IEEE—IEE Vehicle Navigation & Information Systems Conference, Ottawa, VNIS 1993, pp. 67–71.

"The Cassiope/Eurobus Approach", IEEE—IEE Vehicle Navigation & Information Systems Conference, Ottawa, VNIS 1993, pp. 79–81.

Kihl, Mary, "Advanced Vehicle Location System for Paratransit in Iowa", IEEE—IEE Vehicle Navigation & Information Systems Conference, Ottawa, VNIS 1993, pp. 381–384.

Gault, Helen, et al., "Automatic Vehicle Location and Control at OC Transpo", , IEEE—IEE Vehicle Navigation & Information Systems Conference, Ottawa, VNIS 1993, pp. 596–600.

Vehicle navigation & Information System—Conference Record of Papers presented at the First Vehicle Navigation and Information Systems Conference (VNIS '89), Sep. 11–13, 1999, pp. 602–605.

Heti, Gabriel, "Travelguide: Ontario's Route Guidance System Demonstration", , IEEE—IEE Vehicle Navigation & Information Systems Conference, Ottawa, VNIS 1993, pp. A13–A18.

Jeffery, D.J., et al., "Advanced Traveller Information Systems in the UK: Experience from the Pleiades and Romanse Projects", , IEEE—IEE Vehicle Navigation & Information Systems Conference, Ottawa, VNIS 1993, pp. 309–313.

Sweeney, Lawrence, E., et al., "Travinfo: A Progress Report", 1994 Vehicle Navigation & Information Systems Conference Proceedings, Yokahama, Japan, Aug. 31–Sep. 2, 1994, pp. 315–320.

Shimamura, Yta, et al., "Combined Position Detection System for Pedestrian/Train Mode", 1994 Vehicle Navigation & Information Systems Conference Proceedings, Yokahama, Japan, Aug. 31–Sep. 2, 1994, pp. 603–606.

Zavoli, Walt, "Customer Location Services", 1994 Vehicle Navigation & Information Systems Conference Proceedings, Yokahama, Japan, Aug. 31–Sep. 2, 1994, pp. 613–617.

Tanaka, Yoshimi, et al., "Automatic Traffic Information Provision System Utilizing Facsimile and Telephone (Now Operating in Osaka), 1994 Vehicle Navigation & Information Systems Conference Proceedings", Yokahama, Japan, Aug. 31–Sep. 2, 1994, pp. 627–632.

McDonald, Mike, et al., "Romanse (Road Management System for Europe) Project", 1994 Vehicle Navigation & Information Systems Conference Proceedings, Yokahama, Japan, Aug. 31–Sep. 2, 1994, pp. A–11–A–14.

Scott III, Robert H., "Computer–Aided Dispatch,", 1998, pp. 46–50.

Moore, Rodney J., "Hold the Phone!", American Demographics, Ithaca, Jan./Feb. 1996, p. 68.

Delong, Jr., Edgar S., "Making 911 even better", Telephony, Dec. 14, 1987, pp. 60–63.

Bruzek, Frank J., "Class Calling Service—A Consumer Service Perspective", Globecom '85 IEEE Global Telecommunications Conference, Dec. 2–5, 1985, vol. 1 of 3, pp. 11.4.1–11.4.4.

Powell, R., et al., "Real Time Passenger Information System for the Romanse Project", Colloouin Digest—IEE, Boston, Sep. 1993, pp. 9/1–9/3.

Huber, Paul, "Public Transport Information Systems in Munich", Intelligent Transport Systems World Congress '95—Second Wold Congress on Intelligent Transport Systems, Yokahama, Japan., Nov. 9–11, 1995, pp. 2362–2366.

Ronez, Nicholas, et al, "GIS–Based Transit Information Bolsters Travel Options", GIS World, vol. 6, part 7, Jun. 1995, pp. 62–64.

Catling, Ian, et al., "TABASCO—Improving Transport Systems in Europe", Pacific Rim TransTech Conference, Jul. 30–Aug. 2, 1995, 995 Vehicle Navigation & Information Systems Conference Proceedings, Washington State Convention and Trade Center, Seattle, Washington, USA, pp. 503–507.

Dailey, D.J., "Demonstration of an Advance Public Transportation System in the Context of an IVHS Regional Architecture", Proceedings of the First World Congress on Applications of Transport Telematics and Intelligent Vehicle–Highway Systems, Nov. 30–Dec. 3, 1994, Paris, France, pp. 3024–3031.

Hubner, Paul, "Advance Public Transportation Information in Munich", International Conference on Public Transport Electronic Systems, Conference Publication No. 42, Jun. 1996.

Thompson, S.M., et al., "Exploiting Telecommunications to Delivery Real Time Transport Information", Road Transport Information and Control, Apr. 21–23, 1998, pp. 59–63, Conference Publication No. 454 IEE 1998.

Kaminitzer, David, et al., Driver Information Systems: Influencing your Route, IEE Seminar, Mar. 3, 1999, pp. 5/1–5/5.

"Board Cites ATC in Spokane Near Miss", Article in Aviation Week & Space Technology, Mar. 28, 1977, URL: http://www.aviationnow.com.

Shifrin, Carole A., "Gate Assignment Expert System Reduces Delays at United's Hubs", Article in Aviation Week & Space Technology, Jan. 25, 1988.

"United Airlines applies TI's advance technologies to improve gate management at major airports", Article in Business Wire, Inc., Nov. 19, 1987.

Musich, Paula, "Airline Designs Software to move planes, people; Unite Airline's use of Covia Corp.'s Open Systems Manager, Connectivity Section", Article in PC Week, Jun. 7, 1988, vol. 5, No. 23, p. C11.

Stoll, Marilyn, "Systems help Airlines Manage Gate Schedules; Connectivity Supplement", PC Week, Jul. 25, 1988, vol. 5, No. 30, p. C4.

Reddy, Shyamala, "Traveling LAN: United Airlines Networks Its Terminals", Article in The Local Area Network Magazine, Jan. 1990, vol. 5, No. 1, p. 108.

Fisher, Sharon, "Networked Airport Systems help Travelers find their way; United Airlines subsidiary Covia Corp. devices integrated network", Article in Software Magazine, Mar. 15, 1990, vol. 10, No. 4, p. 31.

Henderson, Danna K., "Automation Takes aim at airports: the power of the networked PC is being unleashed on passenger handling and ramp activities worldwide.", Article in Air Transport Wold, Aug. 1990., vol., 27, No. 8, p. 52.

"United Airlines introduces United Cargo Plug I, a new cargo computer system to serve freight forwarders", Business Wire, Oct. 22, 1990.

Miller, Barry, "Special Report: Airline Equipment, Service Center", Aviation Week & Space Technology, Aug. 25, 1975, p. 51.

Lyon, Mark W., "Cargo Net Debate Splits Industry", Journal of Commerce, Specials, p. 4, Jul. 27, 1992.

Davies, I.L., et al., "Electronics and the Aeroplane", Proceedings of the Institution of Electrical Engineers, Paper No. 7604, delivered before the IEE Electronics Division, Oct. $29^{th}$, 1975.

"Global Niche", Flight International, Sep. 26, 1990.

"Real–Time Briefings", Aviation Week and Space Technology, Oct. 13, 1986.

Flanagan, Mike, et al., "Amelia Earhart—Mystery Still Clouds Soaring Achievements", Chicago Tribune, Jul. 5, 1987, Final Edition, p. 5, Tempo Woman.

"Official Airline Guides", Airports®, Nov. 20, 1990, Around Airports, vol. 7, No. 47, p. 485.

"Automation System Gains Acceptance", Aviation Week & Space Technology, Nov. 23, 1992, vol. 137, No. 21, p. 97.

Klass, Philip, "French Testing Ground–Derived MLS", Aviation & Space Technology, Avionics, p. 56, Dec. 15, 1975.

"Forecast Realized for ATC System", Aviation & Space Technology, Mar. 17, 1975, Avionics, p. 168.

Henderson, Danna, et al., "Ionworks: America West Automates New Phoenix Terminal Fully Integrated System to Handle Customer–Service Demands (America West Airlines Inc) (Includes Related Article Automation of passenger Service at Airports)", Airport Transport World, May 1, 1991. vol. 62.

3 Pages from a web site search under http://mit.edu/afs/net.mit/edu/project/attic/usa–today/tech/37, Jun. 12, 2003.

"What's New in passenger Handling Equipment", Air Transport World, vol. 24, p. 62, Sep. 1987.

"Senator Urges Acceleration of Navstar", Aviation & Space Technology, Avionics, p. 153, Oct. 3, 1983.

"AFSC Broadens Joint Program Efforts", Aviation & Space Technology, System Acquisition, p. 83, Jul. 19, 1976.

Herskovitz, Don, "GPS Insurance Antijamming the System; Brief Article", Journal of Electronic Defense, Dec. 1, 2000, No. 12, vol. 23, p. 41.

Hambly, Richard M., et al., "Aircraft Traffic Management on the Airport Surface Using VHF Data Link for CNS", IEEE AES Systems Magazine, Mar. 1995, pp. 9–13.

Berzins, G., et al., "INMARSAT: Worldwide Mobile Satellite Services on Seas, in Air and on Land", Space Technology, vol. 10, No. 4, pp. 231–237, 1990.

Jenney, L.L., et al., "Man as Manager of Automated Resources in an Advanced Air Traffic System", Aircraft, vol. 12, No. 12, Dec. 1975.

"Routing & Scheduling System improvements from RTSI; Routing Technology Software, Inc.; Product Announcement", Modern Brewery Age, vol. 43, No. 3, p. 11S, Jan. 20, 1992.

Yanacek, Frank, "Hitching to the stars; satellites for shipment tracking", Research Information Transportation Journals, Combined, No. 6, vol. 29, p. 16.

Stoll, Marilyn, "For on–the–road firms, hand–held terminals are pivotal. Connectivity", Research Information Transportation Journals, Combined, No. 34, vol. 5, p. C11.

"IBM and Hunt to Market New Truck Tracker; International Business Machines", J.B. Hunt Transport Services; Brief Article, No. 210, vol. 101, P. 4.

Klass, Philip J., "Two Carriers Plan Automatic Data Link", Aviation Week and Space Technology, Air Transport Section, May 23, 2977, p. 36.

"Data Link Evolved Over Three Decades", Aviation Week and Space Technology, Air Transport Section, May 23, 1977, p. 36.

Klass, Philip J., "American to Install Printers in Cockpits", Aviation Week and Space Technology, Avionics, Jul. 21, 1980, p. 56.

Lefer, Henry, "Computers on a boon to E&M, but at a price", Air Transport World, vol. 23, p. 53, Feb., 1986.

Donaghue, J.A., "Choice of Data Link Systems Expands as New Generation Hits the Market", Air Transport World, vol. 20, p. 58, Apr. 1983.

Klass, Philip J., "Digital Network Could Improve Aircraft Links to Operations, ATC", Aviation Week and Space Technology, International Air Transport Section, vol. 131, No. 21, P. 121, Nov. 20, 1989.

Board Cites ATC in Spokane Near Miss, Article in Aviation Week & Space Technology, Safety Section, Mar. 28, 1977, p. 59.

"Vicorp Interactive Systems", Aviation Daily, Aviation Suppliers Section, vol. 309, No. 17, p. 147.

Neumann, Dr. Horst, "ATC Concepts with Extensive Utilization of Automatic Data Processing", pp. 4–1 to 4–9; No Publication Information or Date Information Provided.

Maxwell, Robert L., "Automation Possibilities in Air Traffic Control", pp. 561–563, No Publication Information or Date Information Available.

"History of GPS", 3 pages, No Publication Information or Date Information Available.

"Road Transport Research—Intelligent Vehicle High Systems—Review of Field Trials", prepared by An OECD Scientific Expert Group, pp. 1–101, Organisation for Economic Co–Operation and Development—No Date Information Available.

Ratcliff, Robert, et al., Transportation Resources Information Processing System (TRIPS), pp. 109–113, No Publication Information or Date Information Available.

Balke, Kevin,, et al., Collection and Dissemination of Real–Time Travel Time and Incident Information with In–Vehicle Communication Technologies, pp. 77–82, No Publication Information or Date Information Available.

Moriok, et al., "Advanced Vehicle Monitoring and communication Systems for Bus Transit—Benefits and Economic Feasibility", Final Report—U.S. Department of Transportation, Sep. 1991, Revised Mar. 1993, Dot–T–94–03.

Brynielsson, Thore, Step by Step Development Towards Attractive Public Transport, Chalmers University of Technology, Gotebord, Sweden, Department of Transportation, 1976.

* cited by examiner

FIG 14

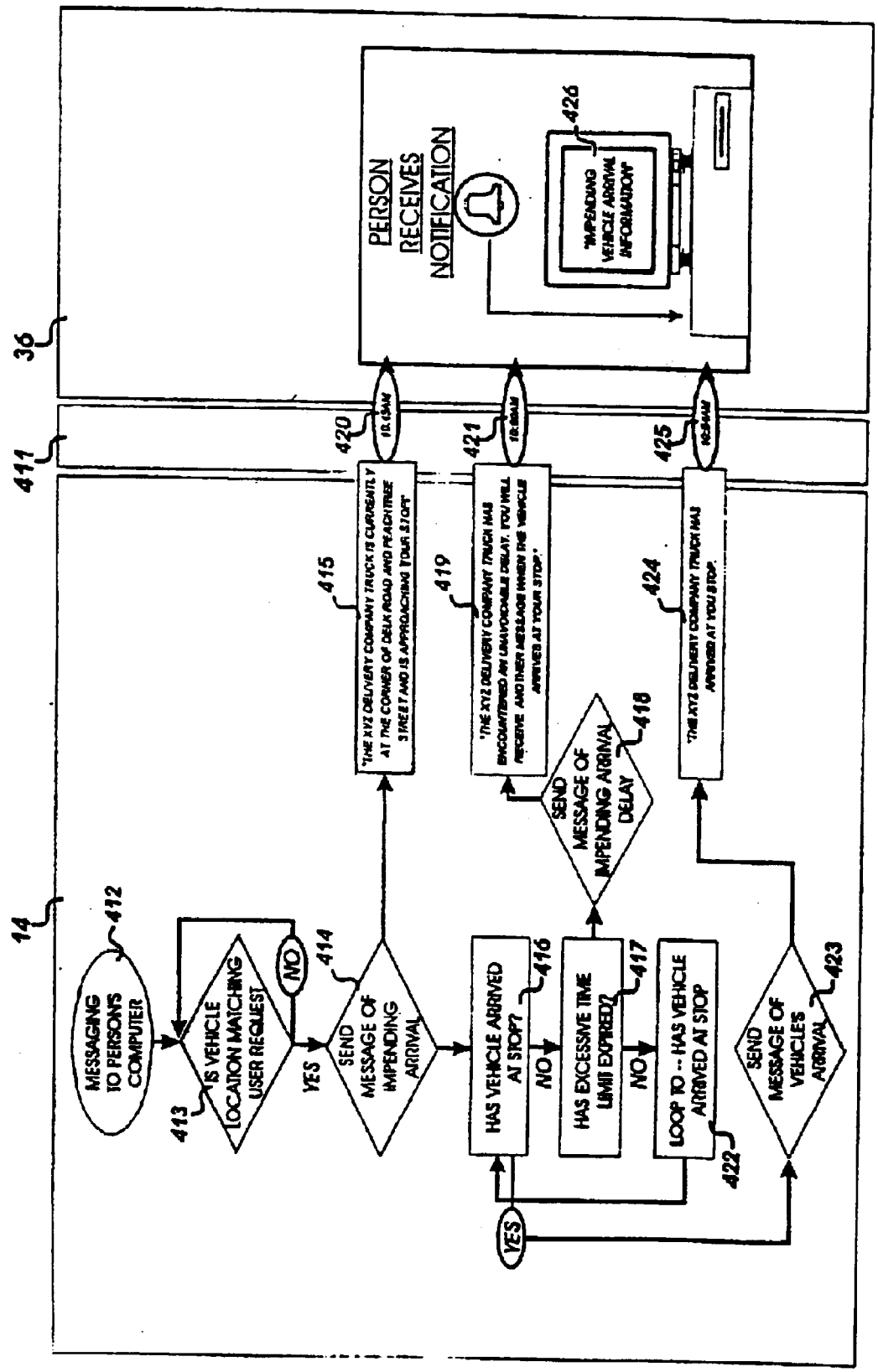

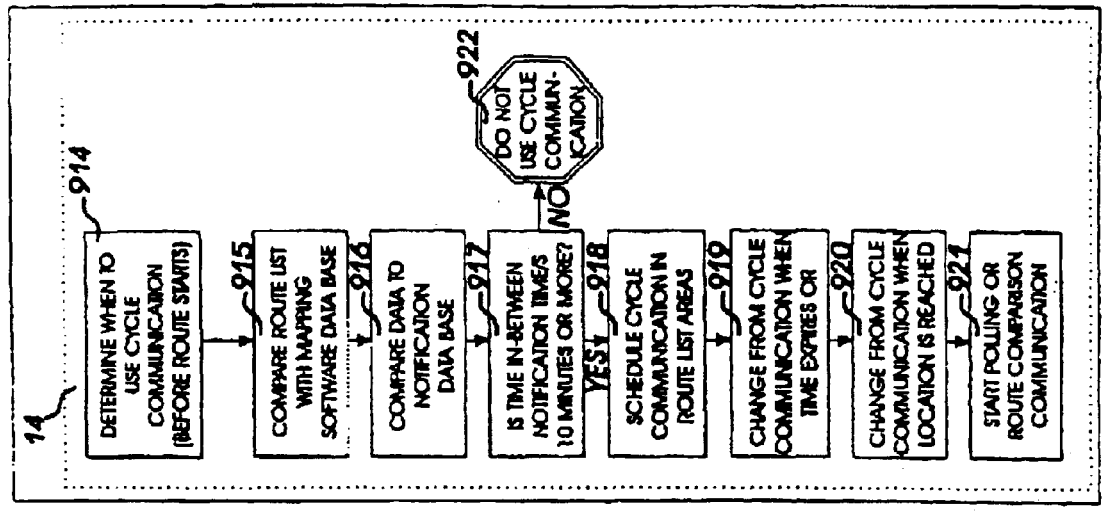
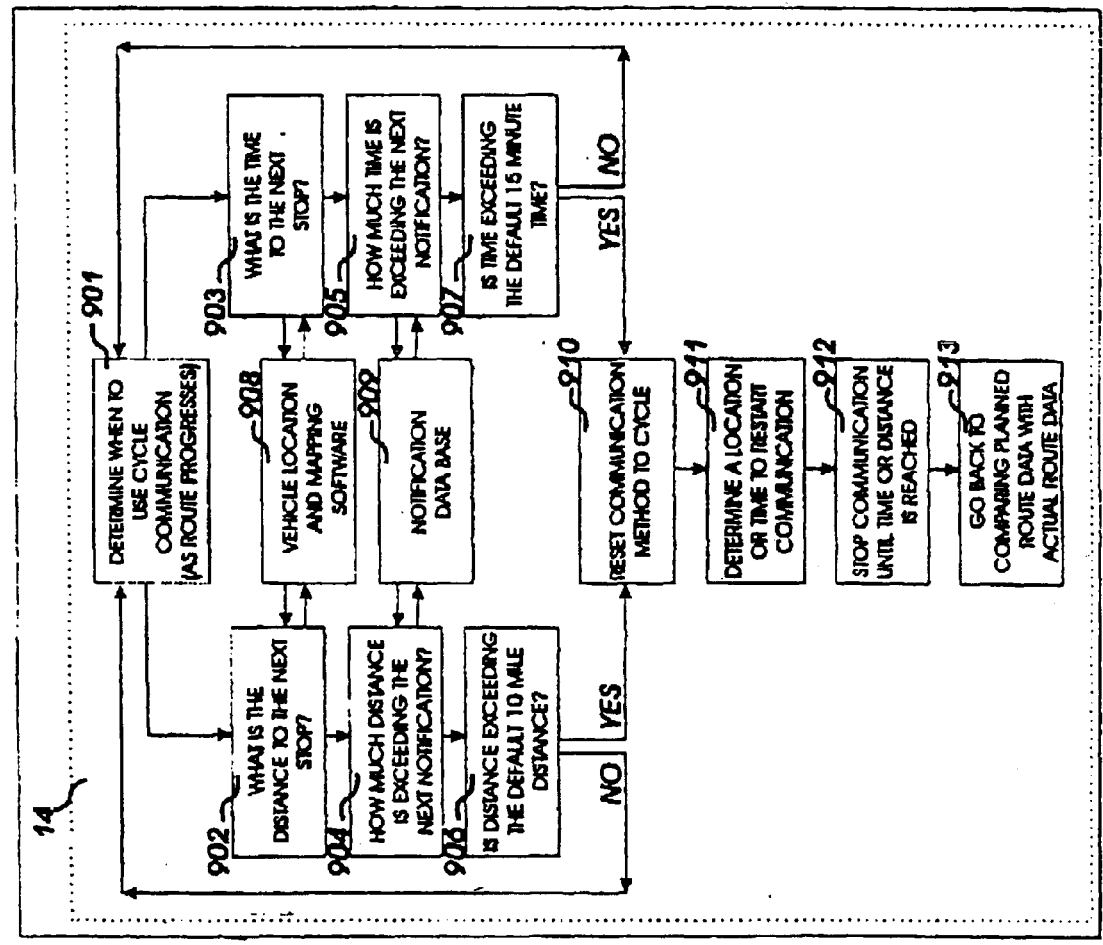

FIG 30

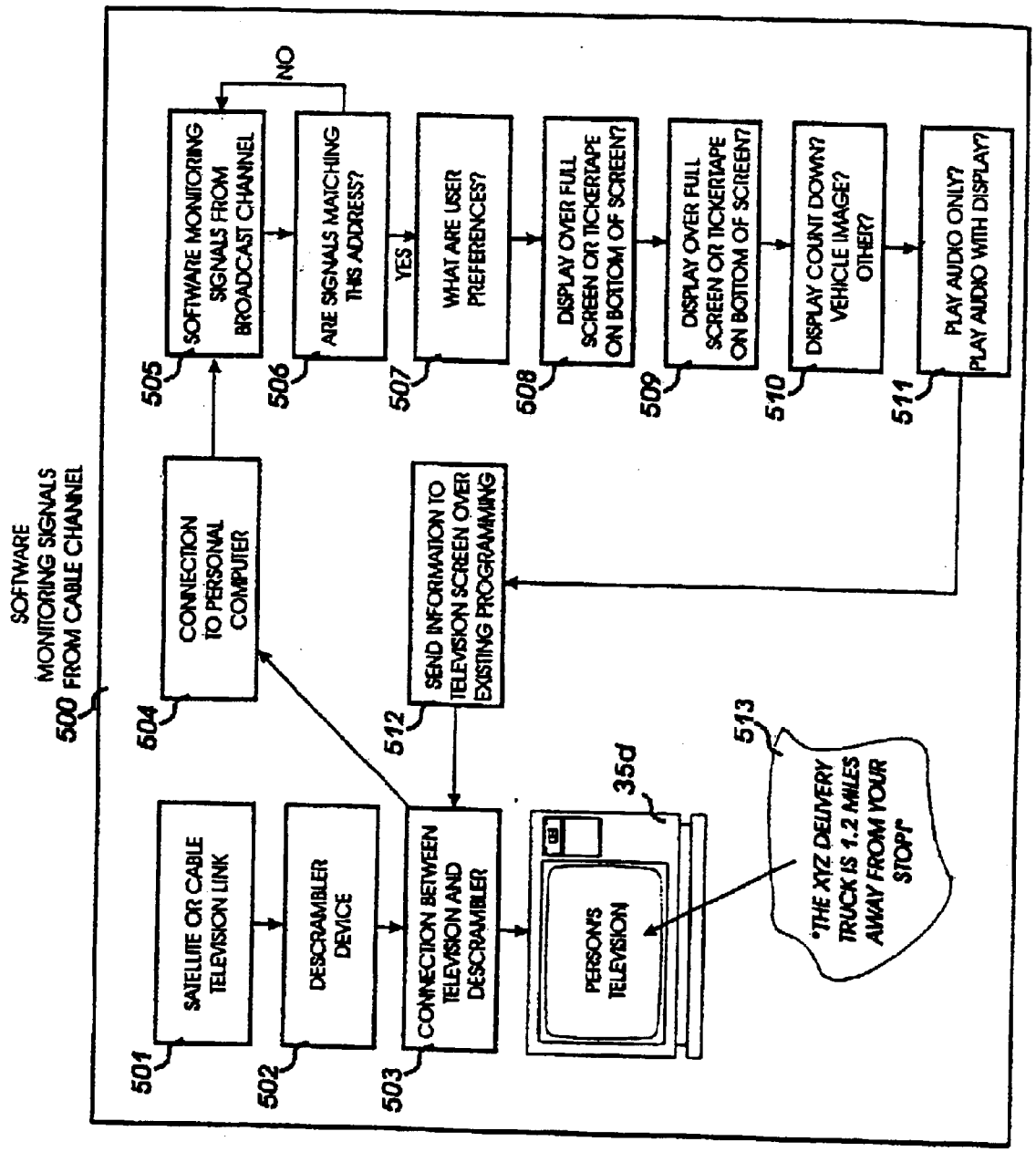

NOTIFICATION SYSTEMS AND METHODS WITH USER-DEFINABLE NOTIFICATIONS BASED UPON VEHICLE PROXIMITIES

This application is a divisional of application Ser. No. 08/852,119 filed on May 6, 1997, which is a continuation-in-part of application Ser. No. 08/434,049, filed on May 2, 1995, now U.S. Pat. No. 5,623,260, and a continuation-in-part of application Ser. No. 08/432,898, filed May 2, 1995, now U.S. Pat. No. 5,657,010, and a continuation-in-part of application Ser. No. 08/432,666, filed on May 2, 1995, now U.S. Pat. No. 5,668,543, said application Ser. No. 08/434,049, is a continuation-in-part of application Ser. No. 08/407,319, filed on Mar. 20, 1995, now abandoned, which is a continuation-in-part of application Ser. No. 08/063,533, filed May 18, 1993, now U.S. Pat. No. 5,400,020, said application Ser. No. 08/432,898, is a continuation-in-part of application Ser. No. 08/407,319, which is a continuation-in-part of application Ser. No. 08/063,533, said application Ser. No. 08/432,666, is a continuation-in-part of application Ser. No. 08/407,319, which is a continuation-in-part of application Ser. No. 08/063,533, said application Ser. No. 08/852,119 claims priority to provisional application No. 60/039,925, filed on Mar. 7, 1997. All of the foregoing patent applications and patents are incorporated herein by reference in their entirety.

FIELD OF THE INVENTION

The present invention generally relates to data communications and information systems and, more particularly, to advance notification systems and methods for notifying users in advance of the impending arrival of a vehicle or user, for example but not limited to, a bus, train, delivery van, plane, fishing vessel, or other vessel, or user walking or riding, to or at a particular stop.

BACKGROUND OF THE INVENTION

There are many situations when it is desirable for people to know of the approximate arrival time of a particular vehicle, the distance of a particular vehicle approaching, when a vehicle crosses particular location points, and when a particular vehicle is leaving its last stop, all shortly before the vehicle is to arrive at a particular destination. With such information, passengers, users, and companies can adjust their schedules accordingly and avoid having to wait on a particular vehicle to reach a particular destination. For example, a user having to pick up a friend or relative at a commercial bus station either has to call the bus station to find out the approximate arrival time (information which is oftentimes unavailable) or plan on arriving at the bus station prior to the scheduled arrival time of the bus and hope the bus is not delayed.

Another example includes a user walking and carrying a device such as a mobile phone or communication device with a location device, such as global positioning system (GPS) receiver, connected for sending location information to a control unit. This control unit can broadcast a user impending arrival time, distance to be traveled before arriving, specific location points and/or the time when leaving their last stop. This information may be broadcast to an employer, spouse, parent, or other user, when the vehicle/user reaches a predetermined location.

Another example involves school children that ride school buses. School children who ride buses to school often have to wait at their bus stops for extended lengths of time because school buses arrive at particular bus stops at substantially different times from one day to the next. The reason is that school buses are not always the best-maintained vehicles on the roads, frequently operate during rush hour traffic, and must contend with congested urban/suburban conditions. As a result, school children are forced to wait at their bus stops for long periods of time, oftentimes in adverse weather conditions, on unlit street corners, or in hazardous conditions near busy or secluded streets. If it is raining, snowing, windy and cold, and/or even dark, such conditions can be unhealthy and unsafe for children.

Yet another example is in the commercial overnight package delivery industry, wherein packages are delivered on a tight schedule.

It is desirable to notify a user at a delivery stop for better customer preparation as the vehicle approaches. By the customer becoming better prepared and a delivery driver being able to deliver more packages per day, an overnight package delivery company can increase profits by requiring fewer vehicles to deliver more packages in a business day. Additionally, individuals already try to project the arrival of a vehicle or package by online package tracking services provided by commercial delivery companies, such as the United Parcel Service (UPS), Federal Express (FED-X), and others. Although traditional methods used in determining when a vehicle is to arrive at a stop is effective in some cases, a more precise method using a pre-warning message can be more helpful in providing accurate information. Currently, such vehicles, in order to ensure being able to deliver all packages in the same day, keep loads at a lower capacity and often predetermine the need for excessive waiting times at a percentage of vehicle stops when customers react slowly to their arrival.

Thus, generally, it would be desirable for a user to know when a vehicle (such as a bus, truck, train, plane, user, or the like) is (a) a particular time period (for example, number of minutes or seconds) away from arriving at a destination, (b) a particular distance (for example, number of miles or height) away from the destination, or (c) at a particular location among a set of location points, so that the user can adjust his/her schedule and avoid arriving too early or too late.

In the past, in order to combat the arrival time problem in the context of school buses, student notification systems have been employed that use a transmitter on each bus and a receiver inside each student home. U.S. Pat. No. 4,713,661 to Boone et al. and U.S. Pat. No. 4,350,969 describe systems of this type. When the school bus and its onboard transmitter come within range of a particular home receiver, the transmitter sends a signal to notify the student that his/her school bus is nearby. While such notification systems work satisfactorily under certain circumstances, nevertheless, these systems are limited by the range of the transmitters and require the purchase of relatively expensive receivers for each student. In addition, such systems provide little flexibility for providing additional information to the students, such as notifying them of the delayed arrival of a bus, alternative bus route information, or information regarding important school events.

SUMMARY OF THE INVENTION

Briefly described, the present invention provides, among other things, methods and systems for permitting a user to define a plurality of different predetermined proximities corresponding respectively with a plurality of different mobile vehicles in relation to a location, for monitoring travel data associated with the plurality of mobile vehicles, and for notifying one or more communications devices associated with the user based upon the different predetermined proximities associated with the vehicles.

The present invention is suited for many applications. As nonlimiting examples, the present invention could be employed in connection with overnight delivery services, commercial buses, trains, planes, pickup vehicles, fishing or shipping vessels, delivery vehicles, individuals carrying location devices and/or delivery sensors and/or other sensors for determining location, etc.

BRIEF DESCRIPTION OF THE DRAWINGS

The present invention can be better understood with reference to the following drawings. The drawings are not necessarily to scale, emphasis instead being placed upon clearly illustrating the principles of the present invention. Moreover, like reference numerals designate corresponding parts throughout the several views.

FIG. 14 is an example of a route list after calculations have determined the route stop order and the time between stops. The left side shows GPS longitude/latitude coordinates and estimated time between stops that is maintained in the VCU database, while the right side shows the mailing address and stop number to be displayed on an LCD.

FIG. 18 is a flow chart of when a second or third message is used and how the BSCU determines the activation of these messages.

FIG. 23 is a high level flow chart for determining when to use a cycle communication protocol. This chart discloses one method for lowering communication while a vehicle is in route for an advance notification system.

FIG. 24 is a high level flow chart for showing the methods for determining when to program a VCU with cycle communication before a route starts.

FIGS. 29 through 39 is diagrams of user preferences and on-screen displays of the advance notification system, as a user is connected over a computer network and/or is operating proprietary software.

FIG. 29 is a diagram and example of an on-screen display of a user connecting to a internet computer site/location. To sign-up for the advance notification service a user has the ability to download the software for additional displays and audio options or to signup on-line through a computer connection.

FIG. 30 is a diagram and example of an on-screen display for entering the users home or business address, telephone number, and computer address (not shown). It would also be obvious to enter pager numbers, mobile phone numbers, cable television box identification numbers and other communication hardware addresses that would notify the user of an impending arrival of a vehicle, when the vehicle reaches a predefined location, time, prior stop, or distance.

FIG. 31 is a diagram and example of an on-screen display for showing the user location on a map and how the location is confirmed by the user.

FIG. 32 is a diagram and example of an on-screen display for providing the user with a choice of different type notification messages based on the type or category of selected vehicles. This allows (if optioned) the user, as an example, to receive an impending arrival message from a school bus when the school bus is five minutes away and an impending arrival message from a delivery truck when the vehicle is two miles away.

FIG. 33 is a diagram and example of an on-screen display of user options for being notified when a vehicle is at a predetermined time, distance, or particular location. This screen is not shown when a vehicle or company predefines when an impending arrival message is sent.

FIG. 34 is a diagram and example of an on-screen display for adjusting the amount of time before a vehicle arrives to send an impending arrival message. Additionally, a map can show actual activation points, based on vehicle type/s, if optioned (FIG. 28).

FIG. 35 is a diagram and example of an on-screen display for adjusting the amount of distance before a vehicle arrives to send an impending arrival message. Additionally, a map can show actual activation points, based on vehicle type/s, if optioned (FIG. 28).

FIG. 36 is a diagram and example of an on-screen display for adjusting a predefined area for activation of an impending arrival message. This illustration is for setting a circle perimeter around a stop or location. The activation points are at the outside areas of the circle and matching road/street addresses.

FIG. 37 is a diagram and example of an on-screen display for adjusting a predefined area for activation of an impending arrival message. This illustration is for setting a grid perimeter around a stop or location. The activation points are at the outside areas of the grid area/s and matching road/street addresses.

FIG. 38 is a diagram and example of an on-screen display for adjusting a predefined area for activation of an impending arrival message. This illustration is for setting a perimeter around a stop or location by placing street markers onto a map roads and streets. The activation points are the street markers located at the road/street addresses. Additionally, (not shown) all roads/street markers should close a perimeter around a users home or business.

FIG. 39 is a diagram and example of an on-screen display for user options and needed for selecting methods of receiving impending arrival messages over a computer network to a user computer and/or ringing a user telephone. Although not shown in this configuration and illustration, other messaging methods, such as a personal pager, a mobile phone, a cable television box, or other communication devices could be used to notify a user when a vehicle reaches a predetermined location, time, prior stop, or distance, and therefore could be added to FIG. 39.

FIG. 50 is a high level flow chart diagram of a method for receiving impending arrival messages through a satellite television link or cable television link, and displaying the impending arrival information on a person's television.

DETAILED DESCRIPTION OF THE PREFERRED EMBODIMENTS

The features and principles of the present invention will now be described relative to preferred embodiments thereof. It will be apparent to those skilled in the art that numerous variations or modifications may be made to the preferred embodiments without departing from the spirit and scope of the present invention. Thus, such variations and modifications are intended to be included herein within the scope of the present invention, as set forth and defined in the claims.

I. System Architecture

Figure 1:
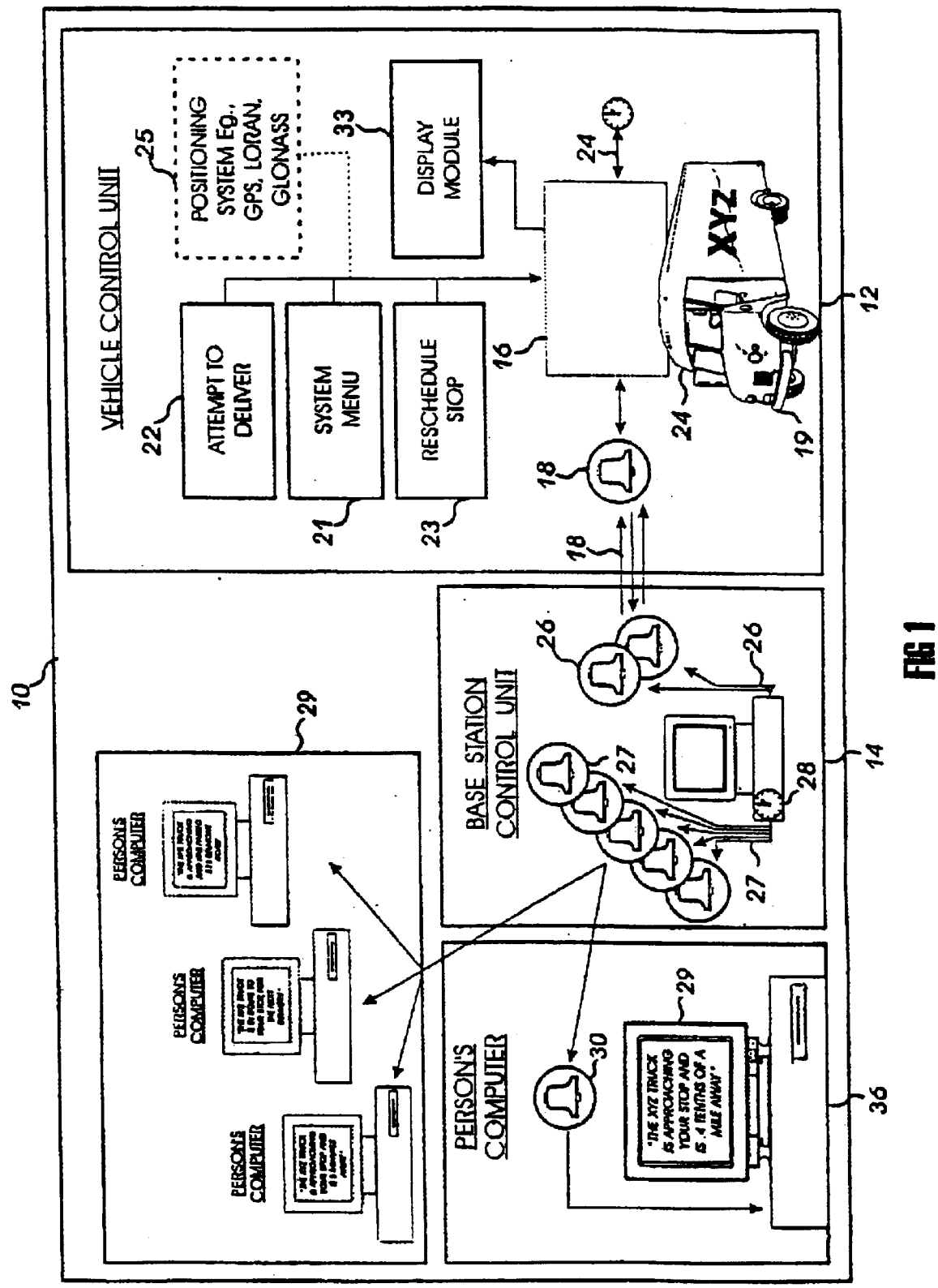
FIG. 1 is a high level schematic diagram of an advance notification system of the present invention as applied to a delivery truck system, as an example, the advance notification system generally comprising a vehicle control unit (VCU) in communication with a base station control unit (BSCU), which is in turn in communication with a customer computer and/or computer address, the customer computer then offers a video and/or audio display.

Referring now in more detail to the drawings, wherein like reference numerals designate corresponding parts throughout the several views; FIG. 1 is a schematic diagram of the advance notification system 10 of the present invention, as configured to operate for example, but not limited to, a delivery truck system.

Figure 2:
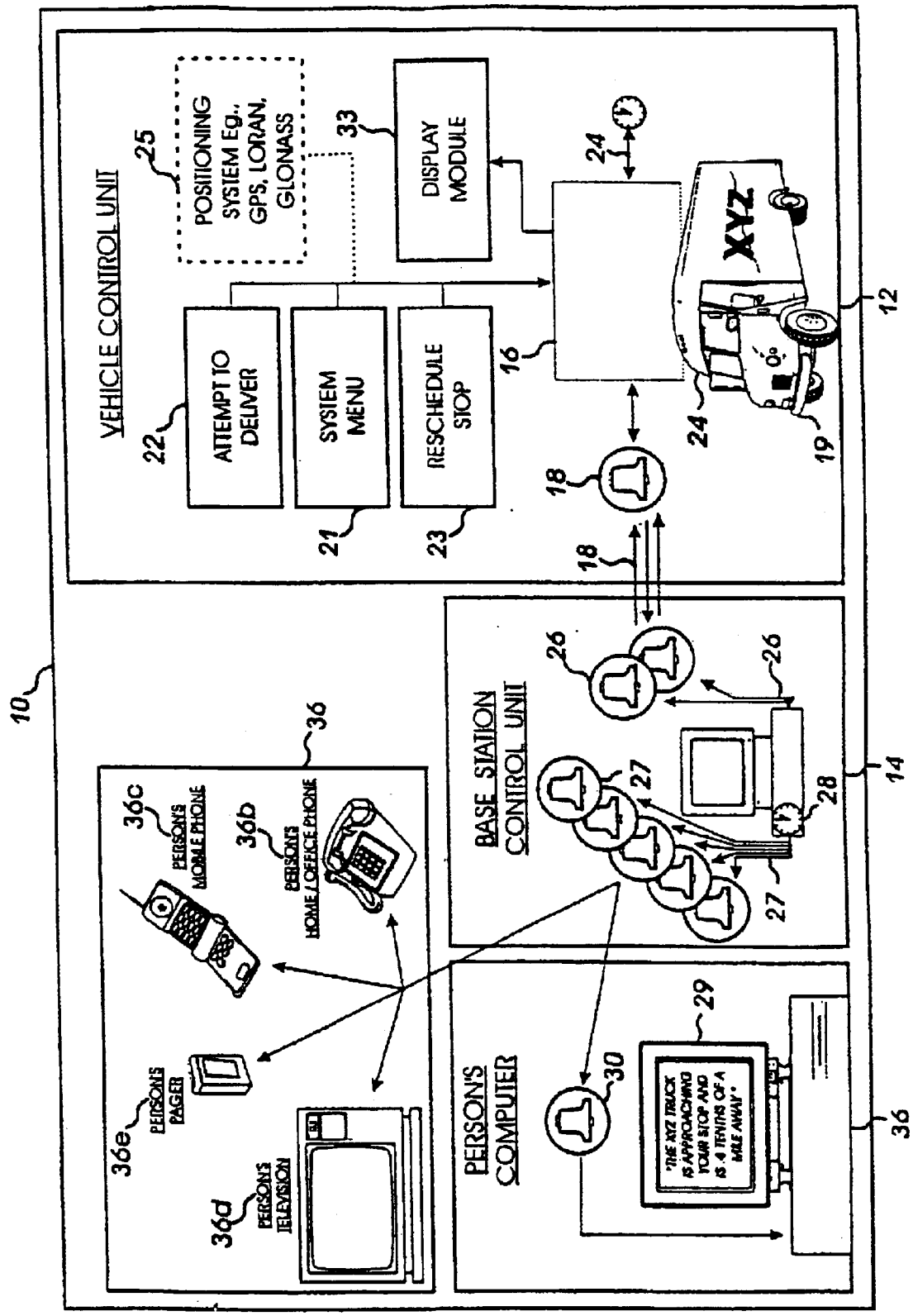
FIG. 2 is a high level schematic diagram of an advance notification system of the present invention as applied to a delivery truck system, as an example, the advance notification system generally comprising a VCU in communication with a BSCU, which is in turn in communication with a customer computer and/or computer address, a customer's business or home telephone, a customer's mobile phone, a customer's wireless pager, and a customer's television, these devices offer an improved method for notifying a person of the impending arrival of people or vehicles.

The advance notification system 10 comprises, preferably, a plurality of on-board vehicle control units (VCU) 12, a single base station control unit (BSCU) 14, and a plurality of user computers 29 and/or additional communication devices 36x. As configured in the delivery truck system 10, a VCU 12 is installed in each of a plurality of delivery trucks 19, all of which communicate with the BSCU 14. Moreover, the BSCU 14 communicates with the computers 29 and/or a person's telephone 36b, a person's pager 36e, a person's mobile phone 36c or a person's television 36d, at one or more locations 36x (FIG. 2), in the present example of an application.

A. Vehicle Control Unit

The VCU 12 will now be described with reference to FIGS. 1, 11, and 12. Referring first to FIG. 1, each VCU 12 comprises a microprocessor controller 16, preferably a model MC68HC705C8P microprocessor controller that is manufactured by and commercially available from the Motorola Corporation, USA. The microprocessor controller 16 is electrically interfaced with a communication mechanism 18, preferably a wireless communication device, for enabling intercommunication of data with the BSCU 14. Examples of suitable wireless communication devices include a mobile telephone (e.g., cellular) and a transceiver (having both a transmitter and a receiver) operating at a suitable electromagnetic frequency range, perhaps the radio frequency (RF) range. In the embodiment using a wireless RF transceiver as the communication mechanism 18, data can be sent in bursts in the form of in-band tones, commonly called "twinkle tones". These tone bursts can occur in the background of an existing voice channel. Twinkle tones are oftentimes used in transportation systems, such as taxicab communications systems.

Figure 40:
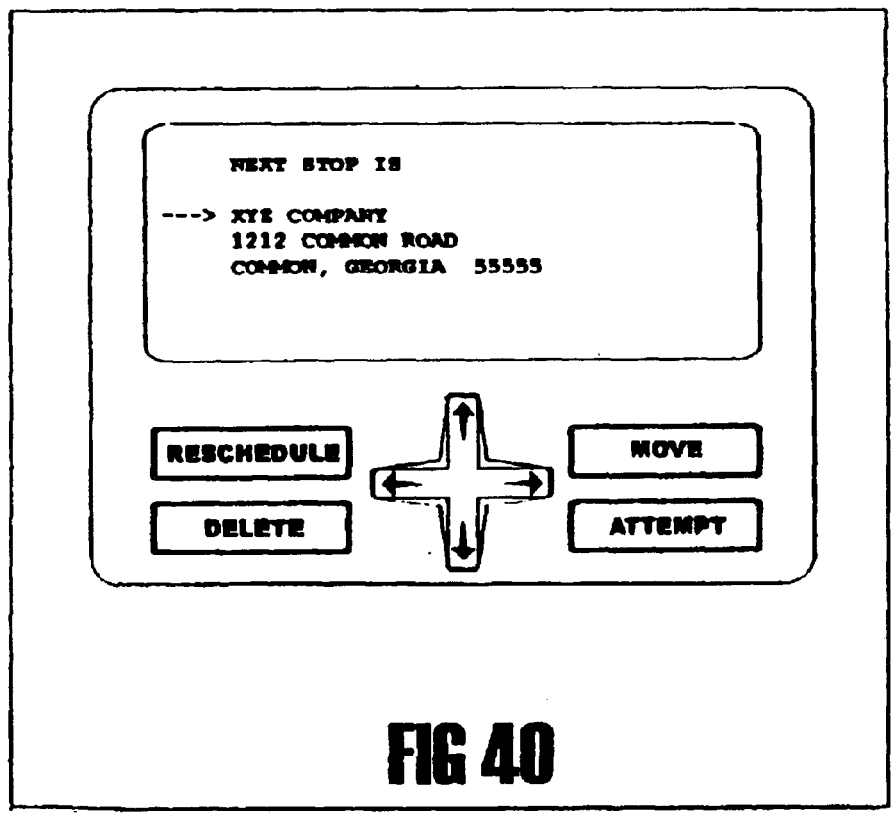
FIG. 40 is a diagram and example of a vehicle control unit (VCU) with a display area and control buttons. The display shown in this illustration is displaying the vehicle's next stop in a text format for the driver. This text format could be changed to show a map with highlighted roads to the next stop or actual directions (not shown).

The microprocessor controller 16 is electrically interfaced with a system menu switch 21, an attempt to deliver switch 22, a reschedule stop switch 23, a clock 24, and GPS location device sensor 25. Generally, vehicle tracking is accomplished by monitoring the control switches 21–23, the GPS location sensor 25, the power (35) to the controller 16, and a onboard package inventory and delivery database (FIG. 11). Additionally, existing switches, such as door, seat, placing the vehicle in drive, and/or driver held package-tracking devices 20 may also be used or added to existing switches. It is recommended that all of the foregoing features be employed to provide redundant checking and control of communication. More specifically, the system menu switch 21 includes options for route starting and resetting, driver responses to messages sent from the BSCU, suspended operation (lunch, breaks, etc.), emergency activation, etc. The system menu switch 21 operates by scrolling upward and downward through options and selecting by pressing left or right on the control knob. Special events also are programmed to occur throughout a normal day of operation such as, on screen displays to the driver and driver prompts to enter a response "are you starting your route?" or "when are you breaking for lunch, after this stop?" or "stop 115 $3^{rd}$ street has responded to message and is available to receive a package or not available for delivery". Would you like to reschedule this delivery for today?" etc. The attempt to deliver switch 22 can be actuated by the driver upon reaching a user stop and finding no one available to sign for and/or receive a package, in order to inform the VCU 12 that a stop has been made and the package is still on board, the details of which will be further described hereinafter. The driver at a stop can actuate the reschedule stop switch 23 if the driver is planning to revisit the stop in the same day, as will be further described in detail hereinafter. This indicates to the microprocessor controller 16 that a display module 33 and memory should be updated. In essence, the attempt to deliver switch 22 and the reschedule stop switch 23 cause the stop designation to be rescheduled for a second time in a day or for the following day. The actual displayed information on the display module 33 is acceptance of input and further instructions, normally when the reschedule stop switch is activated. Additional options include the placement of the stop to be rescheduled within the upcoming stops in that day. The stored driver choices in the VCU 12 from the attempt to deliver and/or the reschedule stop switch/s, are sent to the BSCU respectively. Additional menu options 21 can be added to the VCU in the form of buttons, as shown in FIG. 40.

Figure 20:
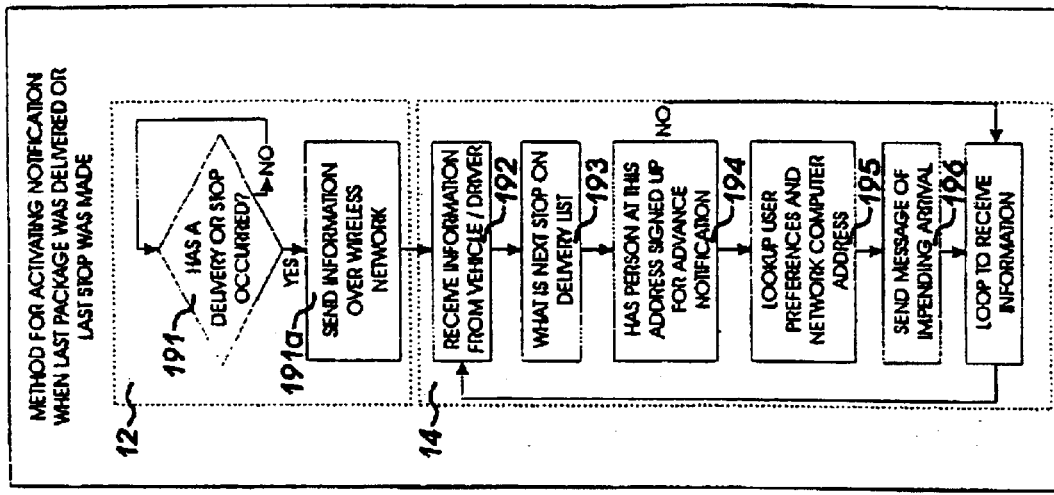
FIG. 20 is a flow chart of a simple and low cost advance notification system for notifying users of the impending arrival of a particular vehicle, when the vehicle leaves it's last (prior) stop, and on it's way to the user's stop.
Figure 19:
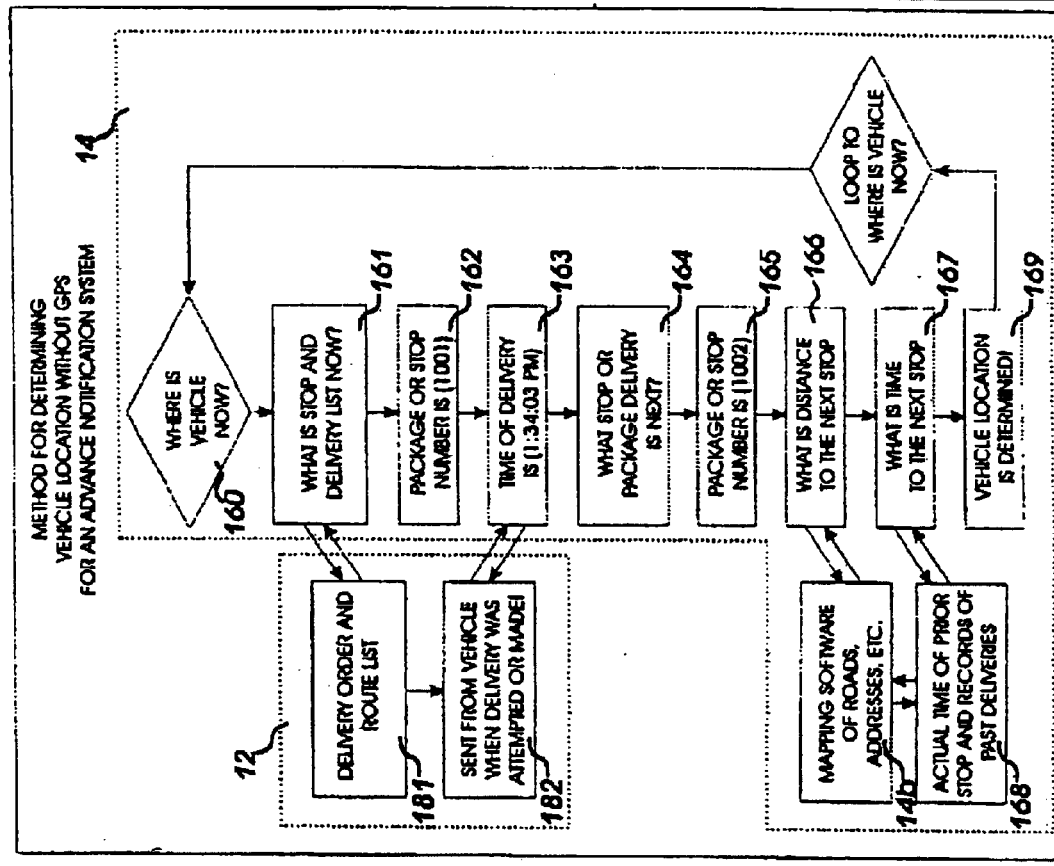
FIG. 19 is a diagram of an example of a method for determining vehicle location without the vehicle being equipped with a location device, such as a GPS, or other devices used for odometer/distance reading device, etc., in an advance notification system. This flow chart diagram illustrates a method for determining vehicle location from a delivery list, actual delivery or attempt to deliver notices and route determining software in the BSCU and/or a user computer. The route and/or mapping software determines the vehicle path (roads) to the next stop and then calculates the distance from mapping software. Furthermore, the vehicle location is associated with time for determining a moving vehicle location. This vehicle location/time is calculated from past route data, mapping software of speed limits, stops signs, red lights, etc. and/or traffic monitoring systems with sensors normally located along the roadside. It also provides an inexpensive means for determining a vehicle time, distance, and/or location away from a home or business for activating an advance notification message of an impending arrival of a vehicle from different user preferences.

The VCU 12 can be configured so that the operation of the system menu switch 21, the attempt to deliver switch 22, and the reschedule stop switch 23 are purely optional. In this configuration, the location sensor 25 automatically accomplishes the aforementioned functions of the switches 21–23. However, in a simple configuration the delivery driver has no user functions and the VCU sends package, delivery, and time information only to the BSCU (FIGS. 19 and 20). The range of configurations is provided for the types of deliveries and nature of a company and its packages or cargo. As an example, a furniture delivery company only delivers a limited number of packages per day. Most delivery times (on location) for furniture is unpredictable and, therefore, advanced features needed for quicker and more frequent stops are not needed.

However, in one of the simplest configuration, the delivery driver has no user functions and the VCU is not equipped with a location-determining device. The VCU is equipped with a package sensor only, and the package sensor sends signals to the BSCU for the actual delivery of a package at a stop. Furthermore, for the BSCU to determine notification time, distance, location on a map, or broadcast the delivery vehicle's next stop, the BSCU should store the driver's route in its data base and/or receive next stop information from the VCU or other stored means. Other types of information may also be displayed on the display module 33. For example, the display module 33 may inform the driver of a particular vehicle, to meet another driver for load sharing (as in a holiday season, or when a driver experiences an emergency, such as a breakdown from a deflated tire or involvement in an accident), and the status of the VCU 12 in communication with the BSCU 14, or that the advance notification system 10 is operating.

A sensor comparison in the VCU provides the BSCU with more accurate vehicle operational intentions, such as a vehicle door sensor and a location device (e.g., GPS) which may be compared for knowing if the driver has started to the next stop. A cross reference of these sensors and switches can make a determination between the vehicle making a delivery stop and stopping at a road sign or red light or rest area. By comparing the location device outputs and determining when the vehicle is stopped, with the delivery door sensor, a determination of a stop can be assured. Other calculations can be utilized on single sensors such as to count the number of times the delivery door opens and closes, or as a package is scanned as it enters or leaves a vehicle.

A positioning system 25 can be used to determine the geographical position of the vehicle 19 on or above the earth's surface. The positioning system 25 could be GPS (global positioning system), the LORAN positioning system, the GLONASS positioning system (USSR version of GPS), or some other suitable position tracking system.

FIGS. 7, 8, 9, and 10, are modular component diagrams of the advance notification system 10 of the present invention, as configured to operate for example, but not limited to, delivery truck systems. Furthermore, each diagram helps to show examples of VCU 12 in different, but not limited to, system configurations and applications. It will be apparent to those skilled in the art that numerous other variations or modifications may be made to the preferred embodiments without departing from the spirit and scope of the present invention.

Figure 7:
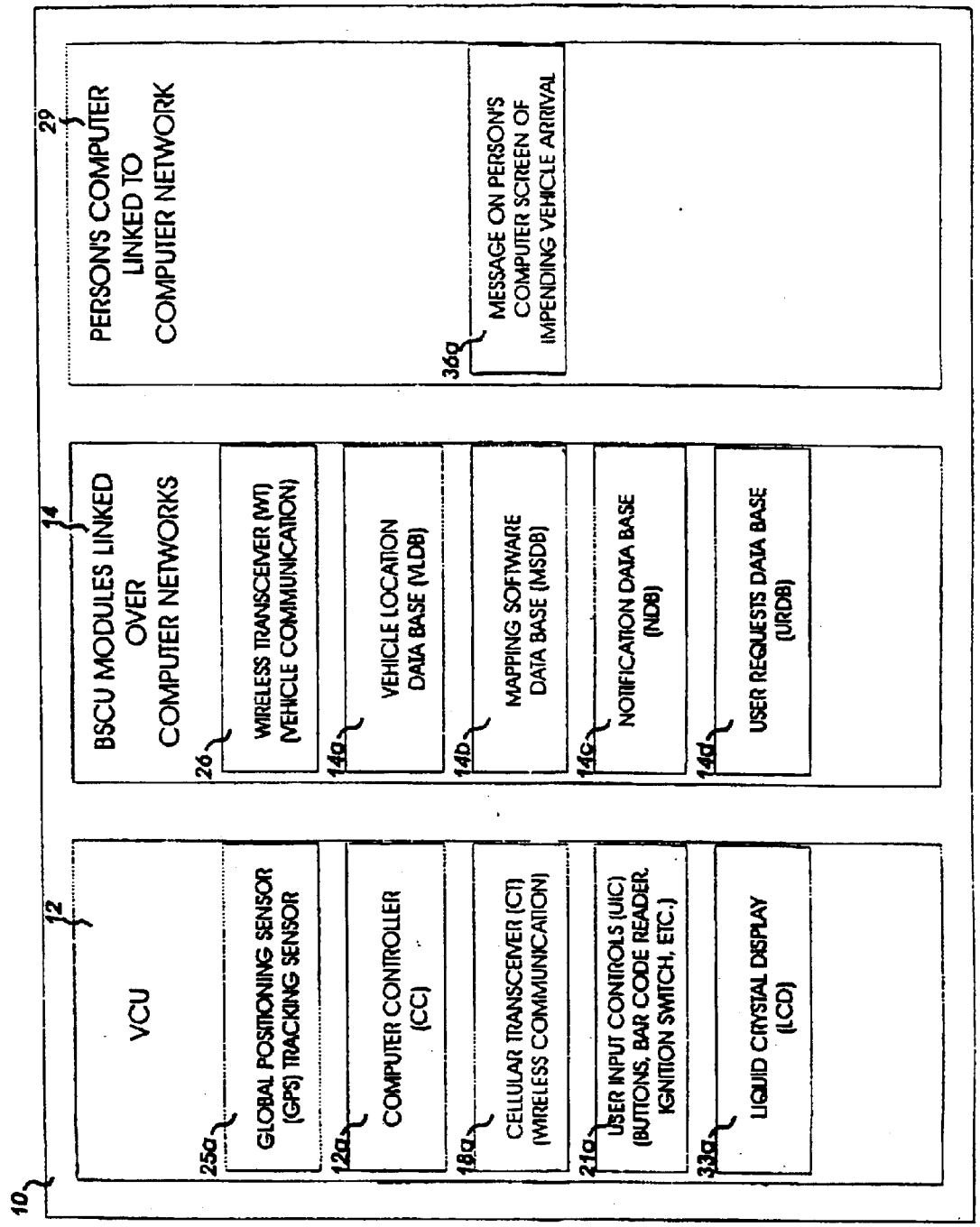
FIG. 7 is a high level modular diagram of the overall operation of the advance notification system described as system configuration and necessary to show the differences of individual module configurations. Additionally, this configuration is a simple diagram of an advance notification system, designed to send a user's computer address a message when a vehicle is approaching and also used as an overview of FIG. 1.

To better understand the modules within VCU 12, FIGS. 7, 8, 9, and 10, are examples of different configurations for providing advance notification of an impending arrival of a particular vehicle. Moreover, to understand the VCU 12 in different systems, FIGS. 7, 8, 9, and 10, are illustrations and modular diagrams of the advance notification system and how the VCU 12 interacts with the other system components. FIG. 7, is an advance notification system 10 comprising, preferably, a plurality of on-board vehicle control units (VCU) 12, a modular Base Station Control Unit (BSCU) 14 and one or more person's linked to a computer network with one or more computers 36. In this configuration each Vehicle Control Unit (VCU) 12 is equipped with a global positioning system (GPS) 25 receiver for receiving satellite signals for determining vehicle location. The global positioning system (GPS) receiver sends positioning data to the Computer Controller (CC) 12*a*. The computer controller from a hierarchy standpoint controls the overall operation of the Vehicle Control Unit (VCU) 12. The computer controller 12*a* interacts with the Cellular Transceiver (CT) 18*a* and establishes wireless communication through the Wireless Transceiver (WT) 26 to the Base Station Control Unit (BSCU) 14. Actual communication between the Vehicle Control Unit (VCU) 12 and the Base Station Control Unit (BSCU) 14 can occur when the Computer Controller (CC) 12*a* receives wireless communication from the Base Station Control Unit (BSCU) 14, or when predefined User Input Controls (UIC) 21*a* are activated, or when a predetermined time period has expired, or a predetermined vehicle location is determined, through the Global Positioning System (GPS) 25 receiver. The actual communication protocol is normally set by the Base Station Control Unit (BSCU) 14 and established from the end-user requirements during the setup of each system.

The advance notification system 10 is customized for each system implementation for communication optimization needed for lowering the number of wireless messages and the cost between the Vehicle Control Unit (VCU) 12 and the Base Station Control Unit (BSCU) 14. As an example, when vehicles have extended and long drives, normally in rural or remote areas, communication can be stopped until the vehicle reaches a predetermined location, time, or when polled by the (BSCU) 14. Upon reaching the predefined location, or the expiring of a predefined time period, or when polled by the (BSCU) 14, communication is restarted. Additionally, the actual communication can be triggered by the activation of a User Input Control (UIC) 21*a*. As an example, when a vehicle driver activates the User Input Control (UIC) 21*a* (when a package is delivered and sensor is activated), communication from the Vehicle Control Unit (VCU) 12 to the Base Station Control Unit (BSCU) 14 can be established. Because the (BSCU) 14 controls the communication protocols (ability to analyze travel data for best communication methods, then down loaded to VCU 12) in the (VCU) 12, multiple combinations in most trucks can be used to limit communication.

Figure 8:
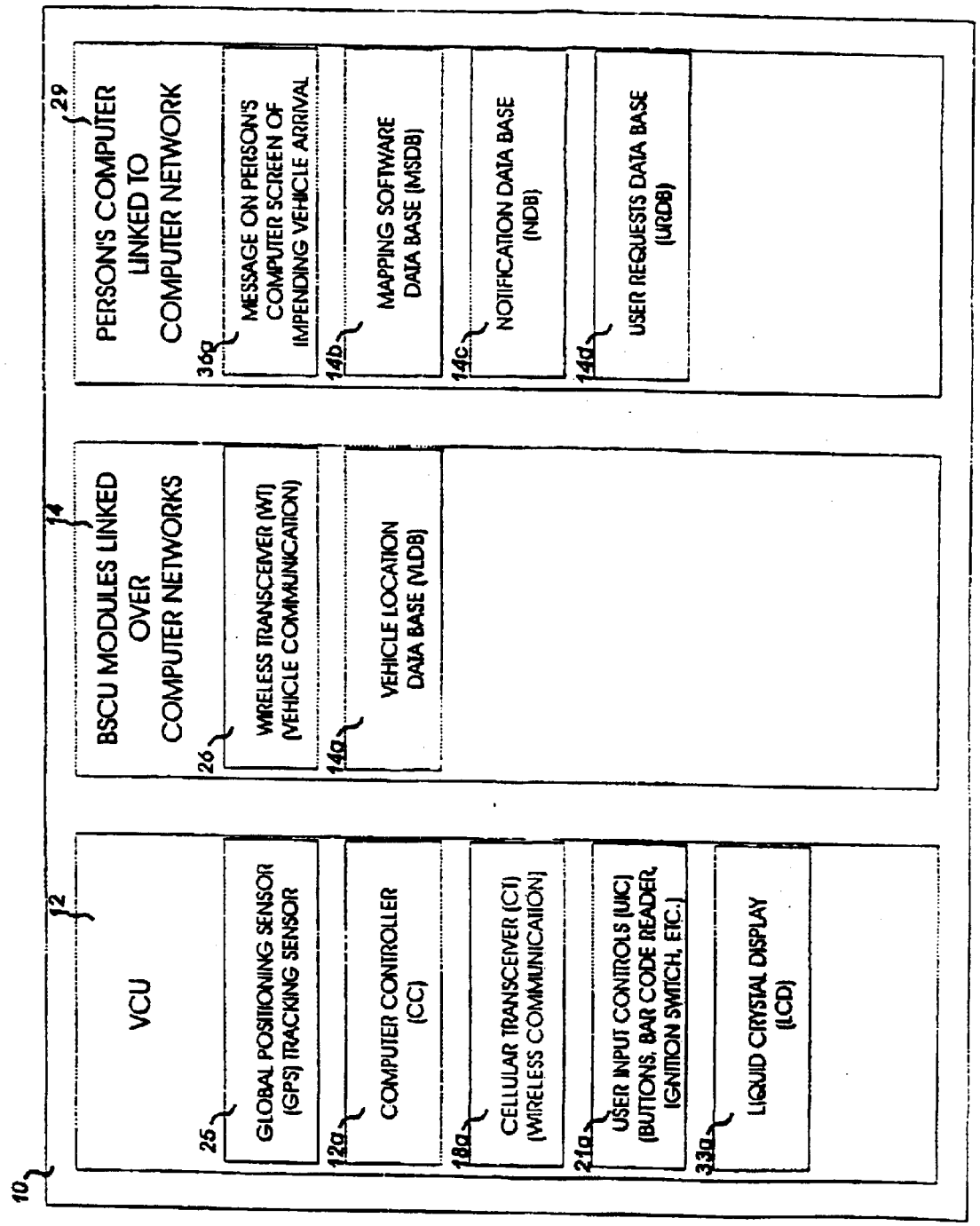
FIG. 8 is another high level modular diagram of the overall operation of the advance notification system described as system configuration and necessary to show the differences of individual modular configurations. Additionally, this configuration is a simple diagram of an advance notification system, designed to send a user computer vehicle location information only, for the user computer to determine when to notify the user and send a message to the computer screen and also by audio means, when a vehicle is approaching.
Figure 9:
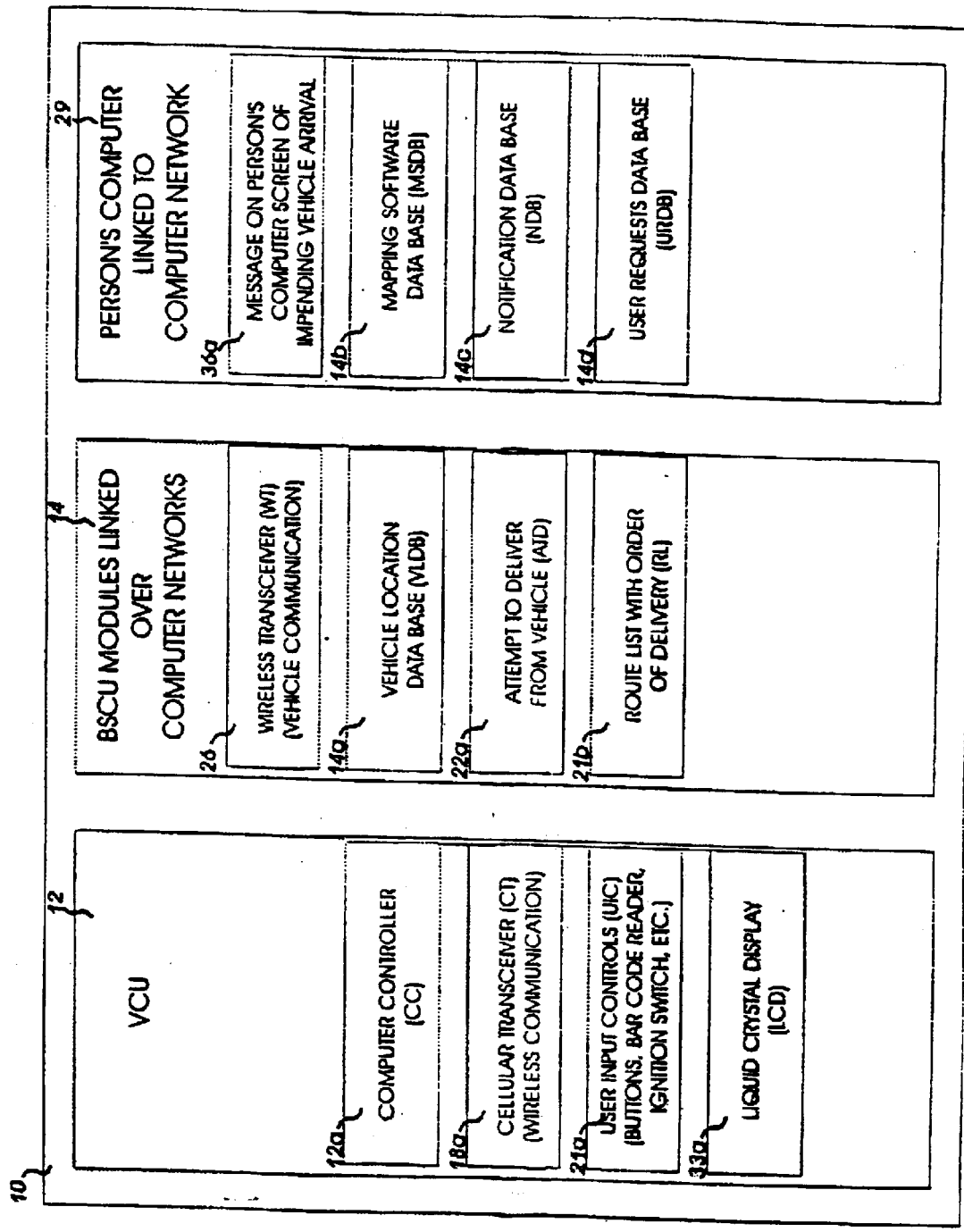
FIG. 9 is another high level modular diagram of the overall operation of the advance notification system described as system configuration and necessary to show the differences of individual modular configuration preferences of different systems. Additionally, this configuration is a simple diagram of an advance notification system, designed to send a message about the next stop to a users computer as the last delivery (prior to the impending stop) is made and thus notify the user via a message on a computer screen and audio means, when a vehicle is approaching.

FIGS. 8 and 9, are illustrations of advance notification system configurations, without the use of a Global Positioning System (GPS) as shown in FIGS. 1, 2, 6, 7, and others. These configurations illustrate a system for notifying a Person's Computer (PC) 36 by tracking each vehicle's package delivery attempt, by monitoring User Input Controls (UIC) 21*a* and each truck route list with order of delivery (RL) 21*b*. By monitoring each vehicle's attempted delivery and their particular route order, advance notification can be set for a prior stop, a particular estimated location using mapping software and/or past records of vehicle times associated with package delivery stops and the time between.

Figure 11:
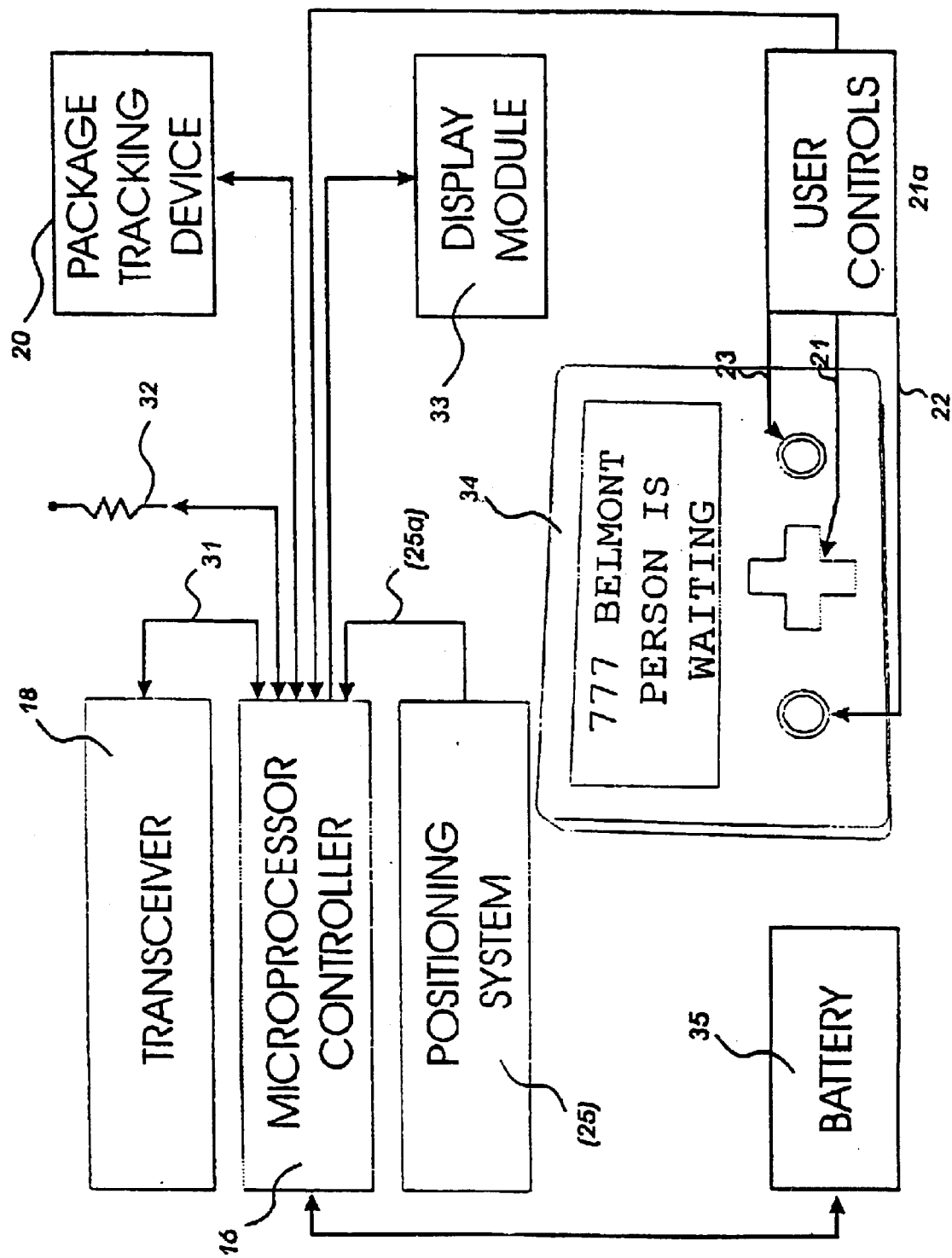
FIG. 11 is a high-level schematic circuit diagram of the VCU. The VCU is designed to be a compact unit with a generally rectangular housing that is mounted preferably on or in front of the dashboard of the vehicle in view of and within reach of the vehicle driver. In the housing, the microprocessor controller is interfaced with the transceiver by a transceiver jack (preferably a conventional 8-conductor telephone jack when transceiver is a mobile telephone), and the transceiver includes an antenna for transmitting and/or receiving signals to and from the BSCU. Further, the VCU includes a liquid crystal display (LCD) module disposed for external viewing of the display by the driver and for providing information to the driver, as described previously.

FIG. 11 is a schematic circuit diagram of the VCU 12.

The VCU 12 is designed to be a compact unit with a generally rectangular housing 34 that is mounted preferably on or in front of the dashboard of the vehicle 19 in view of and within reach of the vehicle driver. In the housing 34, the microprocessor controller 16 is interfaced with the transceiver 18 by a transceiver jack 31 (preferably a conventional 8-conductor telephone jack when transceiver 18 is a mobile telephone), and the transceiver 18 includes an antenna 32 for transmitting and/or receiving signals to and from the BSCU 14. Furthermore, the VCU 12 includes a liquid crystal display (LCD) module 33 disposed for external viewing of the display by the driver for providing information to the driver, as described previously.

Figure 12:
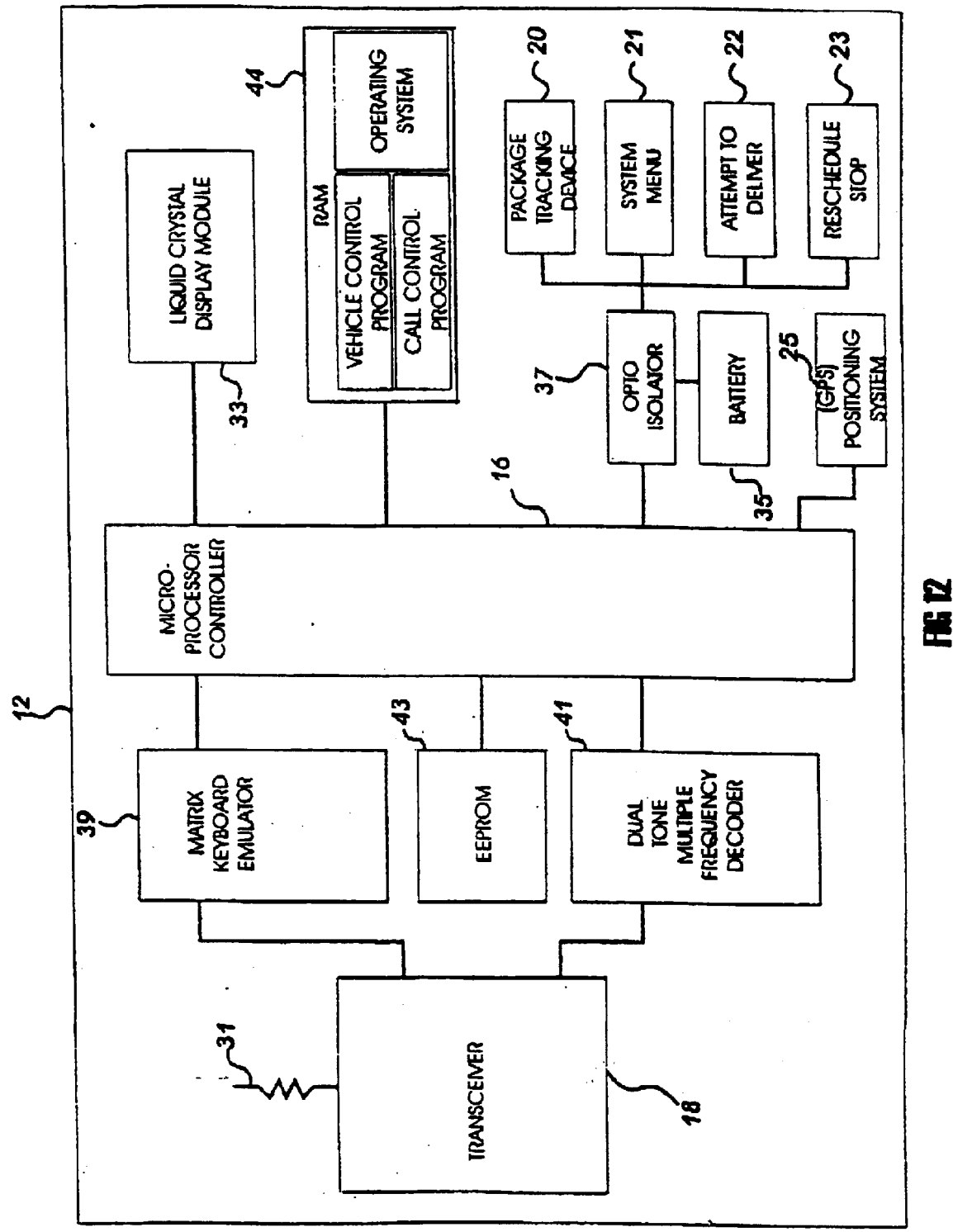
FIG. 12 is a low level block diagram of the VCU of FIG. 11.

FIG. 12 is a more detailed schematic circuit diagram of the electronic components associated with the VCU 12. The microprocessor controller 16 essentially controls the operation of the transceiver 18, the Global Positioning System (GPS) 25 and the LCD display module 33. A switching element 37, such as an opto isolator (optical isolator) unit, provides a buffer between the microprocessor controller 16 and the battery 35 as well as switches 20, 21, 22, and 23. An EEPROM 43 is provided for storing the control programs (FIGS. 11 and 12) and other requisite data for the microprocessor controller 16, and a RAM 44 is provided for running the control programs in the microprocessor controller 16. A matrix keyboard emulator 39 is interfaced between the transceiver 18 and the microprocessor controller to control and transmit signals over the transceiver 18. Further, a dual tone multiple frequency decoder 41 is interfaced between the mobile telephone transceiver 18 and the microprocessor controller 16 for decoding modem signals, or tones, received by the mobile telephone transceiver 18 from the BSCU 14.

B. Base Station Control Unit

The BSCU 14 may be implemented using any conventional computer with suitable processing capabilities. The BSCU 14 can communicate to the homes or businesses of customers via, for example but not limited to, either of the following interfaces: (a) computer links through modem cards to the user computers 29; (b) a computer network operated by an Internet service provider. The Internet adheres to the conventional computer-networking model and supports the carrying of application information in an application independent fashion. The computer network is a cost effective technology that delivers voice and data information between computer terminals and a computer network or Internet using existing POTS (plain old telephone service) lines, ADSL (asynchronous digital subscriber line), FTTC (fiber-to-the-curb) networks or cable television network or a combination of the two infrastructures. The BSCU 14 or parts of the BSCU 14 may also reside in a user home or business as a stand alone operational system, via software operating on a user computer and receiving vehicle location information from VCU/s through a modem and/or network link. Moreover, the BSCU and user computer may contain combinations of modules for achieving notification of the impending arrival of a vehicle at a user stop, on that user computer/computer address.

In the preferred embodiment, a centralized BSCU 14 communicates through a direct link to a computer network and/or multiple port modem cards to user computers 29. When using multiple means in this regard, a set of conventional modem processing cards 36 are utilized for communicating with computers 27 in one or more homes or businesses, or with computer/Internet addresses as depicted in FIG. 1 as user locations 36. The system 10 could be configured to send an electronic message to prospective users' network address, thus warning them of the impending arrival of a vehicle 19, as opposed to sending data to activate a user computer equipped with additional software, for displays and audio warnings. In the preferred embodiment, the BSCU 14 includes at least one communication mechanism 26 and associated line 26a, dedicated for communication with the VCUs 12. However, as mentioned previously, the BSCU 14 may be designed to communicate with the VCUs 12 via any suitable wireless communication device, in which case, the BSCU 14 would comprise a corresponding transceiver having the ability to receive a plurality of signals from the plurality of vehicles 19.

Figure 3:
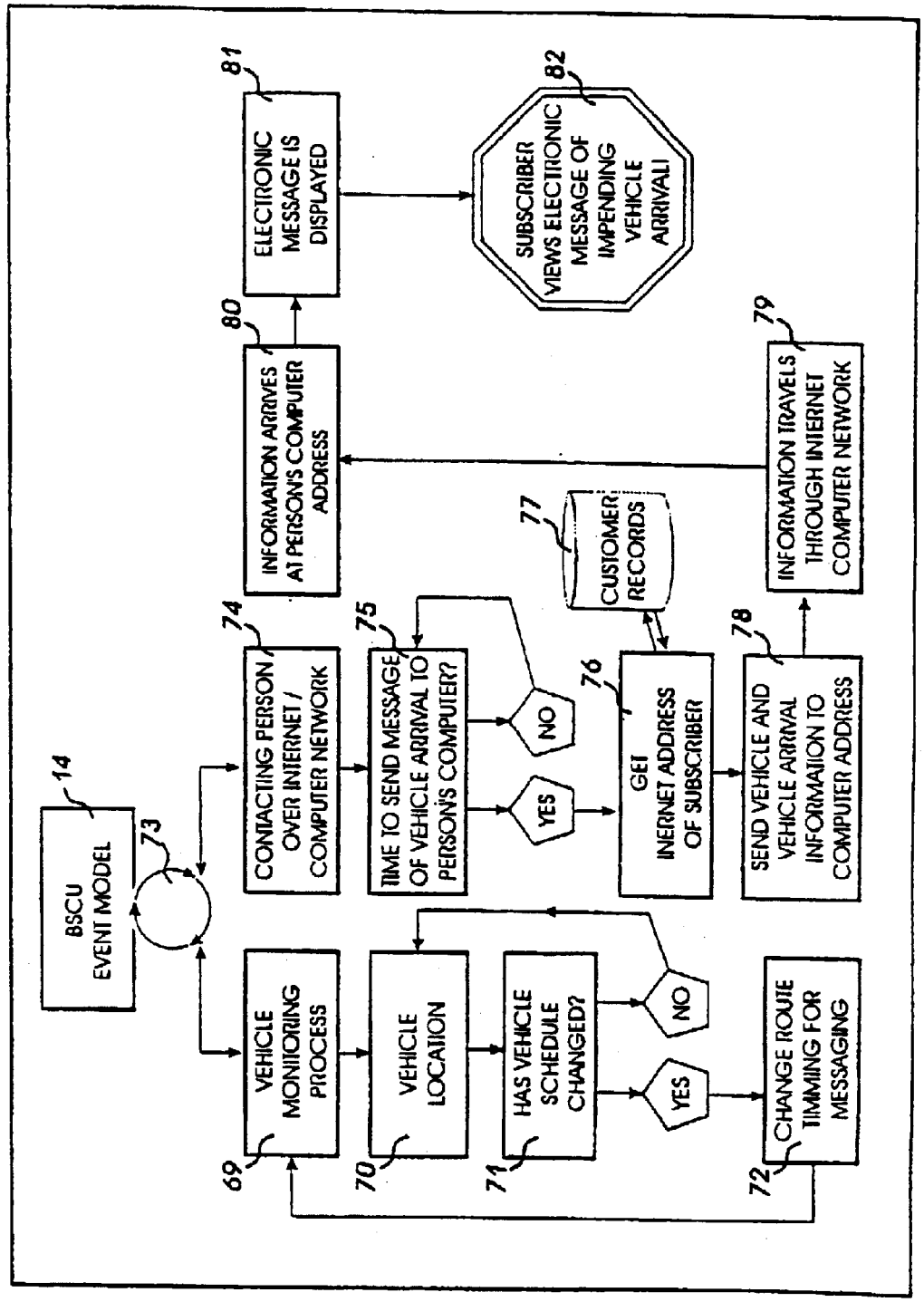
FIG. 3 is a high level flow chart diagram of the advance notification system of the present invention as applied to a delivery truck system, as indicated in this diagram, the advance notification system generally comprises a vehicle monitoring process for determining the location of vehicle's remotely, a messaging component for sending electronic messages when a vehicle reaches a predetermined point prior to the arrival at a person's stop, and a person's computer connected to a network (e.g., Internet) for receiving and displaying an impending arrival message.

The BSCU 14 also includes at least one, but preferably a plurality of telephone modems 27 (or other suitable communication interface) with associated telephone lines 27a, for making the communication links to users' computer locations, or in this case, the homes or businesses of the users receiving and sending packages. The user messaging program (FIG. 3) for the advance notification system can be designed to send messages to the computer address associated with homes or businesses of that user and allow the computer to display a message to be recognized as that of the advance notification system. Although, sending information from a BSCU to a user computer as described above is used in this example, other configurations are equally important. Another configuration includes a user computer 36, equipped with the BSCU software modules and a link to a computer network 27 for receiving vehicle location information FIG. 8.

The BSCU 14 modules and the PC 36 modules can be configured in multiple arrangements. In FIGS. 7, 8, 9, and 10, system modules are setup in different configurations to show examples of moving modules from remote BSCU 14 areas to a PC 36. A system setup normally requires a Wireless Transceiver (WT) 26 for communication with the VCU 12 on vehicles and a Vehicle Location Data Base (VLDB) 14a for storing vehicle location data and a Mapping Software Data Base (MSDB) 14b for positioning the vehicle's location onto maps and a Notification Data Base (NDB) 14c for activating an impending arrival message from a User Request Data Base (URDB) 14d. The URDB 14d stores each person's phone number/s, computer address, preferences for notification, package information, stopping deliveries when out of town, etc. The Person's Computer 36 linked to a computer network is for receiving impending arrival messages when vehicles are approaching. A person's computer can be equipped with standard messaging software associated with a computer network or additional software that activates additional audio and/or video when vehicles are approaching and an impending arrival message is received. Moreover, networking software provided by commercial Internet access providers with electronic messaging (E-Mail) capabilities, provides an easy method for a person wanting impending vehicle arrival information on their computer screen without adding proprietary software associated with an advance notification system. Actual messages can be forwarded to the Vehicle Control Unit (VCU) 12 when necessary and displayed on the Liquid Crystal Display (LCD) 33a for driver requests and delivery needs, requesting additional information, etc.

FIG. 8 illustrates a system configuration for placing more intelligence and computer processing capabilities in each person's computer 36, as opposed to FIG. 7 where the Base Station Control Unit (BSCU) 14 is controlling the Mapping Software Data Base (MSDB) 14b, the Notification Data Base (NDB) 14c, the User Request Data Base (URDB) 14d and in FIG. 7 these modules are controlled by each Person's Computer (PC) 36 linked to a computer network. By equipping each Person's Computer (PC) 36 with proprietary advance notification system software as illustrated in FIG. 8, different system configurations can be used for optimization and customization for the end user. Additionally, information sharing between modules on a person's computer 36, as opposed to more modules located at remote locations (FIG. 7) away from each person's computer, may, in some cases, not optimize performance. By locating system modules (proprietary software) on each person's computer, the Base Station Control Unit (BSCU) 14 loading can be minimized. Moreover, actual onscreen video and audio associated with the advance notification warning can be stored on a person's computer, with activation by a vehicle's location as it reaches a predefined location, time, or prior stop. This configuration allows vehicle location information to be received by the Wireless Transceiver (WT) 26. The live vehicle location information is made accessible through the Vehicle Location Data Base (VLDB) 14a. The (VLDB) 14a also analyzes route data by averaging past routes with time from one location to the next. Time of day, day of week and month are also determining factors needed for determining the average travel time from one location to the next. The protocols used for the computer network communication between the modules located on a person's computer 36 and the modules located at a remote site 14 for vehicle location 14a are normally as follows. (a) The Person's Computer (PC) 36 contacts the Base Station Control Unit's (BSCU) 14 Vehicle Location Data Base (VLDB) 14a when vehicle location is needed for monitoring a vehicle for an advance notification warning. Timing cycles are used for vehicle location updates and preferences can be set for communication optimization. (b) The Base Station Control Unit (BSCU) 14 sends vehicle location to the Person's Computer (PC) 36 when a predefined time period expires, the estimated vehicle location is not correct with the actual vehicle location, when a vehicle sensor is activated, or when loading or capacity allows for communication to take place. Additionally, vehicle location 14a information can be sent over a computer network and/or Internet at predefined times and automatically received by each Person's Computer (PC) that is linked to the computer network/Internet. A particular vehicle's location, in-between communication cycles, is established by past vehicle location records and average time needed to travel from one location to the next. Moreover, some configurations only update vehicle locations at a predefined time of day.

Figure 10:
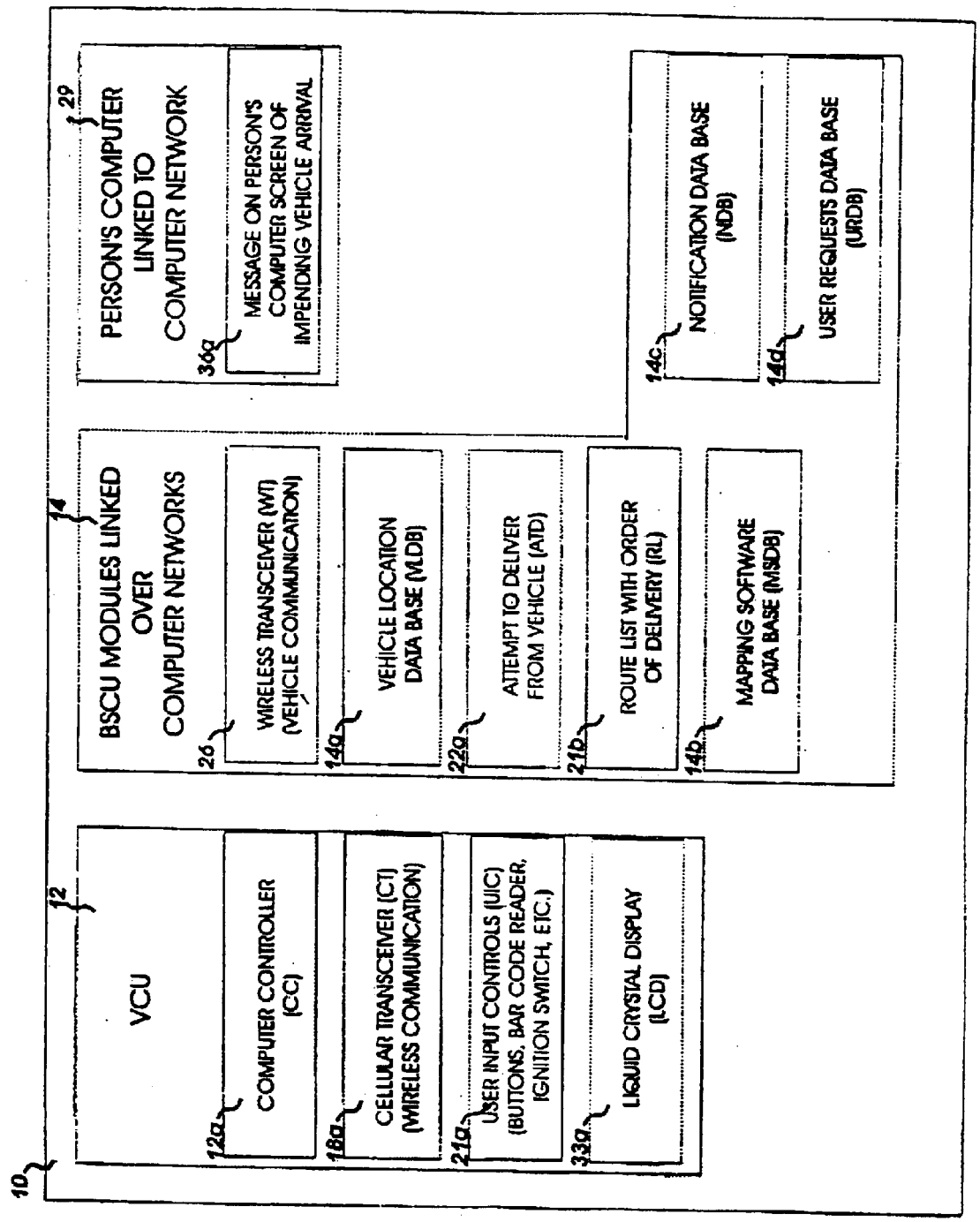
FIG. 10 is another high level modular diagram of the overall operation of the advance notification system described as system configurations and necessary to show the differences of individual modular configuration preferences of each system. Additionally, this configuration is a simple diagram of an advance notification system, designed to determine a vehicle location by a stop, or delivery at a particular location, without GPS or normal location devices on the vehicle. This system determines vehicle location from a delivery list and acknowledgment of each delivery to the BSCU. The address and distance to the next stop is determined by routing software, mapping software, past records of travel, and actual traffic data systems, compared in the BSCU to determine time, distance, and actual vehicle location prior to a user stop. The ability to notify a user computer as the pre-selected advance notification preferences are activated allows the system to notify the user of a message on a computer screen and/or by audio means when a vehicle is approaching. Other combinations of the configurations (FIG. 7 through FIG. 10) are used based on application, business, and customer needs.

FIG. 9 and FIG. 10 are illustrations of an advance notification system configuration without the use of a Global Positioning System (GPS) as shown in FIGS. 1, 2, 7, and 8. These configurations illustrate a system for notifying a Person's Computer (PC) 36 by tracking vehicles' package delivery attempts, by monitoring User Input Controls (UIC) 21a and each truck's Route List with order of delivery (RL) 21b. By monitoring each vehicle's attempted delivery and their particular route order, advance notification can be set for a prior stop, a particular estimated location using mapping software and/or past records of vehicle times associated with package delivery stops and time between. The BSCU 14 modules can be networked between remote locations and a PC 36. These configurations allow the BSCU 14 to run all or some of the proprietary software and messaging capabilities for sending or displaying impending arrival messages to or on a PC 36 before a particular vehicle arrives. Additionally, setting preferences can be achieved by connecting a (PC) 36 to the data stored on the BSCU 14, or storing the preferences on each PC 36.

The messaging program (FIGS. 3, 4, 5, 6, 8, 9, 22, and 25) associated with the advance notification system 10 may also be configured to make the user computer 36 exhibit a distinctive audio sound, or audio message, so that the recipient can be away from the computer and receive the message. The message may also be in the form of a code for activation of advance notification software for displaying messages or direct a modem link for playing audio from a broadcast. A standard activation or broadcast of a message is in signals, sent to a computer with a modem attached, over a telephone line and typically in the form of tones. The message is asserted over the telephone line 29, for accessing a computer address and establishing a communication link to a user computer 36 over a telephone line 29.

Implementation of an advance notification system over a computer network may be accomplished by purchasing a networking feature as a software and/or hardware package or in the form of a software program with communication capabilities and network service provider package or links to networks. One form of a network link is in the form of an Internet service provider. This service is widely available to the public. Generally, Internet service providers operate network computers for linking computers with other computers, now usually over normal telephone line interfaces, but greater capacity handling communication links including fiber optics, cable television networks, and digital wireless networks may also be used. When a computer is connected over a telephone line to an Internet service provider the telephone line link travels from telephone lines linked to the Internet service provider through the telephone company switch to the user computer.

The feature for establishing the Internet connection is sold to the public under several different commercial trade names. Examples are as follows: America On Line (AOL), Microsoft Network (MSN), AT&T WorldNet Service, CompuServe and many more.

The package addresses are normally associated with the package identification numbers in many ways. For example, the package address may be added to the package by additional bar coding when the package is shipped or, the user sending or receiving a package may connect to the BSCU over a computer network or telephone and add an address (computer network address) to a package identification number for activating an advance notification message associated with the impending arrival of a vehicle carrying this package.

II. System Operation

A. Initialization

Initially, vehicle stops for each vehicle 19 are programmed into the advance notification system 10 by entering the respective package addresses. As the vehicle 19 is loaded with packages, the package addresses are considered as the vehicle location stops by the system 10. The actual addresses of the packages are normally scanned into a database program using a bar code scanner device (United Parcel Service tracking numbers are of the following formats: IZ 999 999 99 9999 999 9, 9999 9999 999, T999 9999 999, or D999 9999 999 with spaces and dashes ignored). The actual vehicle number (which delivers or picks up a package from a business or resident, and not necessarily mid-point vehicles) and package addresses are recorded into the BSCU 14 when packages are sorted to a specific delivery vehicle or truck or entered into the BSCU 14 by the user sending or receiving the package. Additional vehicle stops may be added when requests to pickup packages are received. The request to pickup a package can be downloaded to the VCU 12, with a display for the driver to accept or return for another driver or time/day. If the vehicle driver enters route or package data (the order of delivery, packages, or changes from a computer generated delivery list) the data is then uploaded to the BSCU 14. The timing and package delivery locations are recorded in the BSCU 14 during the initialization of the system 10 and used as a reference for determining locations from impending arrival message points. This information accesses the computer network to inform a user computer when a delivery vehicle 19 is at a predetermined time, mileage, street location, and/or last delivery away from a vehicle stop. In the preferred embodiment, determining the location of a delivery vehicle 19 is accomplished by sending the vehicle location of a delivery vehicle 19 from the time the vehicle departs and/or starts its route.

The timing information is recorded during the initialization and daily recording of vehicle locations with time, and the system 10 is used as a reference during the usual operation of the system 10 for the purpose of determining whether a delivery vehicle 19 is at a predetermined location or time from a delivery stop. Other reference information may be obtained from software for mapping, for example, streets, vehicle speed limits, and traffic flow.

However, it should be emphasized that other methodologies could be utilized for determining the communication to or from a location sensor of a delivery vehicle 19. For example, the GPS sensor 25 may communicate with the BSCU 14 when the delivery vehicle is in motion (as indicated by phantom lines in FIG. 1), additional VCU timing cycles for communication controlled by the microprocessor controller 16. At particular times, the longitude and latitude readings or optionally a Universal Transverse Mercator (UTM) grid system number, could be sent when the vehicle is in a stationary position, the communication cycle controlled by the microprocessor could be slowed down to one cycle until the vehicle is in motion again, compared to reference longitude and latitude or (UTM) information readings which were obtained on a cycle per minute when the vehicle is in motion 10. In this way, the determination of the location of a delivery vehicle could be accomplished by less communication to and from the VCU and BSCU 14.

Another methodology, which could be utilized for the timing cycles of communication to and from the delivery vehicle 19 involves interfacing the BSCU 14 with wireless communication protocols. The BSCU 14 system is equipped with communication software for contacting each VCU 12 and asking for GPS longitude and latitude information or Universal Transverse Mercator (UTM) grid system information from the VCU 12 on each delivery vehicle 19. The vehicle location may be polled in normal communication protocols, such as contacting each VCU 12 in a first to last cycle with vehicles in motion or on a normal clock cycle for minimizing communication to and from the VCU 12 and BSCU 14. The received delivery vehicle location (longitude and latitude or Universal Transverse Mercator (UTM) grid system information) from the VCU 12 to the BSCU 14, is calculated from the time and/or distance away from a stop using mapping technology for road distances, and additional speed limits, actual traffic averages, and other means for better calculation accuracy.

B. Regular Operation

Figure 13:
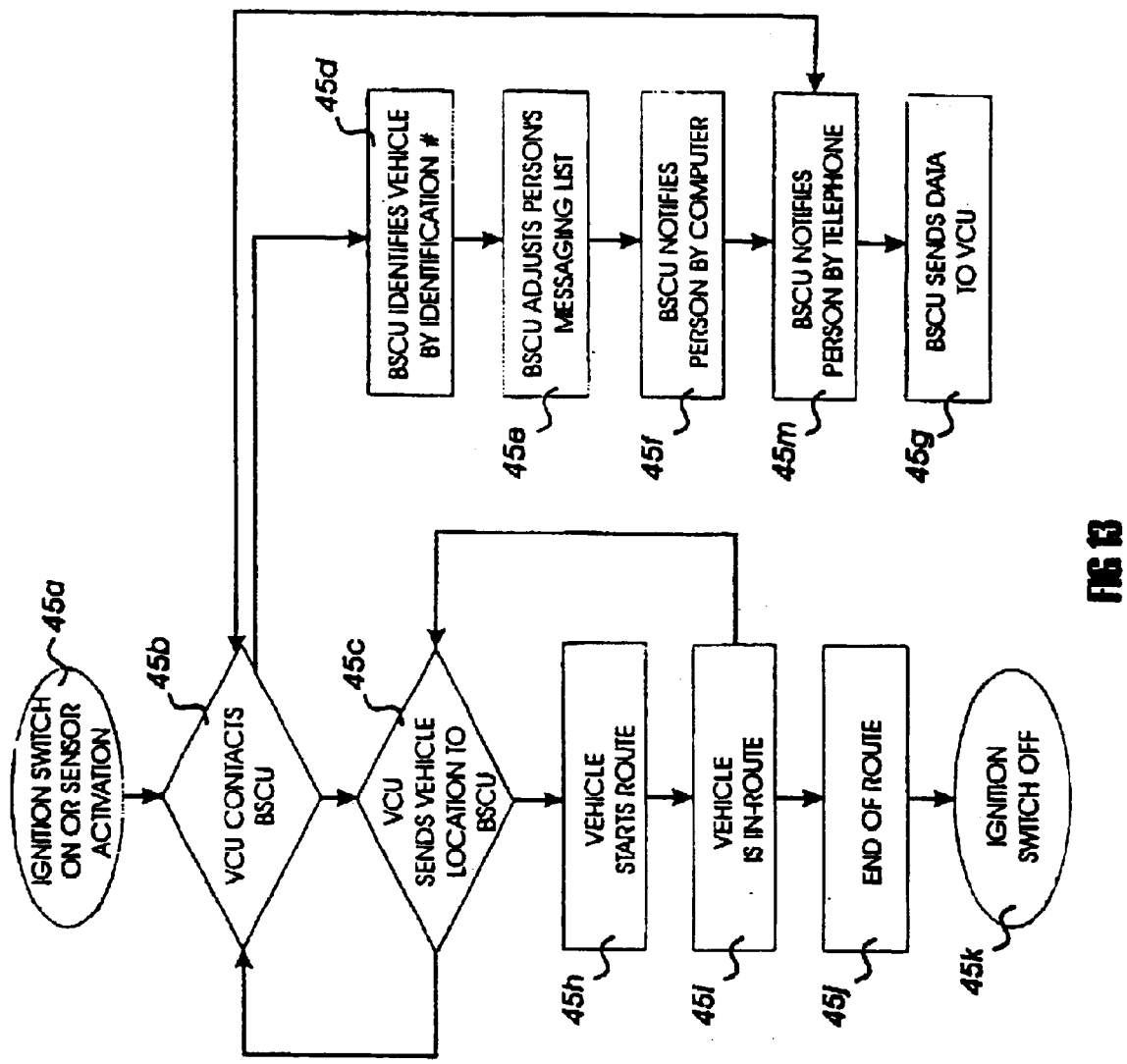
FIG. 13 is a flow chart of a vehicle control process for the VCU and BSCU.
Figure 15:
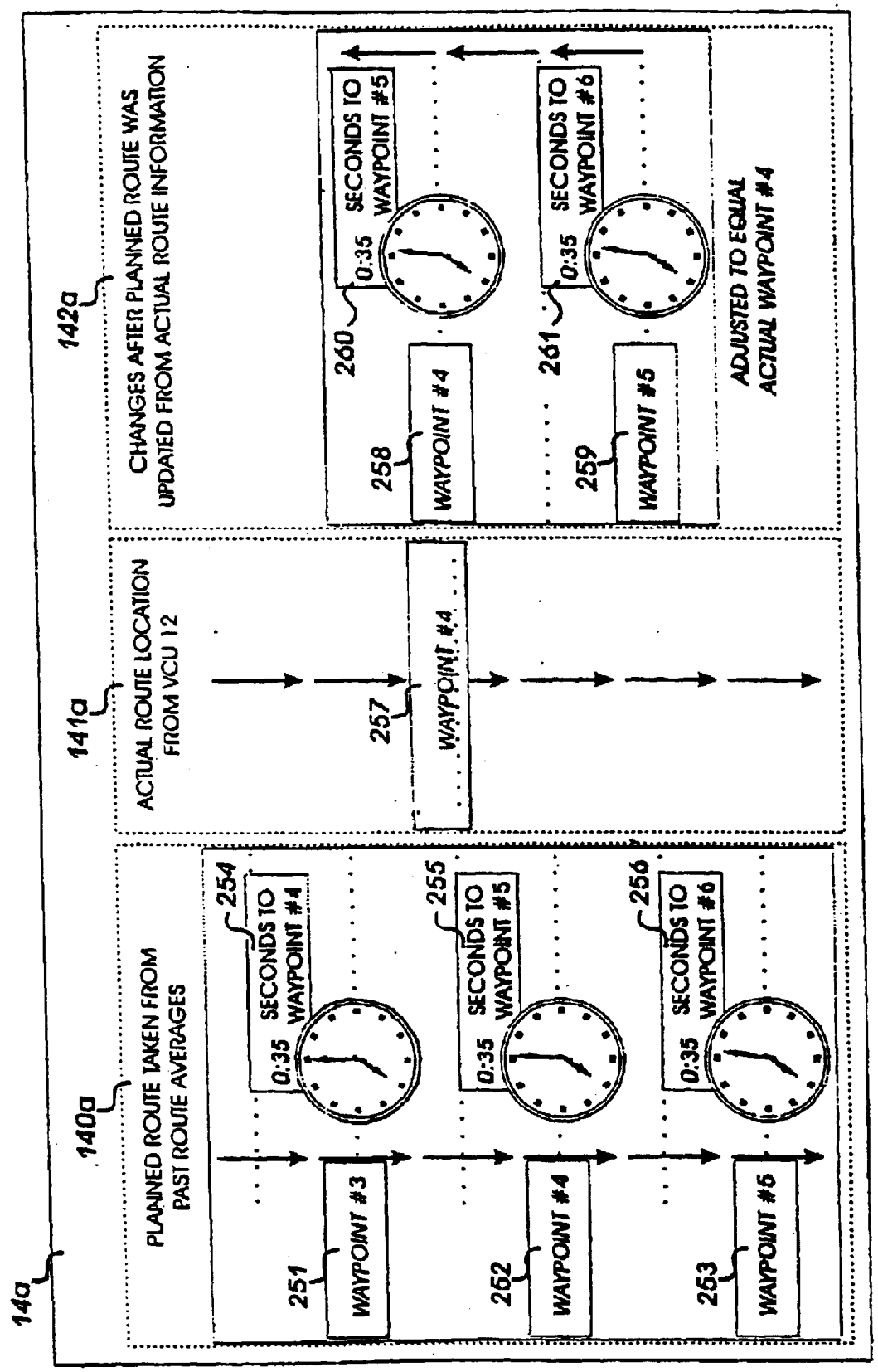
FIG. 15 is a diagram showing how to determine route stop timing events with past route averages and actual live inputs from VCU's for a combined calculation for better estimations of a vehicle actual location between communication updates and improved accuracy of impending arrival messages.

The overall operation of the advance notification system 10 will be described with reference to FIGS. 13 and 15. FIG. 13 sets forth a flow chart showing the overall operation after the system 10 has been initialized. FIG. 15 shows an example of a schedule of possible events and the interactions, which might occur between the VCU 12 and the BSCU 14 as the vehicle 19 travels along its route and makes its scheduled delivery stops.

Figure 16:
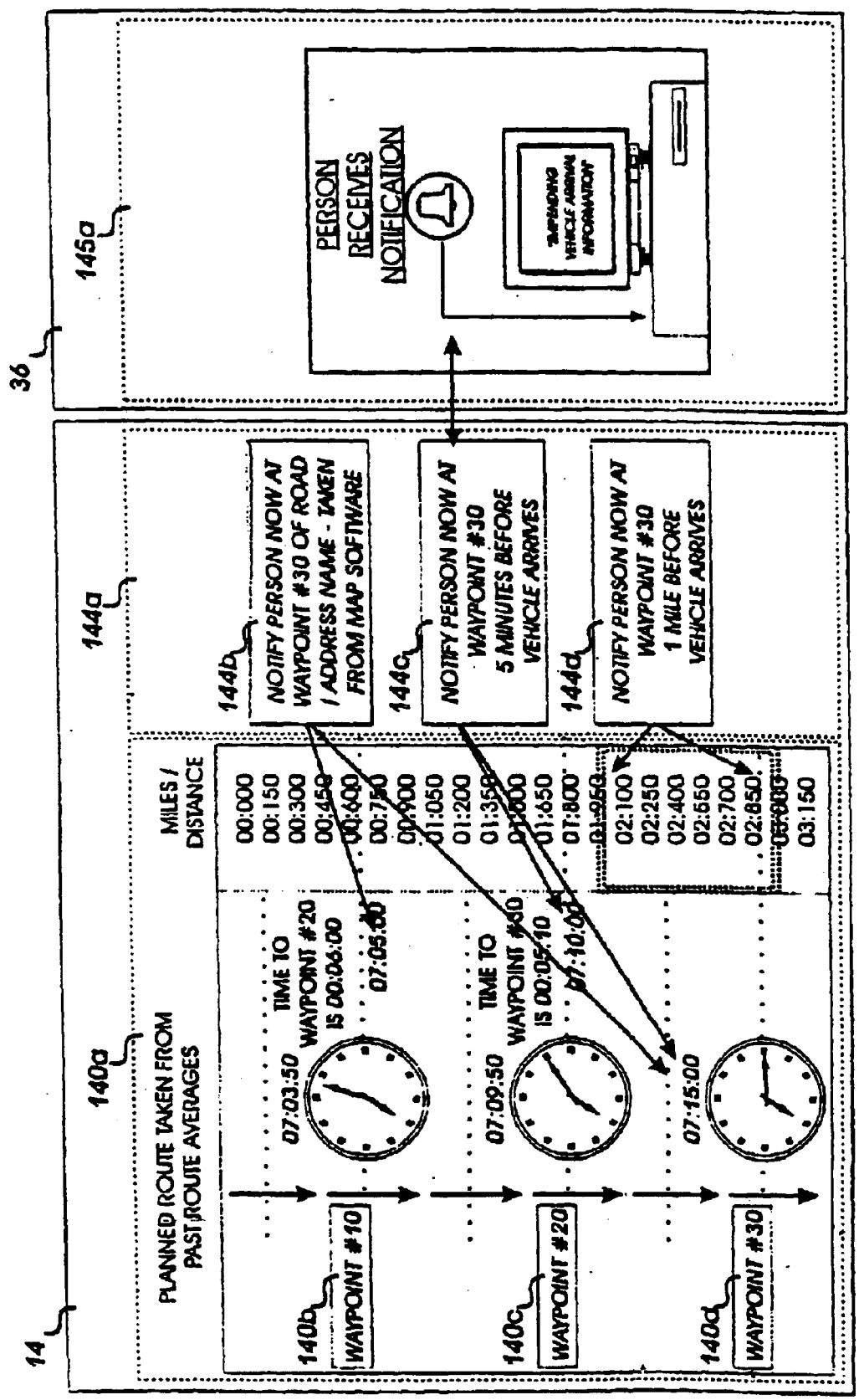
FIG. 16 is a diagram of an event schedule for sequencing and activating of impending arrival messages from predetermined locations, time before arrival and distance before arrival of a particular vehicle.

In FIG. 13, the right-hand column illustrates the sequence of events for the BSCU 14, and the left-hand column illustrates the sequence of events on the VCU 12. In the efforts to lower overall communication between the VCU 12 and the BSCU 14 when large vehicle fleets are equipped with the advance notification service, actual vehicle locations in the BSCU are based on past route comparisons, as shown in FIG. 16. FIGS. 14A and 14B are illustrations of a time line for delivery stops and planned route-timing events for each stop. The time line has the following time designations: when the route should start 606, time to each stop 605, and the ability to change the route list 615 when the VCU location sensor determines a difference.

First in FIG. 13, the delivery vehicle ignition is switched on, as indicated at block 45a. At the beginning of each route, the system 10 could be configured to automatically initialize itself upon power up of the VCU 12. The delivery door opening or a bar code scanner initiating communication, or both, could activate the powering up. Further, the BSCU 14 could be programmed to initiate itself after the vehicle 19 moves to a predefined distance or location, such as a waypoint (longitude and latitude or Universal Transverse Mercator (UTM) grid system information area), determined by the GPS 25. This initialization action causes the microprocessor controller 16 to inform the BSCU 14 of the vehicle location and the beginning of its route. The foregoing action is indicated at flow chart block 45b (FIG. 13). Alternatively, the vehicle driver can press the start/reset switch 21 on the VCU 12 system menu 21 to initialize the BSCU 14 for restarting the route tracking sequence. Additionally, driver/user options may be accessed by the user controls on the VCU 12.

After initialization of the VCU 12 to the BSCU 14, the display module 33 on the VCU 12 preferably displays stop and location information. The stop location continuously (FIG. 40) runs on the display as the delivery vehicle 19 progresses along its route.

Next, as indicated at flow chart block 45c (FIG. 13), the VCU 12 determines, continuously or periodically, the location of the delivery vehicle 19 by the GPS 25 and sends the BSCU 14 (FIG. 1) the location information in view of the planned route or stop sequence data (derived from initialization of the packages on the vehicle and/or mapping technologies). In the preferred embodiment, the BSCU 14 at least compares the delivery vehicle current location with the planned route location derived from the logistics of current mapping and route planning technology (FIG. 10) for determining time and/or distance away from a user stop. By comparing previous vehicle routes with time differences between waypoints (longitude and latitude points or Universal Transverse Mercator (UTM) grid system information points an average route timing data base may be used to calculate the time to travel from actual vehicle locations to the impending arrival time at a particular stop. Additional traffic flow measurements may be added by comparing time of day, actual live traffic flow sensors, or other methods.

Figure 31:
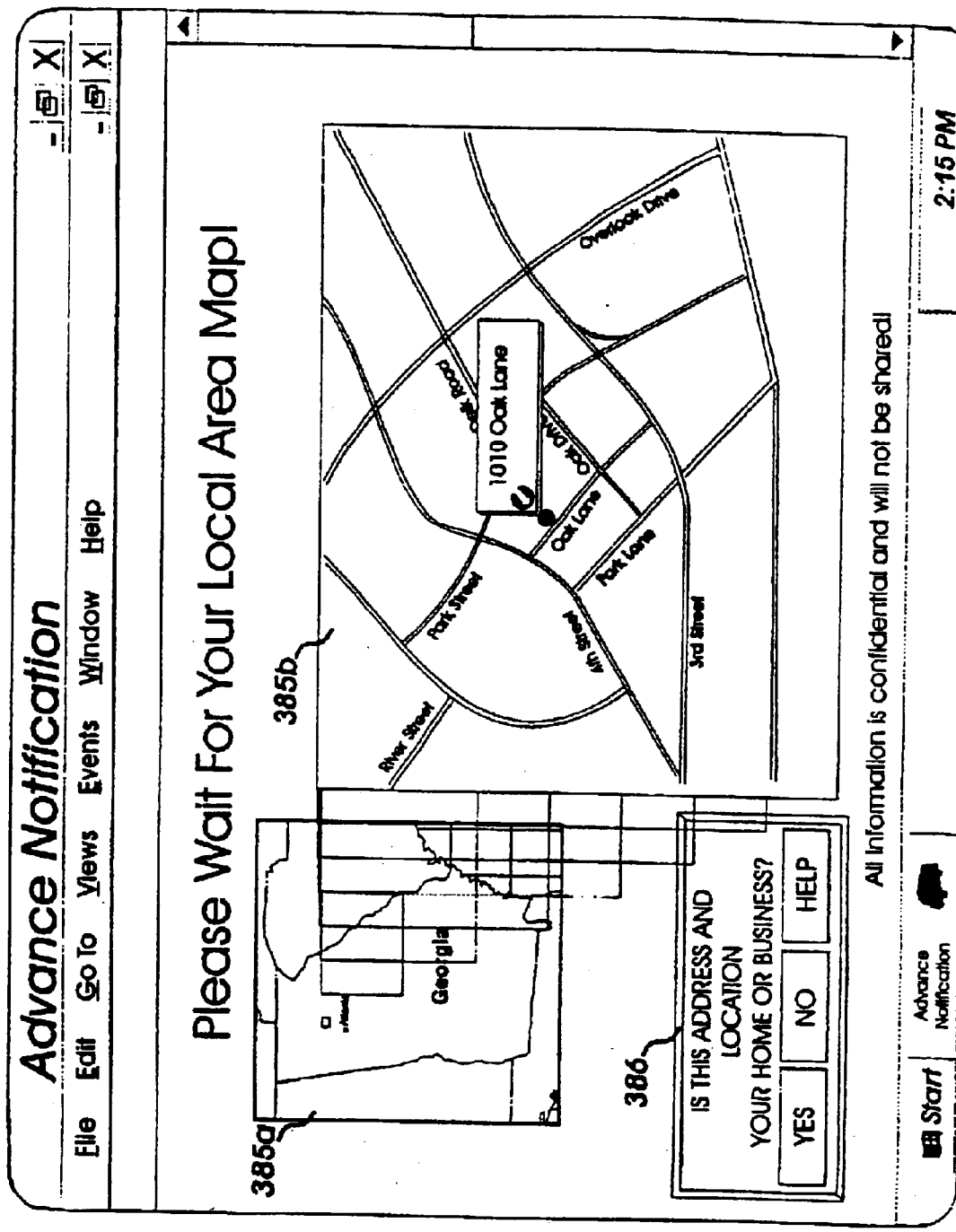

The method for determining a distance from a user stop for activating an advance notification message may be accomplished by software at the BSCU 14 or the user computer. The user interactive software shows the current user location on a map (FIG. 31). The user places road markers FIG. 38, a circle perimeter FIG. 36, a grid perimeter FIG. 37, which allows the vehicle to determine actual points at each road for a message of the impending arrival of a vehicle, etc. The actual vehicle location activates the impending arrival message when the location matches the selected choice from the user preference data base. Furthermore, the actual order of vehicle stops may be used to determine if the vehicle is entering a selected area on more than one occasion. This comparison provides a distinct advantage by increasing the accuracy of a vehicle impending arrival message by sending the message after the last entry of a vehicle into the user-predefined area. Another advantage of comparing the delivery order list to the user defined areas for notification is the addition of the number of deliveries before reaching the user stop to the impending arrival message, e.g., "UPS has 3 packages for delivery and is 1 mile from your stop at this time. The vehicle has 2 other stops before reaching your location".

While the delivery vehicle actual locations are compared to the existing travel time and distances (FIG. 15), the BSCU 14 is also storing actual location events (time between longitude and latitude or Universal Transverse Mercator (UTM) grid system information points) for averaging with the planned route/travel time over distances. When the BSCU 14 begins sending messages to user computers at a predefined time, distance, location, and/or prior stop, for the impending arrival of a delivery vehicle 19, each particular user computer 36 receives an electronic message and is displayed on their screen, as indicated in flow chart block 145a (FIG. 16). In one example, as shown in FIG. 16, at waypoint number 20 (140c) along the delivery route, the BSCU 14 places a message (144c) to a user computer at waypoint 30 (140d) of the delivery vehicle actual location. A second example in FIG. 16, shows a user being notified when the vehicle is one mile away (144d) from waypoint 30 (144d). The third example in FIG. 16 shows a user being notified when the vehicle is at a predefined street location (144b). This is accomplished by comparing street mapping software with included longitude/latitude or Universal Transverse Mercator (UTM) grid system information coordinates, notification requests, and the (BSCU) 14 vehicle location data base (VLDB). As shown in the configurations (FIGS. 15 and 16), time is used to cross reference travel between locations. Determining vehicle location, between communication updates, is achieved by comparing times of prerecorded route information, actual live traffic monitoring systems, and statistical data.

Figure 30:
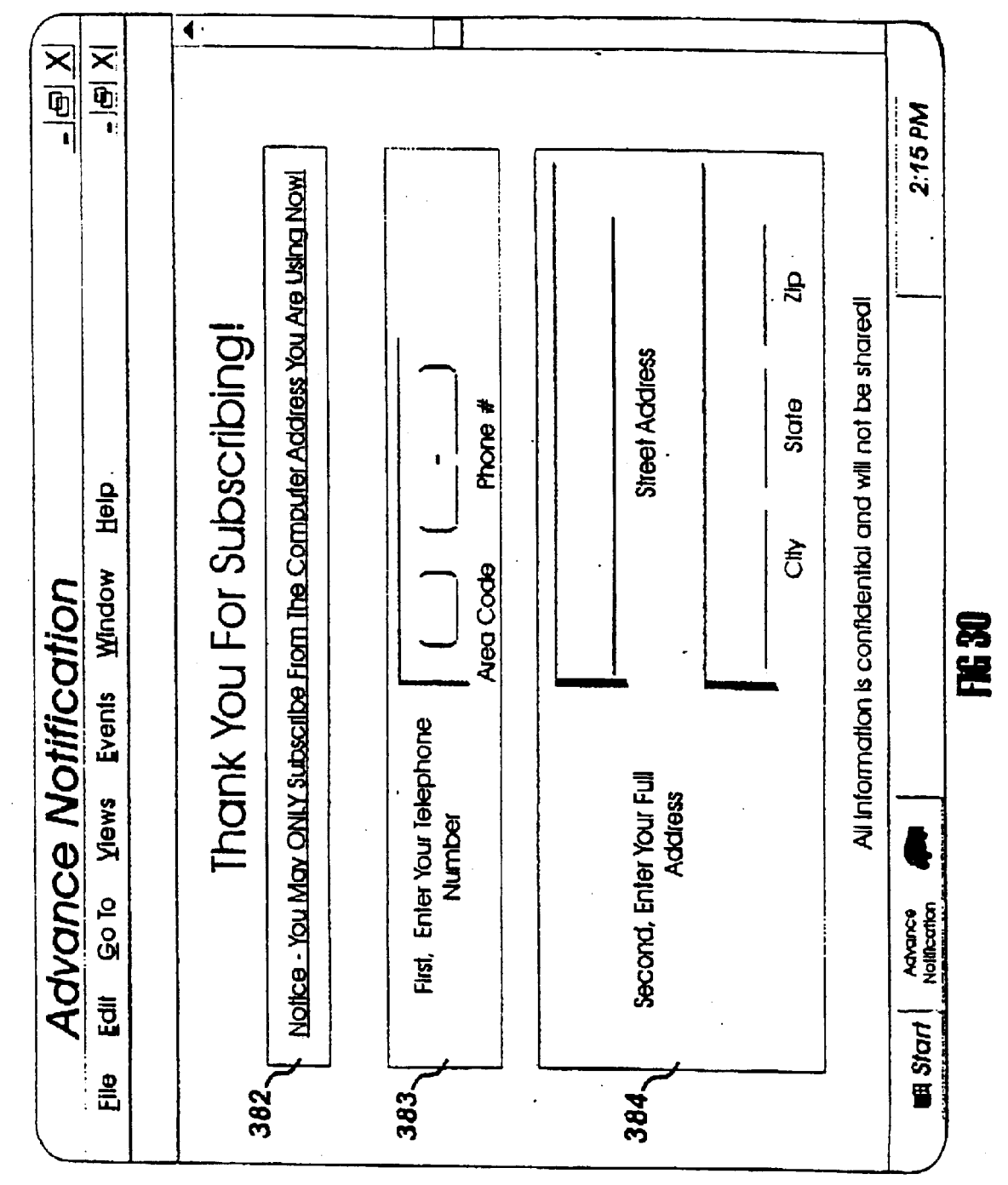

Additionally, preferences for activation of advance notification warnings are shown in FIGS. 33, 34, 35, 36, 37, and 38. After a preference is selected from the end user, the data is normally placed into the Notification Data Base (NDB) 14c after calculations have been made from the address entered into the BSCU computer from a network connection as shown in FIGS. 30 and 31, or ANS software residing on their computer, with or without a network connection. The other calculation of information is in finding an actual longitude/latitude or Universal Transverse Mercator (UTM) grid system information coordinate of each home, business, street address, or most other places on the earth's surface, which can be found with existing mapping software. The Universal Transverse Mercator (UTM) is one grid system that eases the conversion of GPS readings to map data.

Another example compares the list of stops with the vehicle location and determines the last occurrence before the delivery vehicle will cross the predefined marker points to activate the impending arrival message.

Figure 17:
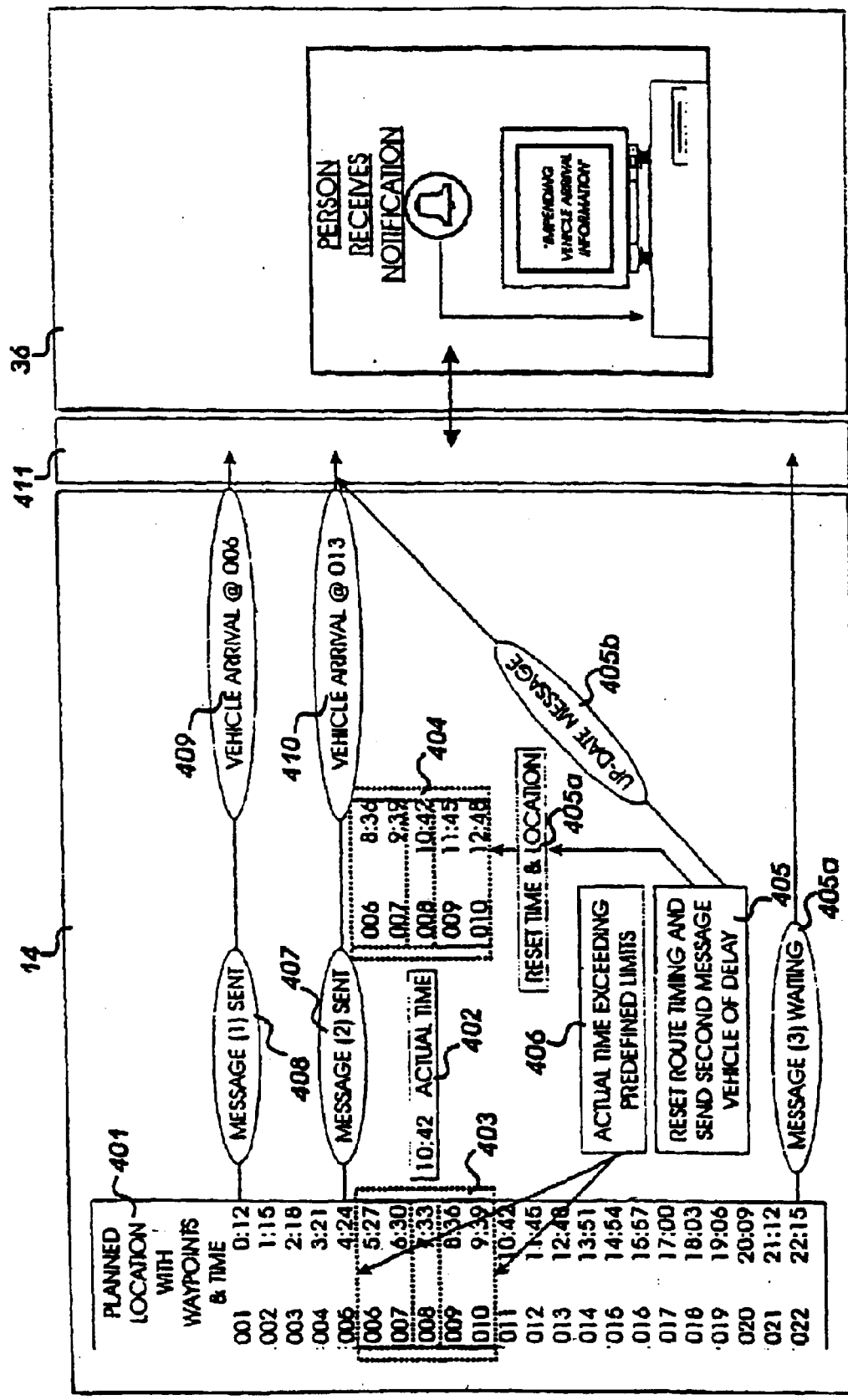
FIG. 17 is an example diagram of a messaging event sequence when sending messages to users before the vehicle arrives. Moreover, it shows an update message used when a particular vehicle is delayed. The update message is used when a person is notified and waiting on a vehicle to arrive, but the vehicle is delayed after passing the activation point for sending the first message.

Additionally, the BSCU 14 adjusts its messaging activation to an actual stop point at each user stop. This allows each user to be notified in accordance with the selected predefined time, distance, location and/or last stop, for example, "The XYZ Delivery Company truck is currently at the corner of Delk Road And Peachtree Street and is approaching your stop" block 415 (FIG. 18). A second message 419 (FIG. 18) will also be sent when the vehicle is detained outside of the predefined system preferences for being late for a stop after sending the initial message 415. Furthermore, in this configuration, a third message is sent as the vehicle arrives at the stop 424. The Flow Chart 399 (FIG. 18) shows an example of the messaging sequence from the BSCU to each user. The example also shows the activation methods used for determining when a vehicle is late and a second and/or third message should be activated and sent to the person's computer. However, when the BSCU 14 determines that the delivery vehicle 19 is excessively late after notifying an individual of an impending arrival at a particular stop, the BSCU 14 resets the message for a route update sequence (FIG. 17) that informs the user of an unexpected occurrence (e.g. a traffic jam), as indicated at flow chart block 399 (FIG. 18). The planned route (FIG. 17) 401 is updated by the actual route information when the preferences 403 are exceeded and the actual time exceeding the predefined limits 406 are reached. The route update is complete when the new actual time 402 resets the planned time associated with the location of the vehicle. The route timing update is shown in block 404 (FIG. 17). After each route update, a message update routine determines if an end user needs a second or third message. The activation of a second message is normally determined by the planned location predefined limit 403, or an individual limit predefined for sending a second or third message. The illustration (FIG. 17) 406 shows an automatic sequence for activating a second message 405 and sending a second message 405b, when each route is reset. A more detailed description (FIG. 18) 399 shows how the activation of a second message is determined.

Figure 41:
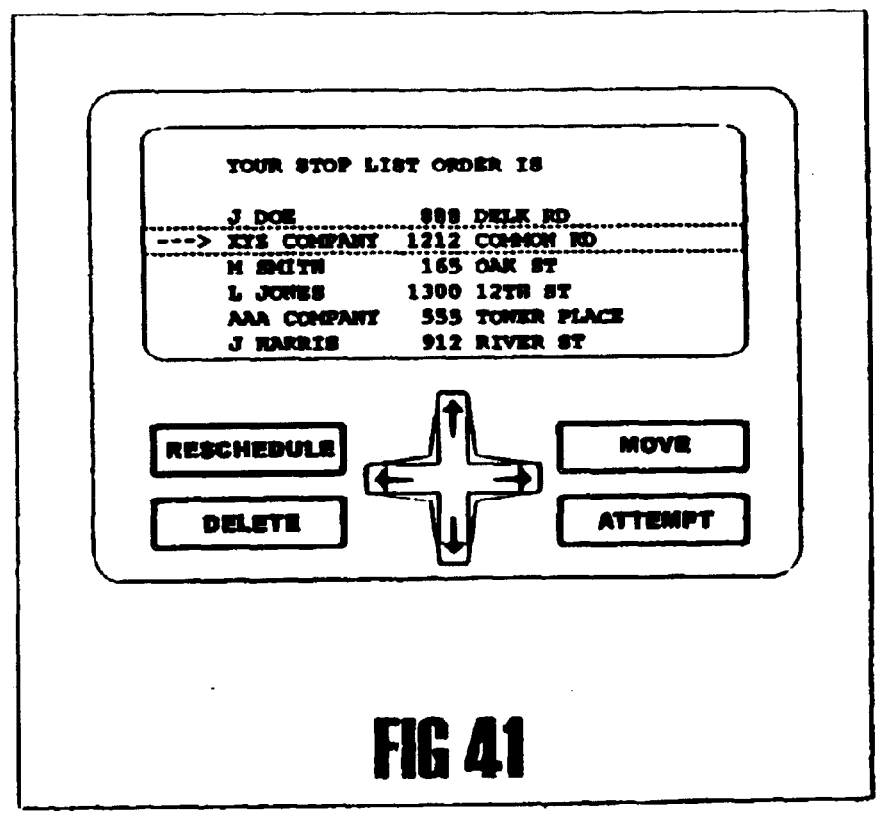
FIG. 41 is a diagram and example of a vehicle control unit (VCU) with a display area and control buttons. The display shown in this illustration is displaying the vehicle's route list order and the next stop/delivery to be made, as highlighted.
Figure 42:
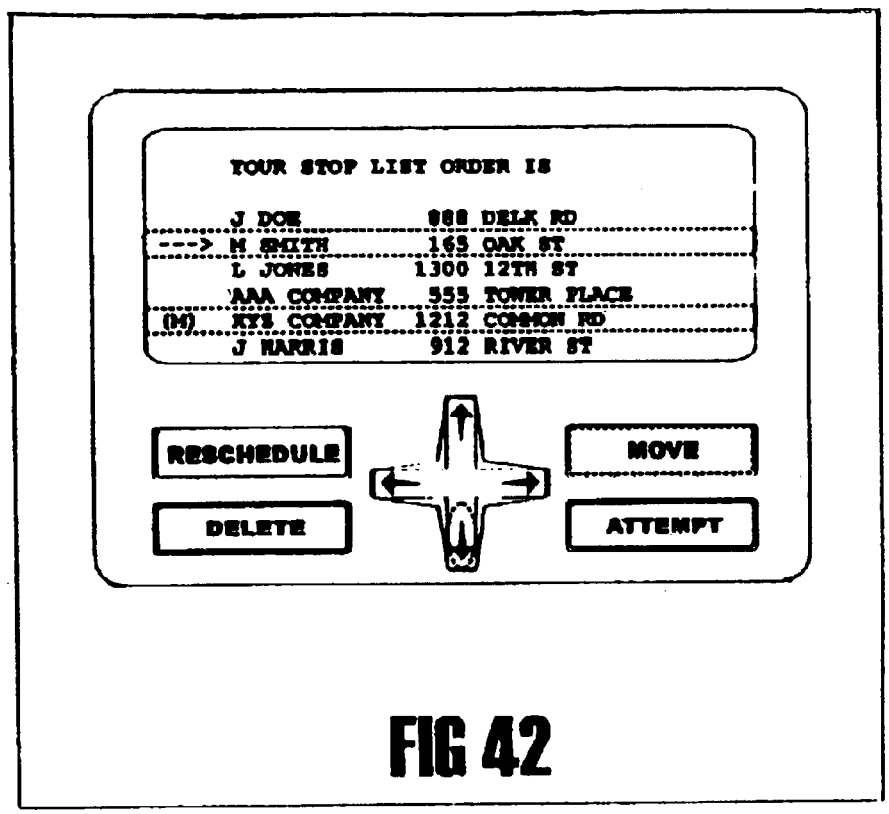
FIG. 42 is a diagram and example of a vehicle control unit (VCU) with a display area and control buttons. The display shown in this illustration is displaying the vehicle's route list order with next stop/delivery to be made, and a stop that has been moved (lower highlighted area with (M) on left side) from an earlier route stop, as previously indicated in FIG. 41.

As indicated at flow chart block 45f (FIG. 13), the BSCU 14 again determines if the delivery vehicle 19 is on the planned route and stop schedule by analyzing the vehicle location 25 (FIG. 1) and comparing it to the actual stops on the list. Preferably, in this regard, the BSCU 14 at least compares stops on the driver list and the actual location of stops made by the driver to determine if the driver has changed from his route list order. Other stops, such as pickups (FIG. 44), are displayed on the vehicle VCU display, and changes to the route list (FIGS. 42 and 43) order are available to the driver via push button entry. Additionally, so the driver acknowledges a new entry or route update, the VCU may be equipped with an audible sound, such as a buzzer, tone, or different voice recordings for announcing each event without the need for the driver's eyes to look at the VCU display when driving. Accordingly, requests for package pickups are processed in the BSCU 14 and sent to the appropriate vehicle VCU 12 and scheduled into the drivers' list of stops (FIG. 41). The driver has the final opportunity to reschedule (FIG. 43) or move (FIG. 42) an added stop through the VCU 12 push button menu.

Figure 14:
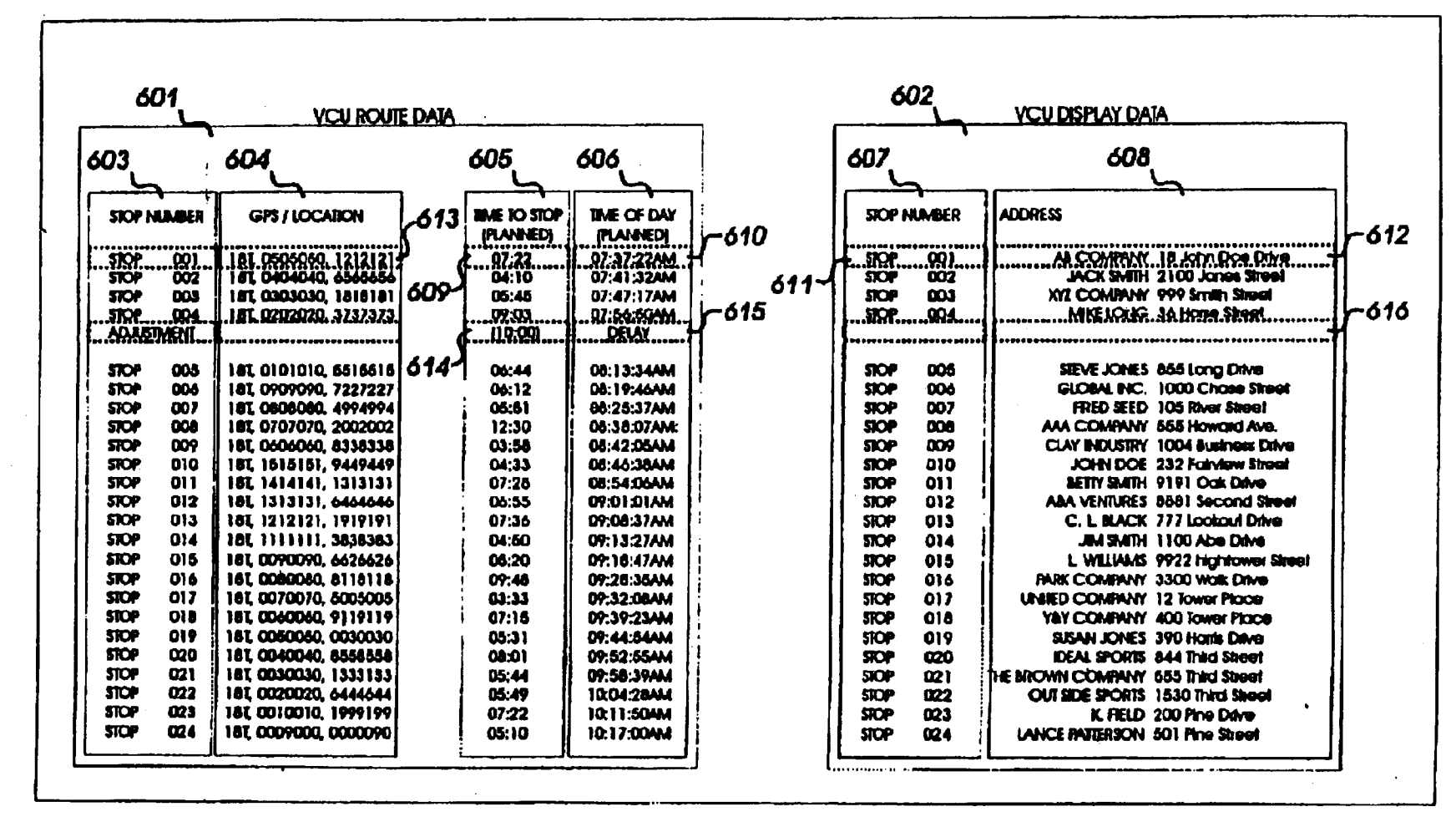

For example, FIG. 14 shows a finished delivery route that started at seven thirty. After starting the delivery route, the delivery vehicle arrives at stop number 001 at 07:37:22AM 610 after driving seven minutes and twenty-two seconds 609. Stop 001 takes two minutes to unload all the packages and another two minutes and ten seconds to reach stop 002 at 07:41:32AM. Stop 003 takes five minutes and forty-five seconds from the time the vehicle arrived at stop 002. The arrival at stop 004 is on time but the delivery takes an unexpected ten minutes 614 and causes a ten-minute delay 615 in the scheduled route. The scheduled route list was rescheduled by the delay 615 of ten minutes and stop 005 was reached ten minutes later than the scheduled planned route, at 08:13:34AM. The VCU display in FIG. 14 and block diagram 602 is an example of the information that the driver sees and uses. The other route information shown in FIG. 14 and block diagram 601, is not needed for driver interaction and is a VCU 12 automatic component for lowering the wireless communication between BSCU 14 and the VCU 12. Although not disclosed in this example, additional directions with or without map displays, estimated route completion times, on or off normal schedule indicators, and others may also be displayed on the VCU display module 33. Just prior to leaving a stop, the driver views his next stop on the display module 33. Additional directions can be activated by the drivers' input or automatically after a predefined time period or a predefined distance the vehicle has traveled. The automatic display changes may start when the driver arrives at a stop by displaying the next location. The display shows the next address until the vehicle has started moving and the display cycles between the next stop's address and a map display showing directions. The display continues to cycle until the vehicle arrives at the next stop, then the sequence repeats.

The vehicle location and the communication of the vehicle location from the VCU 12 to the BSCU 14 are determined by both the BSCU 14 and the VCU 12 for lowering the amount of wireless communication. As previously explained the VCU 12 can be programmed to compare a planned route with an actual route and communicate to the BSCU 14 when the differences exceed the predefined limits. The VCU 12 can also be programmed by the BSCU 14 for communication cycles. The cycles which can be programmed for acknowledgment of sensor activation and communication from the VCU 12 to the BSCU 14 can only be made when the vehicle has left stop 1. The display module 33 preferably displays "next stop" followed by directions and/or messages received from the BSCU 14. The foregoing feedback signal from the vehicle in motion may be replaced or generated from other sensors, such as the driver seat, the ignition switch, placement of the vehicle in gear, etc.

Figure 27:
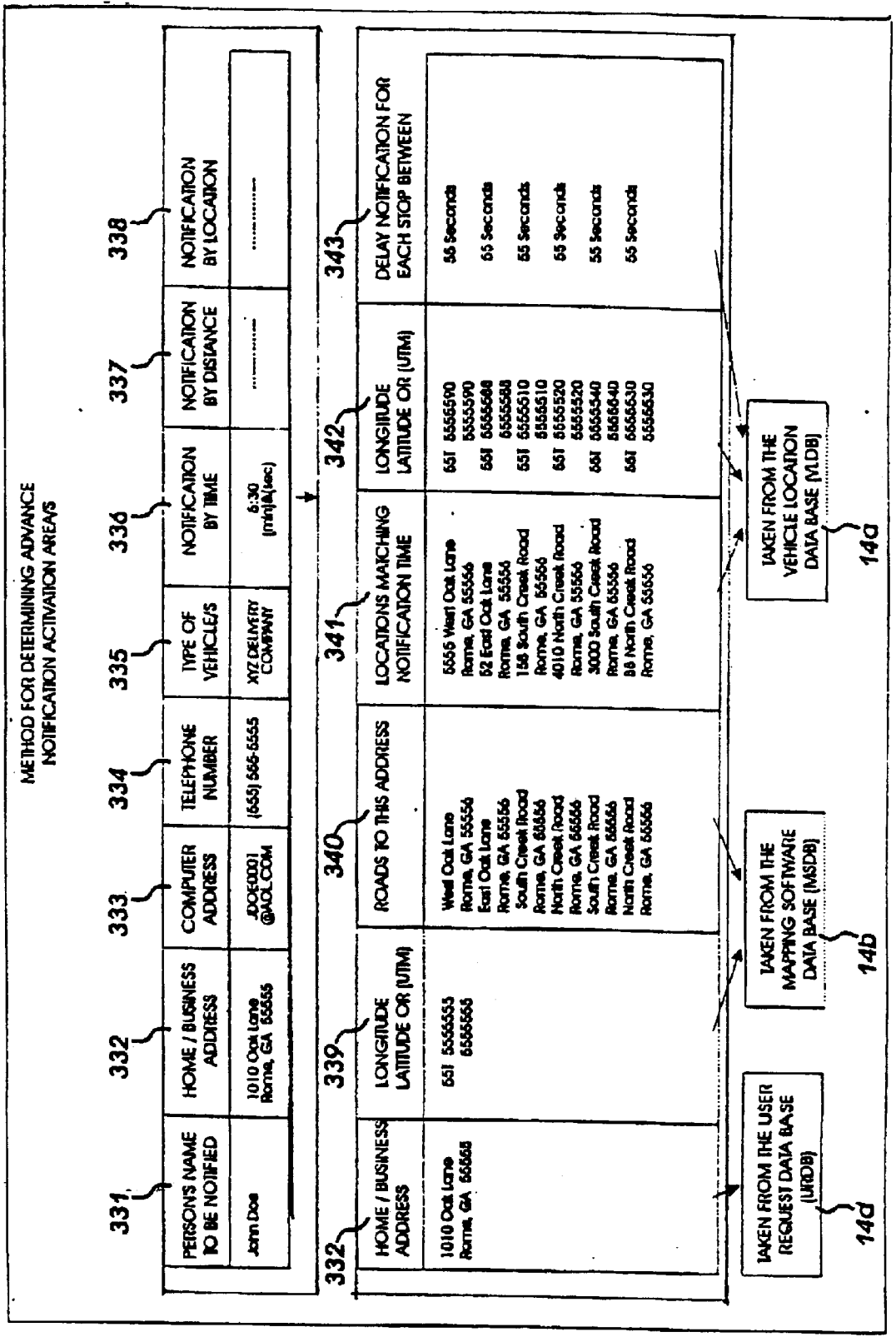
FIG. 27 is a table used for determining activation points for impending arrival messages. The roads and locations are normally taken from past records and mapping software for placing a user's request at particular location points associated with a distance, time, or other location activation areas for starting an impending arrival message.
Figure 28:
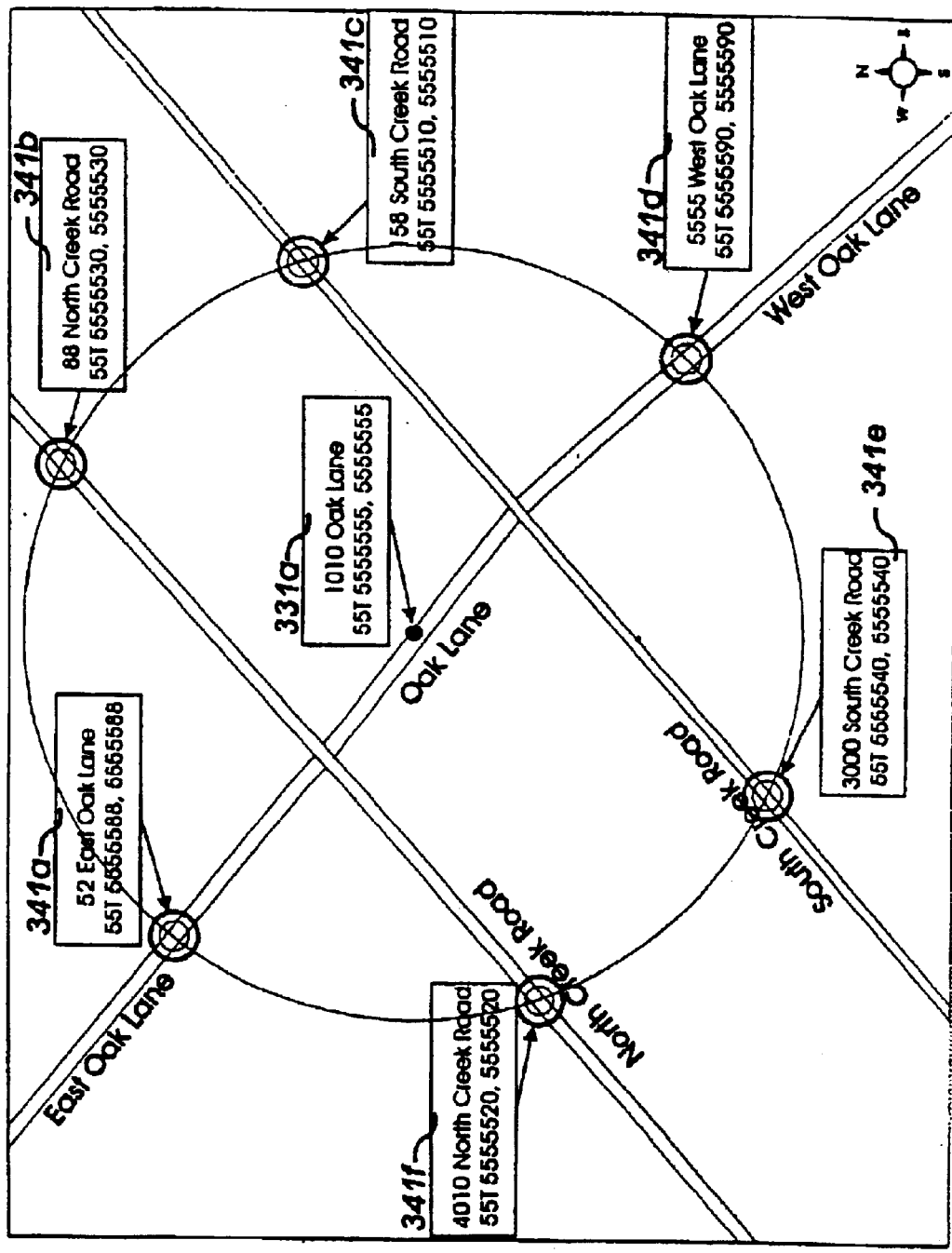
FIG. 28 is a graphic of a map showing impending arrival activation points when a user request is compared with distance, time, or locations, for activating an impending arrival message.

In accordance with FIG. 27, the BSCU 14 checks the vehicle location to confirm that the vehicle location 141a corresponds to the programmed vehicle location 140a. When actual vehicle location 141a is different from the planned route location 140a changes are made 142a in the planned route data. Determining when the vehicle 19 is at a predetermined location on a map is shown in FIG. 28. The actual location points and/or addresses 341a–341f are determined by the VLDB 14a, the MSDB 14b, and the URDB 14d, then stored into the NDB 14c. In FIG. 27 a user at 1010 Oak Lane 332 has requested an advance warning time. The advance warning time is five minutes and thirty seconds 336 before XYZ Delivery Company 335 delivery truck arrives. When the vehicle crosses any locations matching notification time/s 341, shown in more detail in FIG. 28, the advance warning is activated. The only exception is a stop that is scheduled between an activation point/location and the final destination. The delay of notification for each stop between (FIG. 27) 343 is used to determine an arrival time when other stops will be made between the activation points and the targeted destination. Past route averages normally determine how much time a stop will take. In FIG. 27, block diagram 343, each stop in-between the activation points/locations and the final destination will take fifty-five seconds. Each stop the vehicle makes, at each location, can be averaged and therefore different and better determinations of actual delivery times can be made for more accurate advance warning message times. Although time is used as the advance notification method 336 in this example, notification by distance 337, and notification by location 338 can also be used.

Figure 21:
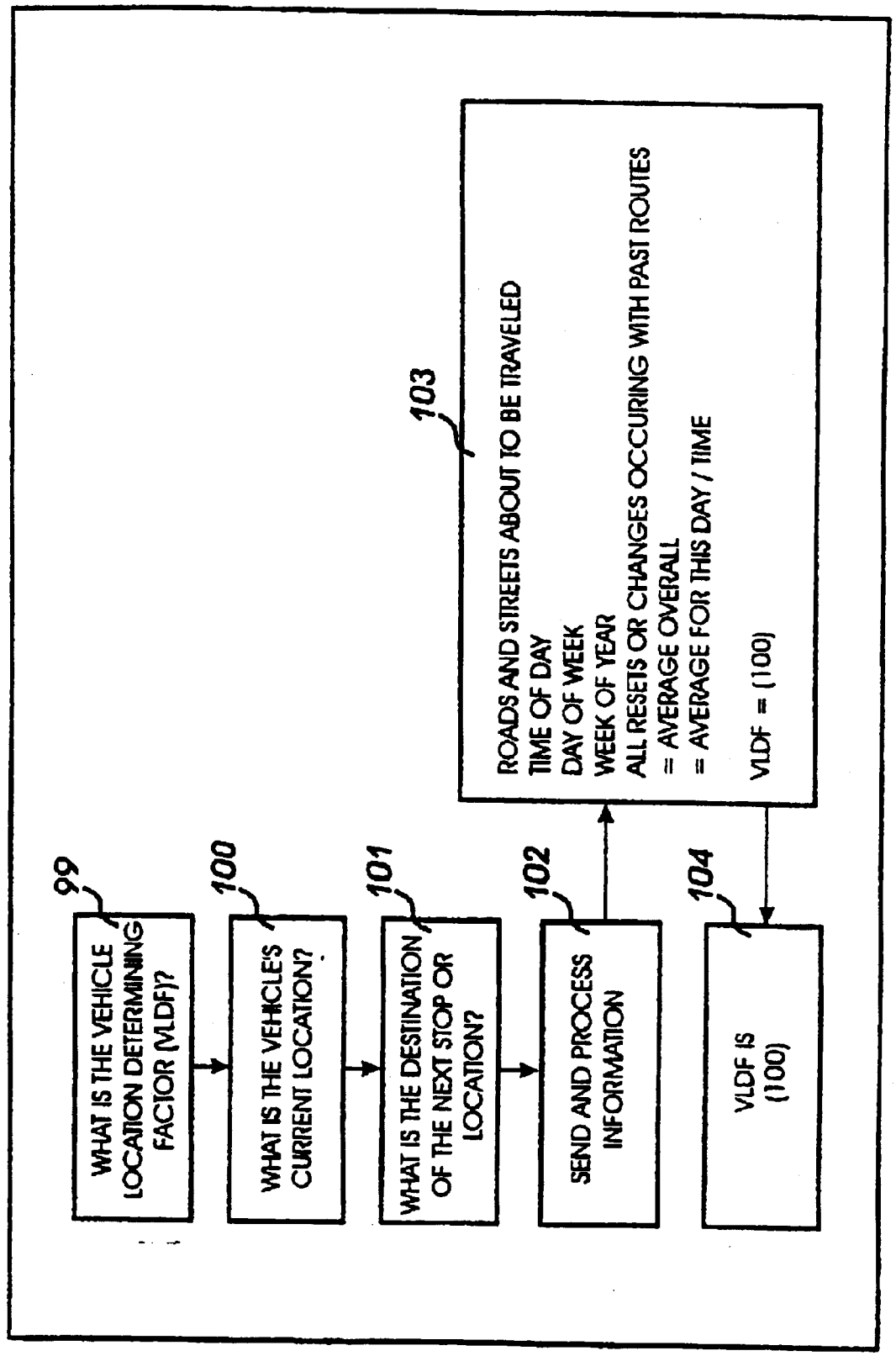
FIG. 21 is a high level flow chart for determining the reliability of a vehicle's location without constant communication. A vehicle's location determining factor (VLDF) is calculated by the BSCU from past route averages, including roads/streets, time of day, vehicle driver, day of week, week of year (holidays normally take more time), and averaged for a particular route, time, and day.

If the delivery vehicle 19 is stopped in traffic, the then VCU 12 will continue to communicate with the BSCU 14 each time the vehicle is in motion to inform the BSCU 14 of this new location, not exceeding the predetermined cycle limit, such as a vehicle in start/stop traffic. If the vehicle 19 is on a normal schedule and on an expressway or interstate, the BSCU 14 may have a Vehicle Location Determining Factor (VLDF) 104 (FIG. 21) of 95% or higher, without repeated cycles from the normal operation of the VCU 12. Based on the location of a vehicle and the VLDF 104 the BSCU 14 may lower the communication cycle rate of the VCU 12 until the vehicle enters a more demanding area or an area closer to a user stop or when the VLDF 104 is at a lower percentage. The VLDF 104 (FIG. 21) is determined by the past vehicle location points and averaged time. This feature can lower the communication rate from the VCU 12 to the BSCU 14 by determining when communication should be increased or decreased and not overloading existing communication channels. Other methods to determine when to use cycle communication, as shown in FIG. 21 and FIG. 24 are before the route starts 914, and in FIG. 23 when the route is in progress 901. Moreover, as previously described, the VLDF 104 is also used to determine when cycle communication is used. In FIG. 23, the next stop is evaluated by the time 905 and distance 904, then the distance 904 is compared to the default distance exceeding limit 906, and the time 905 is compared to the default time limit 907. When time or distance exceeds the predefined limits, the method is changed to cycle communication 910 for delaying communication when it's not needed. The distance, location, or time 911 sets the restarting of communication. FIG. 24 shows an example for determining when to use a cycle communication method in a route list, before the route starts 914. By comparing the route list with mapping software 915 for determining actual roads and streets to be traveled, adding the notification data base (NOB) 916 (when impending arrival messages will be sent), delays between notification activation times can be determined. When the time delay between notification times reach a preset limit, in this example ten minutes 917, the communication can be stopped 918 for a period of time 919 or when a location is reached 920. The actual time or distance for stopping the communication is determined by the amount of time or distance/location between stops and notification activation points.

After the BSCU 14 downloads communication methods to the VCU 12, and during the VCU 12 actual route, if the VCU 12 communication monitoring means determines no changes in the vehicle location and no sensor activity after a clock cycle has been completed, communication is delayed until the vehicle location has changed and/or actual sensor activity is determined. Additionally, when the VCU 12 communication monitoring means determines a communication problem after an attempt has been made to contact the BSCU 14 (e.g. vehicle enters an area the wireless communication means cannot connect to the BSCU 14 known in the art as a "dead area or drop area), the clock cycle is accelerated until the communication to the BSCU 14 is regained. The VCU 12 will continue to monitor the inputs from devices (FIG. 12) 20, 21, 22, 23, and 25, to gain current information when communication is acknowledged/restored.

Communication methods are normally associated with wireless loading and the ability to handle a fleet of VCU 12 responding to one BSCU 14 in most configurations. When other configurations are used for advance notification systems, such as, (FIG. 19 and FIG. 20) the VCU 12 equipped with a delivery order route list (FIG. 19) 181 and a sensor or activation method for determining when an attempt to deliver a package on the route list has been made, the communication is simply activated by the sensor input. In FIG. 19, the flow chart shows how the VCU 12 and the BSCU 14 communicate to locate a particular vehicle location. To find a vehicle's location 160, in this configuration, the current stop and order of delivery list 161 is determined from the information received by the VCU 12. The location of the last stop 162 and the time of the last stop 163, is compared with the next delivery stop 165 and the distance 166 and time 167 between the stops for an estimated time of arrival 169. Mapping software 14b and prior route records of past deliveries 168 provide additional data for determining the vehicle's location. Determining the activation of an advance notification warning associated with this configuration is shown in FIG. 20. When a delivery or an attempted delivery is made 191, the information is sent 191a from the VCU 12, to the BSCU 14, and the BSCU 14 determines what stop is next on the delivery list 193, and then tries to find this next stop in the data base 194. If the user has information in the data base, preferences for sending an impending arrival message 195 are established and a message is sent to this person's computer of the impending arrival of a vehicle 196.

Figure 35:
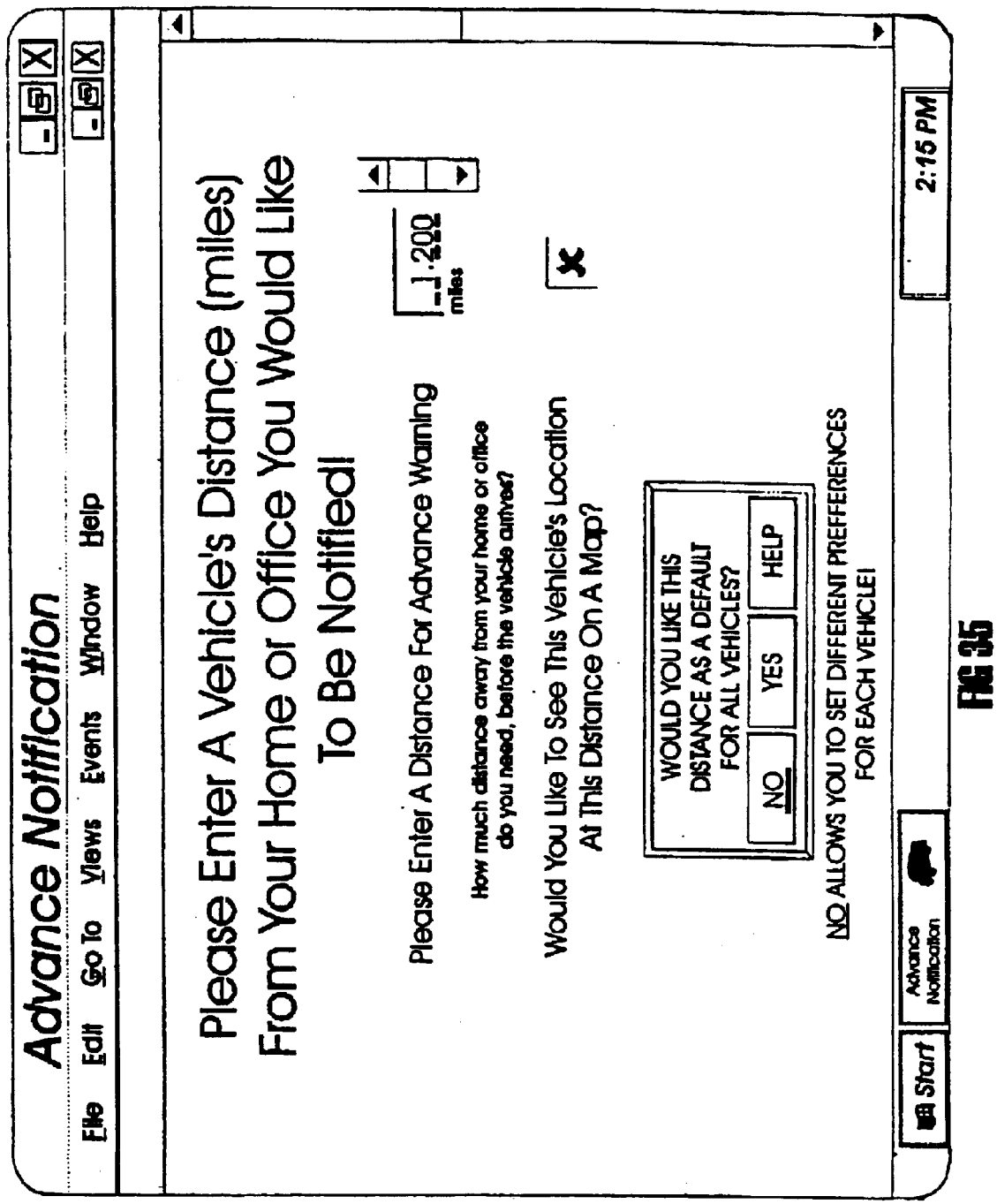

In FIG. 35, the VCU 12 is using and monitoring via the computer controller 12a, a GPS 25 location device and the user input controls 21a. The vehicle location and sensor input is sent to the BSCU 14 from the VCU 12 cellular transceiver 18a. The BSCU 14 receives the wireless information after the wireless information from the VCU 12 passes through the closest land based antenna, then the information is routed over switched telephone lines to the BSCU 14 modem connection 26k. The vehicle information 201 is added to the vehicle location data base (VLDB) 14a. The actual user notification requests are received from a person's computer connected over a network 209, and taken from user input options 210, then stored into a notification data base (NDB) 211. The notification data base (NDB) 211 includes timing for activating an advance warning 205 to physical and electronic addresses 204 and compiling this information into a list for notifying persons' computers 203 associated with a route list. To activate a message, the vehicle location and the preferences for notifying an individual should match 202. When the match occurs, a message is initialized 208 and sent to a person's computer 207, through computer network interface 206 and computer network 300.

The information sent to a person's computer can be received with normal computer networking software, or with additional proprietary software. With proprietary software (FIG. 25) operating on a person's computer 223, the software can determine when a vehicle is approaching 224, then compare user preferences 225 when a vehicle is approaching for displaying video 226 and playing audio messages 227 of the impending arrival of a vehicle. Display information can for example, but is not limited to, any of the following display options 226a, show vehicle driver information 230, vehicle information 231, location on a map 232, time countdown 233, mileage countdown 234, last delivery or stop location 235, cargo information 236, etc. Audio information can be for example, but is not limited to, any of the following audio options 227a, play audio of vehicle name 238, vehicle information 239, street address 240, time countdown 241, mileage countdown 242, last delivery or stop location 243, identification of cargo 244, etc. An example of a person's computer operating proprietary advance notification software is shown in FIG. 26. The display shows a map 770a, a location on a map that represents a person's business or home address 773a, and the location of a vehicle approaching the business or home address 774a. Additionally, this display has been configured to show the time before the vehicle arrives 771a, and to show the distance in miles before the vehicle arrives 772a at the person's business or home address 773a.

At the end of a delivery route (FIG. 44), the VCU 12 makes an inquiry to the BSCU 14 as to whether there are any more delivery stops 151. If the delivery list has been completed 152, then the VCU 12 may contact 153 the BSCU 14 and receive additional information 155 to display on the VCU's LCD 155a that prompts the driver to stop at a receiving dock for more packages, (especially during the holiday seasons and peak loading) or meet a second delivery vehicle to share its load when it is behind in its schedule. When the vehicle receives packages from another vehicle, the packages taken from the second vehicle are normally scanned out with normal hand held bar code scanners and are loaded and scanned into the first vehicle package delivery data base 151 and the package location information/bar code numbers (package identification numbers) are uploaded to the BSCU 14 with a new vehicle number. The route list is established from the BSCU 14 determining the shortest routes from the addresses and downloaded to the VCU 12. The sequence for notification to a user computer is restarted.

A second method for a user to learn of the impending arrival information of a package delivery may be accomplished by a user accessing and requesting information through a computer network, for instance, the Internet, from the BSCU 14 through an Internet site or home page. The BSCU 14 software is designed to be added to the existing Internet site pages, which are owned and operated by delivery companies. When a user accesses a computer address (e.g. Internet site), the user may enter requests for a delivery by entering their telephone number, business or home address, or package identification number, for locating actual packages for delivery. If a delivery is to be made that day, an actual route list from each vehicle stored in the BSCU 14 is compared to the planned route and scheduled time of delivery (STD) database. The STD is a record of events from other routes, this record averages the time and distance to be traveled with the actual route in progress. Note: the STD records are from GPS sensor readings and the time between or travel time between each reading and not from completed routes from start to finish. Thus, by incorporating the STD with the actual delivery schedule, estimated time of delivery is established and accessible to a user requesting delivery schedule information. The advantages of offering a user a close approximate time of delivery are easily seen in these examples: a user needing to leave a delivery stop (home or business) for lunch or errands and expecting an important package to be delivered, or a user needing materials for an important meeting and knowing if the materials will be delivered before the scheduled meeting time. Upon receiving the information request from a user computer linked to the BSCU 14, a request for a vehicle, package, or user location (street address/location on a map), telephone number, computer address, etc. can be made available to the user to locate an area in which a delivery is going to be made. The vehicle associated with the delivery to this user business, or package identification number processes that delivery request. If a package is scheduled for delivery, the actual delivery vehicle estimated time of arrival is given to the user requesting the information in, but not limited to, two formats, one the time of day (1:45PM) and/or a time count down (4:21:03). Additionally, people placing requests may be offered other services from the delivery companies, these requests are made available to the companies to increase revenues while providing the customers with more and better options on deliveries. One example of a user request is an express delivery request (EDR) option. An EDR becomes available through the existing advance notification system network by allowing customers to interact with the vehicle's driver through their computer connected to a network. A customer can send an EDR from their computer to the BSCU 14 over a computer network, then a live operator or preferably an automatic calculation of the driver's load, schedule (early or late), and location/distance from the address sending the EDR; The request is processed and a new estimated time of arrival can be given to the customer, with an optional additional fee from the delivery company. Additionally, a customer can look up a location on a route and meet the driver at a prior stop when an EDR is not used, thus shortening the driver's route time. Upon requesting an EDR, an estimated time of arrival is given to the user. At the same time a quoted fee (on-screen) based upon a flat rate or the actual delay time for that particular vehicle is given to the customer.

The BSCU 14 communication controller 16 may also control a second messaging means over a normal telephone network as described in more detail in the Patent Application "ADVANCE NOTIFICATION SYSTEM AND METHOD" filed May 18, 1993 by Jones et al. and assigned Ser. No. 08/063,533, now U.S. Pat. No. 5,400,020 to Jones et al. that issued on Mar. 21, 1995. The Patent describes an advance notification system with a BSCU controller for messaging through a telephone system. The flow chart in FIG. 13 shows a duel means of communication, both a telephone 45m and a computer with a telephone connection 45f (via a modem). By offering dual means of messaging to a stop, the likelihood of reaching or getting through to a user increases. In accordance with the user request when signing-up for the service (FIG. 39), the end-user can choose any combinations of, but not limited to, a telephone call with a voice message 170, a telephone call using a distinctive ringing sound 171, a computer message over a network 172, additional on-screen display/s 173, and an additional audio message/s 174.

In one configuration, the system first communicates to the user computer by initiating/sending a message over a computer network to a user computer address. If the person's computer is equipped with proprietary software for additional displays (FIG. 25) 226a and/or additional audio messages 227a, the person receives additional visual and audio warnings, based on their user preferences. Then, the microprocessor controller initiates a second module for communication by a telephone call to the user. The order of messaging (telephone or computer) is defined automatically or by the end user. Furthermore, each vehicle can have different notification preferences for announcing the impending arrival of more important vehicles in a method that is more surely effective. In most cases, the telephone is available more than the computer and the telephone call can activate pagers, mobile phones, and home phones with sound normally throughout the home or business phones normally answered by an individual equipped for handling messages. In the preferred embodiment, a telephone call may proceed a computer message to the homes of users and a computer message will proceed a telephone message to businesses. Additionally, a user responding to or acknowledging a message will stop the second method as described above. For example, a user expecting a package to be delivered, and only having one phone line, may receive an impending arrival message while maintaining normal communication practices. If a user is on the telephone talking to another business client, when he hangs up the telephone and views the computer, once connected to a network, a message will be waiting concerning the impending arrival of a vehicle. If the user receiving an impending arrival message has additional software, route calculations may be determined by the time of the message download or an up link may be requested for the actual vehicle location.

Figure 45:
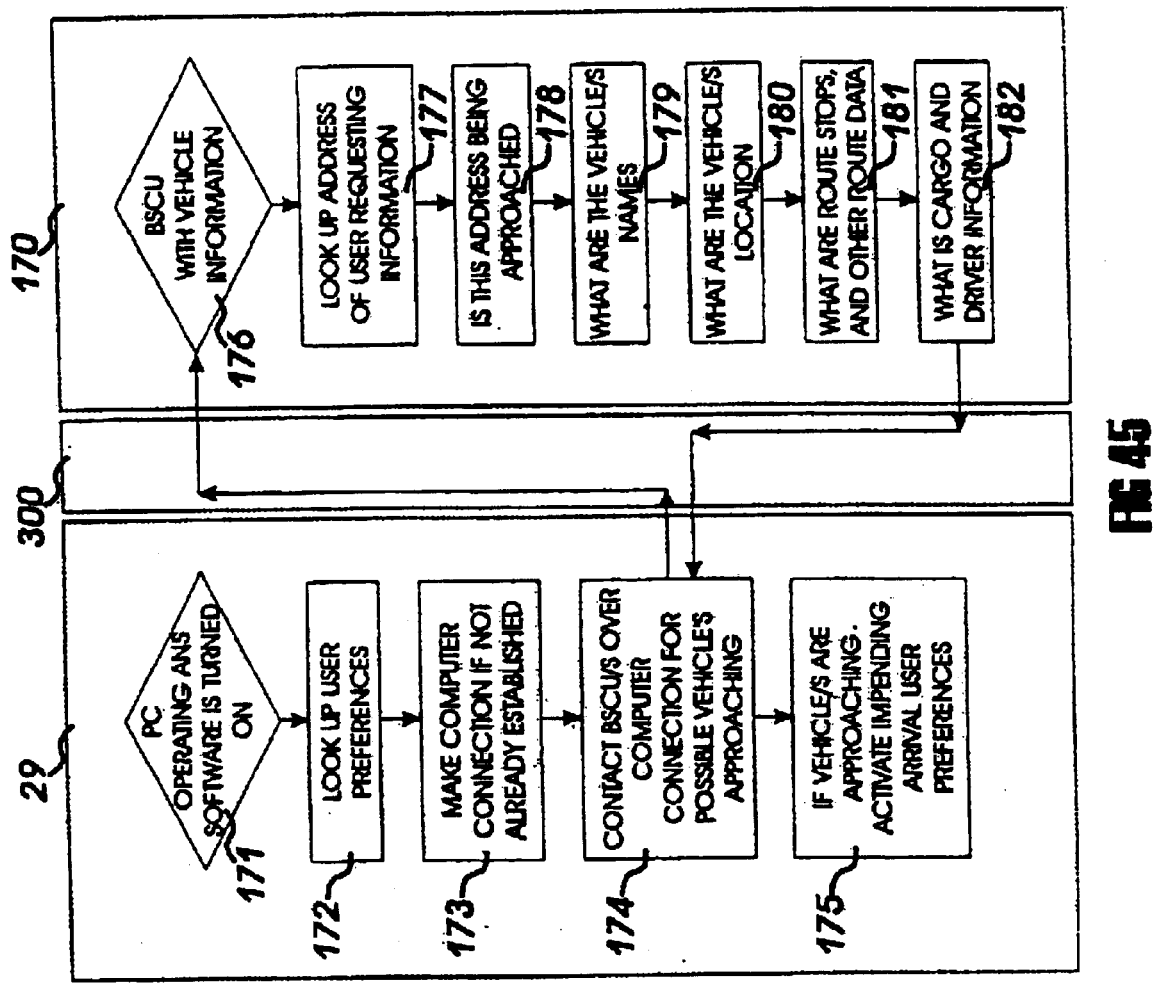
FIG. 45 is a flow chart diagram of a personal computer operating advance notification software and communicating with the BSCU for actual vehicles, and said vehicles' related information, that are approaching their stop. Additionally, this configuration is another example for operating software on a person's computer, for activating an impending arrival message to the user, when a vehicle is approaching.

Moreover, as indicated at flow chart block 36 (FIG. 45), a personal computer with ANS software can process the user requests and contact the BSCU data base 170 for two primary reasons. First the personal computer with ANS software can be used for retrieving information from the BSCU data base 170, and using the information for activating impending arrival messages after the computer is disconnected from the computer network. Second, the BSCU data base 170 may be contacted before and/or in place of an impending arrival message sent from the BSCU. Each person's computer when operating ANS software 171, looks up user preferences 172 and checks for a network connection 173, if the network connection is not active, the ANS software starts the network software, then a request is sent to an area of the BSCU for vehicle information 176. An identification number associated with the person's street address processes the request from the person's computer. The address is looked up, then vehicles approaching this address 177 can be identified 178, with vehicle names 179, vehicle locations 180 and route stops with past vehicle records and directions from one stop to the next 181. Additionally, cargo or other delivery information 182 is then sent back to the personal computer operating ANS software 171 for activation of impending arrival messages and displays, based on the user preferences. Furthermore, this configuration offers an individual with only one communication channel (phone line) the ability to be notified when the communication channel is being used or is not available when an impending arrival message is sent from the BSCU.

The ANS software can display the vehicle location/impending arrival time, distance, and/or packages to be delivered before a particular delivery is made. The user requesting a route update receives a new message and/or vehicle location, number of packages before delivery, and if running, advance notification software for continuous updates, the user computer reschedules the impending arrival distance, time, or package delivery order, with each update, as the vehicle approaches.

Worth noting is that the BSCU 14 (FIG. 17) may be configured so that if a delivery vehicle becomes delayed by more than a maximum length of time, such as five minutes, the BSCU 14 immediately sends a message to the stops 36 of the users already notified of the impending arrival of that vehicle, in order to keep users at these stops 36 from waiting when a vehicle should have already arrived. When an impending arrival message 420 (FIG. 18) is sent to stop 36, and a vehicle delay of five minutes is determined before the vehicle arrives at this particular stop, a second message informing them of the delay is sent 421 to the same stop, based on the amount of delay, a third message may be sent 425 as the vehicle arrives at this particular stop.

Worth noting also, are the methods for determining the actual directions (roads to be taken) of a vehicle from one stop to the next which may be described, but not limited to, three areas. The first configuration contains dual route information in the BSCU 14 and VCU 12. Preferably, the VCU 12 displays road names or a mapping diagram for the driver to follow. The BSCU 14 has the same information for determining the route a vehicle is likely to take. The second configuration determines the closest and/or quickest route from one stop to the next by comparing mapping software, actual and past traffic flow. A third configuration is determined by past vehicle delivery routes. As found in the art of route management, most delivery vehicle drivers have roads and routes each individual prefers to take. Some of these routes are known to take more time, but for the determining factors associated with an advance notification system, these records provide a better means of determining distance, time, locations on a map, etc., when the driver's company policies do not request the following of predefined or displayed sequence of roads. In the preferred embodiment some, all, and additional methods may be used.

III. Control Processes

The control processes are normally, but not limited to, three different area locations. The first area is the VCU 12 on each vehicle, with the ability to communicate vehicle location, driver inputs, and/or cargo information to the BSCU 14. The second area is the BSCU 14 software, for communicating with the VCU 12, storing information from the VCU 12, and in some configurations, storing end-user data and preferences for generating impending arrival messages when vehicles are approaching their address. The third area of the control process is a person's computer for displaying impending arrival messages when a vehicle's impending arrival information is received from a computer network. Although additional software can be added for additional displays and audio, additional software modules from the BSCU 14 can be added also. The overall control processes can be moved from one area to another area based on system configuration needs, normally determined by the application of the end-user. Worth noting, the communication channels and their internal control process are not considered in this description.

Furthermore, FIG. 7, FIG. 8, FIG. 9, and FIG. 10, are examples of general block diagrams containing, but not limited to, system modules and their ability to be moved or removed, without loosing the scope of the present invention. The ability to move the system modules (FIG. 7) for the implementation of a advance notification system requiring a person's computer to only have normal networking software, such as an internet browser from Netscape, Microsoft, America Online, etc. or Local Area Networks (LAN) attached to an information server for receiving vehicle impending arrival information, or most other networks with the ability to send and receive information over Cable, Fiber, Copper, or wireless channel/s. As shown in this diagram, a person's computer 36 is acknowledging a vehicle's impending arrival. In block 14, one module is receiving vehicle information from the VCU's 12. While this module indicates a wireless transceiver 26, it is replaced when a gateway converts wireless information into land line information with a modem. The vehicle location data base 14a, stores vehicle location information. The Mapping Software Data Base (MSDB) 14b is provided to locate roads and streets associated with the person's address and the vehicle's route from one stop to the next, this Mapping Software Data Base 14b also associates GPS numbers with actual physical addresses, distances over streets, roads, highways, etc. The Notification Data Base (NDB) 14c maintains location points, distances, times, and other activation information, associated with a person's physical address. In this illustration the Notification Data Base (NDB) 14c also is used to activate and send messages to the person's computer 36. The User Request Data Base (URDB) 14d stores user preferences, account information, and in this illustration, software used for entering or making changes to this data. By moving some of the system modules (FIG. 8), described as the BSCU 14, to the person's computer area 36, the person's computer 36 is able to process more of the information associated with the advance notification system. The person's computer 36 accesses vehicle location information from the BSCU 14 over a network, then compares the information to, but not only to, the MSDB 14b, the NDB 14c, and the URDB 14d. Furthermore, displaying additional information on-screen and/or additional audio messages associated with an impending arrival of a vehicle is easily accomplished. FIG. 9, is an example of tracking a vehicle without the use of a GPS location, or having another suitable location device on the vehicle. The control process compares route stop addresses 21b with sensor inputs at each location 22a. The location is logged into the Vehicle Location Data Base (VLDB) 14a and the next stop is looked up for tracking the actual path (streets/roads) 21b and averaging the normal time to the next stop, with vehicle location estimations along each road. The person's computer 36 is equipped with software for placing an image of the location of the vehicle on a map 14b, activating an impending arrival message from the NDB 14c, when the vehicle reaches a predetermined location, and storing the user preferences in a data base 14d.

FIG. 10 shows a control process using the same VCU modules as FIG. 9, but moving all the modules from a person's computer, except normal networking software, to the BSCU area. This system can activate and send an impending arrival message to a person's computer when a vehicle is at a predefined location, time, distance, or previous stop. It should be noted, without moving away from the scope of this invention, changing modules and other minor modifications to this invention for similar or customized applications, is obvious to individuals skilled in the art and not mentioned for that reason.

A. Base Station Control Process

Figure 47:
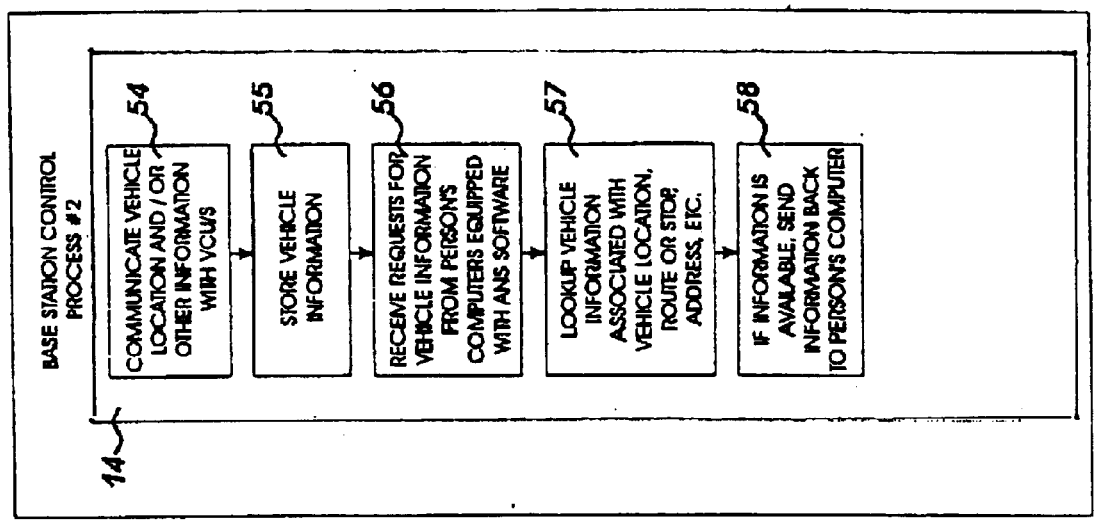
FIG. 47 is a high level flow chart diagram of a BSCU and control process, when the BSCU sends vehicle location information to remote computers, for activation of impending arrival messages on user computers.
Figure 46:
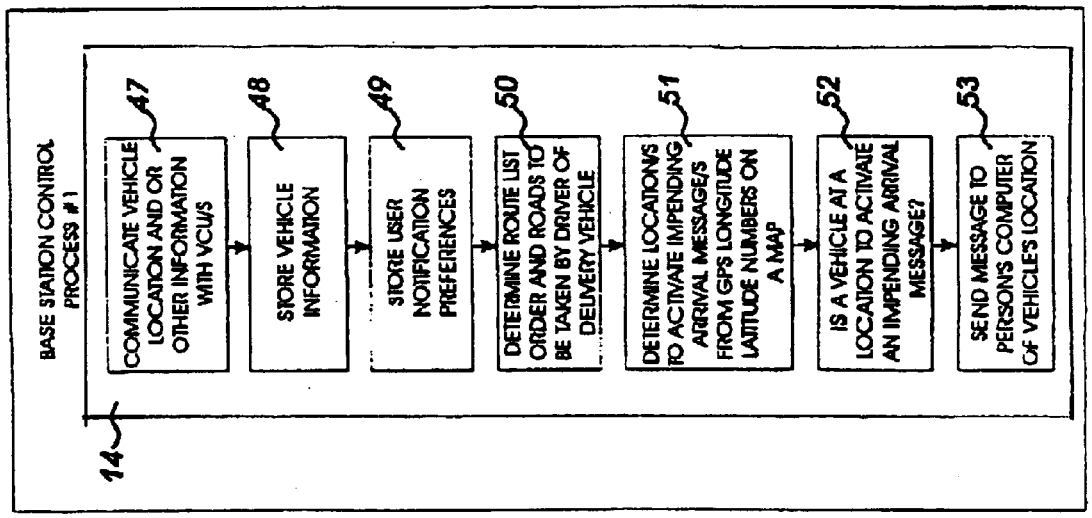
FIG. 46 is a high level flow chart diagram of a BSCU and control process when the BSCU initializes, activates, and sends impending arrival messages, as opposed to FIG. 47, when the BSCU is not used for sending impending arrival messages, but vehicle location information to a computer equipped with advance notification software.

With reference to FIG. 46 and FIG. 47, the base station control process 14 essentially comprises two control sub-processes which run concurrently, namely, (a) a vehicle communications process 47 or 54 and (b) a delivery messaging process 53 or a vehicle information update process 58, based on the location of the modules used to generate the impending arrival message on a person's computer. The vehicle communications process 47 or 54 will be described hereafter, followed by the delivery messaging process 53 or 58. FIG. 46 illustrates one advance notification system configuration using the BSCU 14 for messaging to persons' computer addresses, and FIG. 47 illustrates an advance notification system configuration using the BSCU 14 to update advance notification software on a person's computer by providing vehicle location to each person's computer address. It should be noted in the communication process to the person's computer, other combinations of sending/receiving information from the BSCU 14 and to the person's computer, are used and based on end user needs, tailoring, and configuration.

1. Vehicle Communications Process

The vehicle communications process 18 initially is started from a cellular link from one of the VCUs 12 located on one of the plurality of delivery vehicles 19 to the BSCU 14, as indicated by block 12, FIG. 1. The BSCU 14 vehicle communications process 18 is preferably capable of monitoring a plurality of telephone lines 26, for receiving information from a cellular phone or data network gateway that converts wireless transmissions into land line phone line transmissions (with or without additional connections through a computer network), from a plurality of delivery vehicles 19. As the number of delivery vehicles 19 increases, the number of telephone lines 26 (or bandwidth) which are monitored by the vehicle communication process (FIG. 46) 47 and (FIG. 47) 54 should also be increased to some extent.

After the start of a VCU 12 on a delivery vehicle (FIG. 13), the respective VCU 12 will initiate a cellular link 45b to the BSCU 14, as indicated by the telephone bell symbol (FIG. 1) 18. After the BSCU 14 receives the telephone call, a string of symbols is exchanged between the VCU 12 and the BSCU 14 so as to validate the communication connection, as indicated in (FIG. 13) flow chart block 45b. In other words, the BSCU 14 ensures that it is in fact communicating with the VCU 12 and vice versa.

Figure 22:
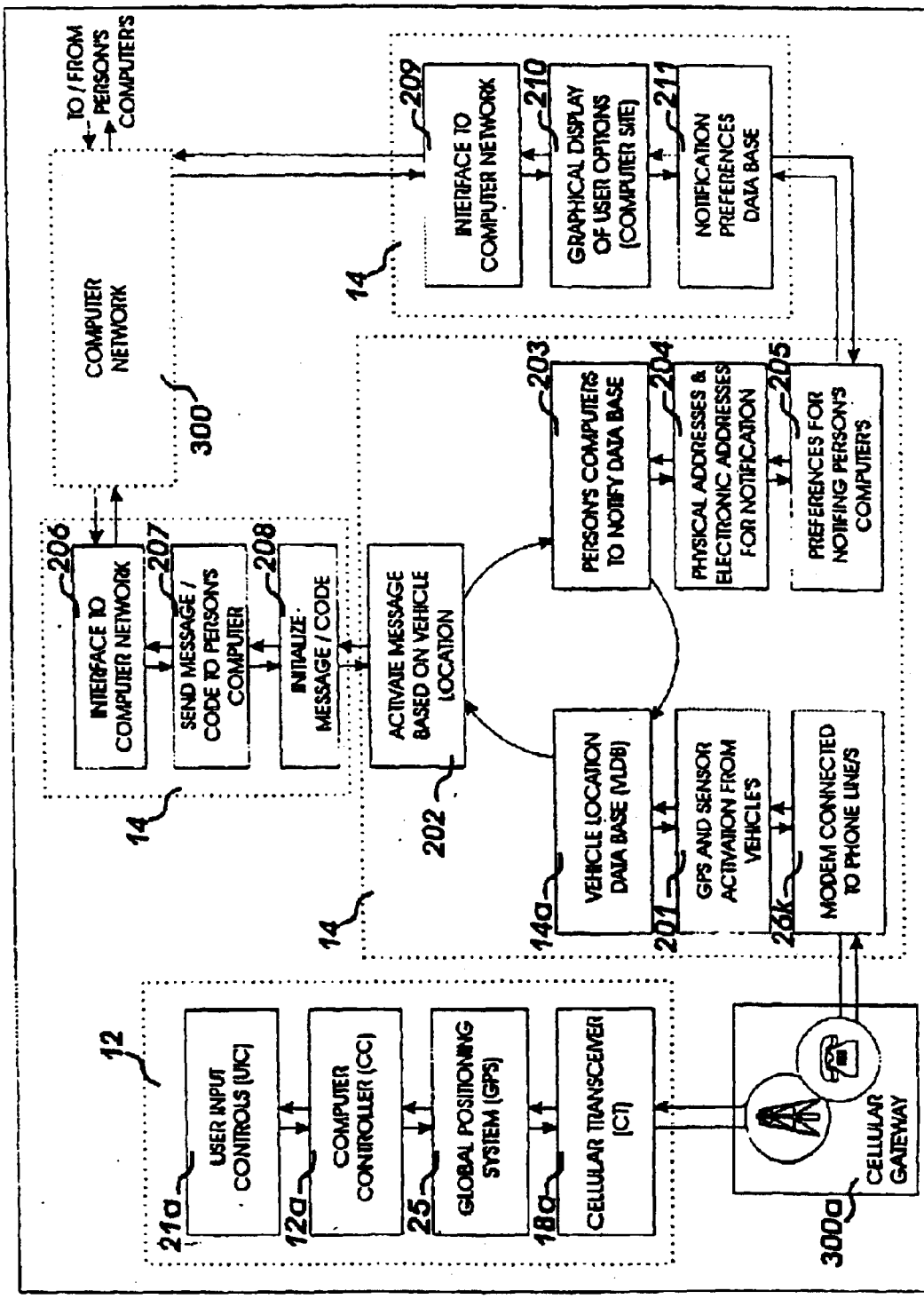
FIG. 22 is a diagram of an example of the communication flow of an advance notification system using a computer network. The BSCU is equipped with a computer network site for interfacing and displaying information on a person's computer for setting up and starting the advance notification service. Additionally shown is how the personal preferences are processed and impending arrival messages are activated when the vehicle's location matches the personal preferences.
Figure 48:
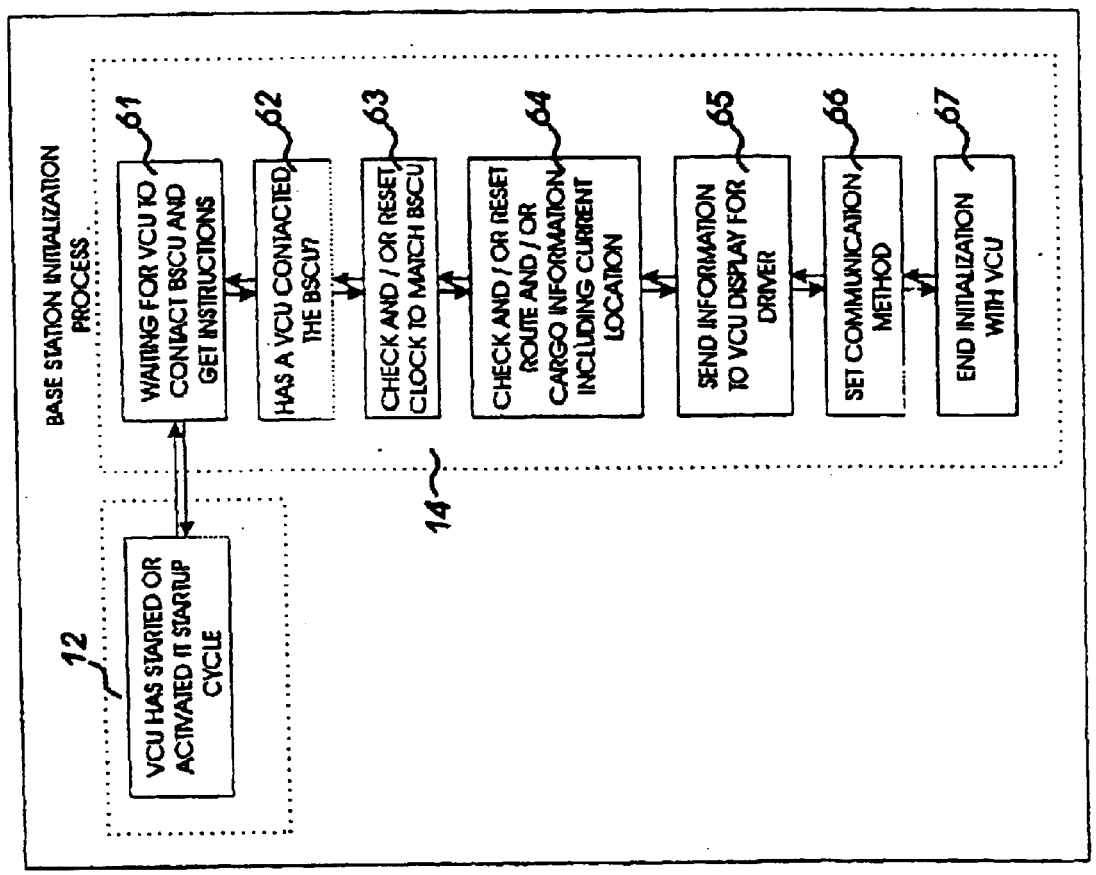
FIG. 48 is a high level flow chart diagram of the initialization process between the VCU and The BSCU. Additionally, this illustration shows a configuration for the BSCU to configure the VCU clock and the communication method.

Next, as shown in FIG. 48 flow chart block 61, the BSCU 14 waits for communication from the VCU 12, when communication is established information regarding (a) the time of the on-board clock 63, (b) the list of stops and related information 64, (c) other information to be displayed for the vehicle driver 65 on the VCU LCD, and (d) when needed, a resetting of the communication method is added and then a shut down of communication 67 is initiated, based on system configuration. In addition, route data 64 is gained from the VCU 12 driver or package sensor input or from the BSCU 14 ability to access a local data base with driver information or a combination of these inputs. The route data 64 includes information pertaining to each delivery stop location, before and after stops, and cargo. This information is normally displayed on the VCU 12 liquid crystal display (LCD) for the driver's viewing. The prioritizing of the driver's list is based on, but not limited to, mapping software, the driver input, and past recorded route data. From the route data 64 and the information listed above as (a), (b), (c), and (d), the BSCU 14, can determine the location of the vehicle by, as indicated by FIG. 22, flow chart blocks 201 and 14a, and determine when to send impending arrival messages 202 based on this location, as the vehicle starts and continues its route, as indicated by a flow chart block 202. In the case where the delivery vehicle 19 is stopped in-between scheduled stops, the VCU 12 resets its on-board communication clock cycle back so that the communication to the BSCU 14 is stopped, until the vehicle restarts it route or progress. When the delivery vehicle restarts it route, the standard communication cycle is restarted. In the case where the delivery vehicle 19 is in start and stop traffic, the VCU 12 communication cycles are normally stopped until the vehicle is moved a predefined distance, reaches a location associated with the activation of an impending message or the ignition switch is turned to the off/on position 24, or a sensor is activated on the VCU 12. The VCU 12 communication cycles (FIG. 23) are programmable from the BSCU 14 and are reset when a distance 904, or time 905, to the next messaging point excessively exceeds the number of minutes 907, miles 906, from the location to which a user impending arrival message is to be sent. Moreover, this communication change can be preset at the beginning of a route at areas and times the vehicle's location is not associated with an impending arrival message and at times when the vehicle can become off its estimated route without effecting the impending arrival messaging for a brief time. While the route is in progress, the BSCU 14 can determine from the mapping software, current route data, and past recorded route data 908, when to send a VCU 12 a request to use cycle communication. Moreover, in the situation where the delivery vehicle VCU 12 has stopped sending vehicle location communication to the BSCU 14, as requested by the BSCU 14 or in-between communication cycles from the VCU 12, the BSCU 14 can determine the estimated vehicle location from past routes, delivery lists, mapping software, and additional road/traffic monitoring systems for controlling the communication of the VCU 12. When the vehicle has reached a cycle completion, predetermined by location or time and known by the BSCU 14 and VCU 12, a communication link to the BSCU 14 is not necessarily made at this time. As the communication method is changed back to route comparison 14*a* (FIG. 15), if the vehicle's planned route location 140*a* matches it's actual route location, communication to the BSCU 14 is not needed. Essentially, the communication methods are controlling the overall communication loading needed for vehicle location and messaging associated with the vehicle location between the BSCU 14 and the VCU 12. To better understand clock cycles: clock cycles are time (minutes/seconds) lapses or distance lapses for particular location points (longitude/latitude numbers from GPS) or actual miles, and are started, controlled (more/less), and used for decreasing communication from a delivery vehicle VCU 12 to the BSCU 14.

Finally, as shown in FIG. 21, flow chart block 99, the BSCU 14 may slow down or speed up the communication clock cycle by determining the Vehicle Location Determining Factor (VLDF) 99. The VLDF is used to determine the likelihood of delays between two stops. To determine the VLDF rating, the current vehicle location 100, the next stop and route to the next stop 101 are compared to past route records 103. If the vehicle is likely to travel the same speed and take the same amount of time as previously recorded vehicles, the communication cycle is slowed down.

Worth noting from the forgoing discussion is the fact that the BSCU 14 (FIG. 1) is the ultimate controller of the advance notification system 10 from a hierarchical vantage point. The base station clock 28 maintains the absolute time of the advance notification system 10, while the vehicle clock 24 assumes a subservient role and is periodically reset when the delivery vehicle 19 clock differs from the BSCU 14. Further, it should be noted that the VCU 12 communicates to the BSCU 14 (a) when asked by the BSCU 14, (b) when the clock cycle reaches a predetermined point or when the vehicle reaches a predetermined location, (c) when a planned route time differs from an actual route time and (d) when the delivery vehicle driver activates a predefined sensor on the vehicle (buttons on the VCU 12, bar code scanner, etc.) to minimize communication.

2. Package, Tracking, and Notification Process

As previously mentioned, the messaging process 202 (FIG. 22) runs concurrently with the vehicle communications process 189 within the BSCU 14. In essence, the computer messaging process 202 uses the vehicle location information 25 retrieved from the VCU 12 by the vehicle communications process 18*a* in order for the BSCU 14 to send computer messages of the approaching delivery vehicle 19. A delivery list is accessible from a local data base (FIG. 27) by the BSCU 14 and comprises information regarding (a) the person's name 331 and/or delivery street address 332, (b) the computer network address 333 (c) the telephone number 334 (d) the type of vehicles for activating notification messages 335 and (e) the activation of the impending arrival message. The impending arrival message is activated when a vehicle is at a predefined time 336, distance away from a stop 337, or at a location/address 338. The computer messaging activation points (as indicated in FIG. 27) and the delivery list (as indicated in FIG. 14) are crossed referenced with the vehicle's actual progress through its route and delivery stops. When a particular time, location, and/or package delivery for sending a particular message is reached, the messaging process initiates an electronic computer message to the particular user, as indicated by the flow chart diagram in FIG. 22. The computer messaging may be sent over an existing computer network/Internet or through a direct modem link from another computer, as described previously. Moreover, the particular time, distance, location, and/or stop are fully programmable by the user (person receiving an impending arrival message), and/or by the company providing the service. Programming and user options are discussed in more detail in the Computer Messaging Control Process area.

Also worth noting is a feature for monitoring messages to be placed in the future, for handling message loading (exceeding available communication channels) to end users. In accordance with this feature, upon anticipation of a heavy load of messages, some of the messages would be initiated earlier than the originally scheduled corresponding message time, previous stop, or distance/location. Numerous other networking options can also be used to solve this problem.

After the delivery vehicle has completed its route (FIG. 44), that particular delivery vehicle can be programmed to contact 153 the BSCU 14 when it recognizes the end of the route 152. Additionally, the VCU 12 may have instructions 155 displayed 155*a* for the driver. The BSCU 14 from a hierarchy stand point is the controller of the system, but instructions from the VCU 12 of new packages, reschedules, other sensor inputs, etc. can be sent to the BSCU 14, for instructions on the vehicle's intent. Otherwise, the computer messaging process has completed its list for people to contact (FIG. 27) and unless additional vehicle tracking is needed or more stops are scheduled, the communication between the VCU 12 and BSCU 14 is stopped.

As further use of completed route data, an event list is maintained for diagnostics and system monitoring. The event list receives data from both the vehicle communications process and the computer messaging process. The event list essentially comprises records of, among other things, all messages sent and all past and current vehicle locations.

B. Vehicle Control Process

Figure 29:
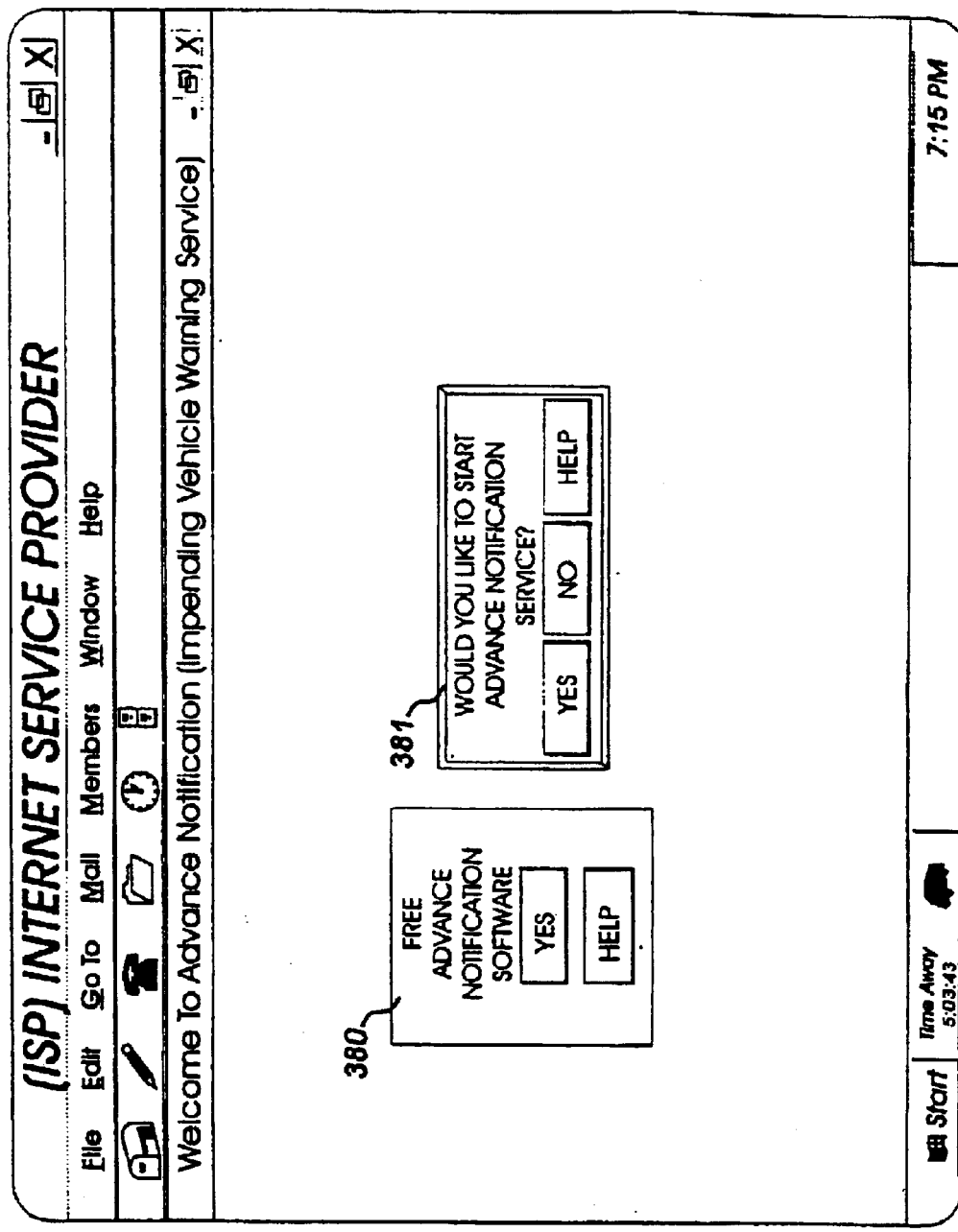

Reference will now be made to the vehicle control process as shown in FIG. 11. Once powered up, the VCU 12 runs through an initiation procedure in which the delivery list is retrieved from packages scanned into the vehicle (activation of the scanner may also power up the VCU) and/or a downloaded list of packages from the BSCU 14 for delivery is received. If packages are scanned 20 into the VCU 12 (FIG. 12), the stops are placed in order of delivery by the vehicle's driver as shown in FIG. 29 or sent to the BSCU 14 for list optimization. The delivery list is organized into an optimized route FIG. 14, showing stop list order 607 and the location or address, as indicated in flow chart block 608. The automatic route optimization software resides in the Vehicle Location Data Base (VLDB) 14*a* in the BSCU 14 and includes past records of delivery times, routes taken by driver, traffic flow from recorded points and times of past routes, etc. This route optimization software and/or the driver input is how the stop list is organized. Initially the clock in the VCU 12 is set by the BSCU 14 when communication is made. Additionally, when comparisons with the actual time in the BSCU 14 differs from the time in the VCU 12, clock resets are made by the BSCU 14.

After the foregoing initialization procedure, a call is placed via the transceiver 18 (FIG. 1) to the BSCU 14 as indicated by the bell symbol. After the connection, the VCU 12 and the BSCU 14 exchange information as described herein before and which will be further described hereinafter relative to FIG. 12. Furthermore, it should be noted that in some configurations the BSCU 14 might contact the VCU 12 to initialize, schedule timing, or send remote activation from the driver of one vehicle to the BSCU 14 or other vehicle-in-motion sensors.

Next, as shown in FIG. 1, the vehicle control process begins a looping operation wherein the VCU 12 continuously monitors the switches 21–23, clock 24, and sensors 25 to determine the vehicle location. As mentioned previously, the vehicle control process initiates a wireless communication at the initializing point of a route, when the vehicle 19 clock cycle reaches (time between communication updates) a completed loop, planned route data stops matching actual route data, or when a package is delivered. The VCU 12 can also answer and receive information from the BSCU 14.

While in the main looping operation, a determination is first made as to whether the delivery vehicle 19 has reached the end of the route or deliveries/pick ups. If the vehicle 19 is at the end of its route, then the vehicle communication process is slowed down or stopped, and does not need to be restarted or increased unless switches 20, 21, 22, or 23 are triggered by the driver. Otherwise, the process continues and makes a determination as to the vehicle location, as indicated in flow chart block 25. In the preferred embodiment, the delivery vehicle 19 location and total expired time at each stop is not a factor. But if the VCU 12 notices a change in a delivery stop when a stop is made at a delivery location not on the list, or out of sequence, a driver prompt is displayed on the VCU/LCD screen 33. Additionally, a package scanned out (delivery was made or attempted) could also determine an out-of-sequence delivery. When the delivery vehicle 19 is stopped for an out-of-sequence delivery, then the communication is initiated to the BSCU 14, as shown by a telephone bell symbol 18 in FIG. 1. The communication is an override and not part of a normal communication event, such as, a clock cycle, a distance/location cycle, a route comparison, or polling protocol, but a special need for informing the BSCU 14 of a special occurrence.

The first attempt to correct the list is a flashing screen from the VCU 12 for the driver. If the driver responds, menus of questions are asked and the driver responses are recorded from the switches 21, 22, and 23 (FIG. 1). On screen questions are "is this delivery out of order?" if the driver selects yes, "is (address) your next stop?" if yes the information is uploaded to the BSCU 14 and the route continues, if no, a choice is given from the route list, and the driver is asked to highlight the next stop. The information is then uploaded to the BSCU 14. When the process is not corrected by the driver, then the BSCU 14 process determines the driver intent by comparing the vehicle direction, locations to closest stops, and past times of deliveries to these stops, with destinations from the route list, and makes a calculated determination of the driver's intent. The new sequence of stops is downloaded into the VCU 12 and the next stop location and question "is this correct" is displayed to the driver. Normally one of two events occurs, the driver responds or the vehicle arrives at a stop. If none of the switches 21, 22, or 23 have been actuated, then the process 76 will loop back around and begin once again. Otherwise, if actuation of a switch 21, 22, or 23 is detected, then the process will determine which of the switches 21, 22, 23 have been actuated.

Figure 43:
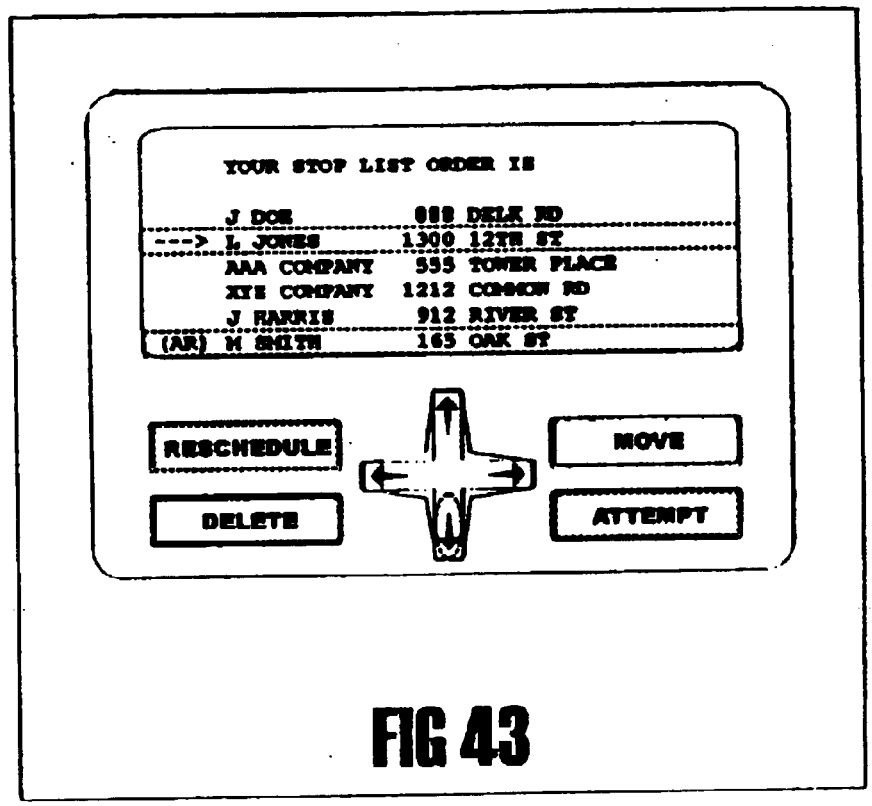
FIG. 43 is a diagram and example of a vehicle control unit (VCU) with a display area and control buttons. The display shown in this illustration is displaying the vehicle's route list order with next stop/delivery to be made, and a stop that has been rescheduled from an attempted delivery (lower highlighted area with (AR) on left side) from an earlier route stop.
Figure 44:
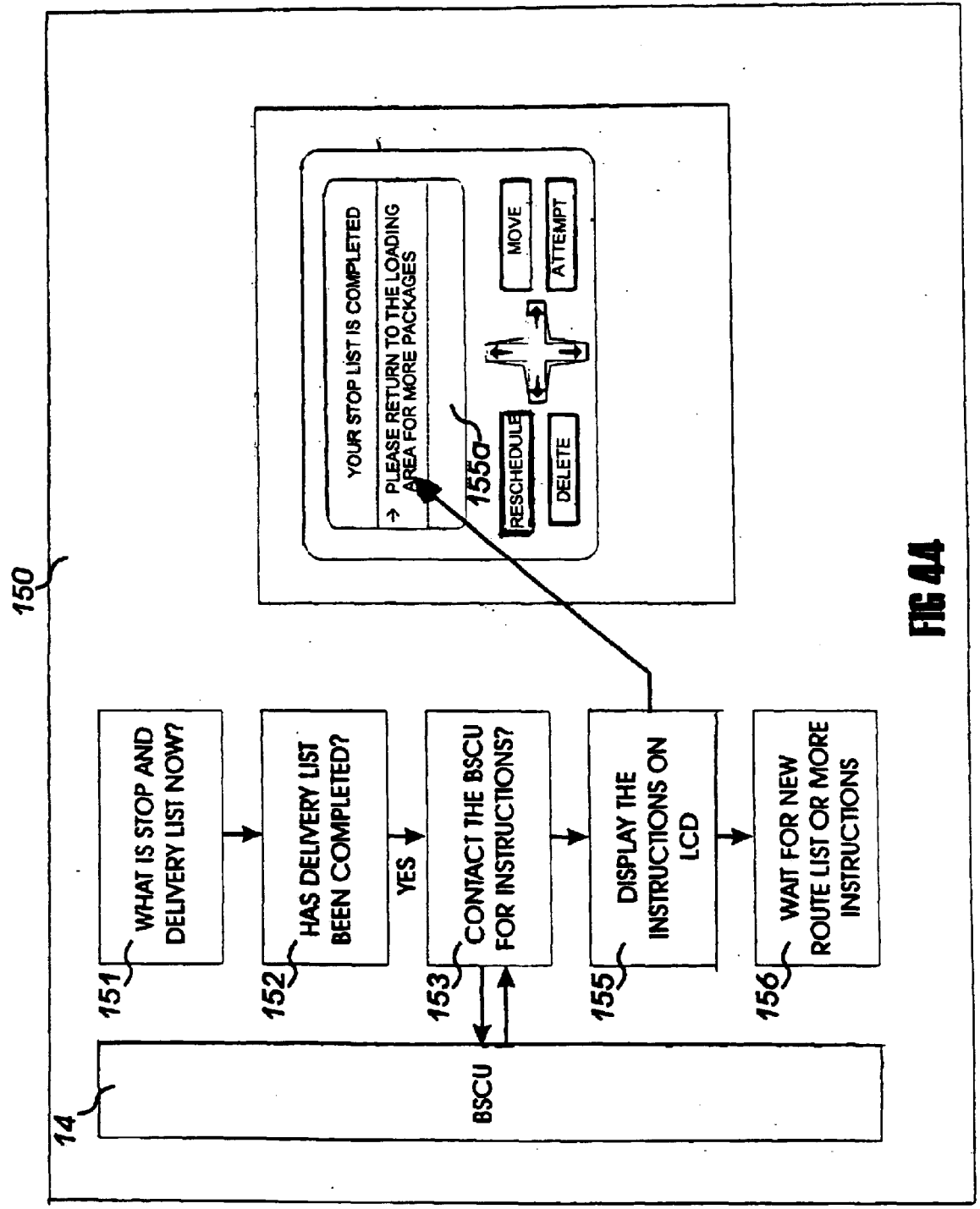
FIG. 44 is a diagram and example of a vehicle control unit (VCU) and a flow chart showing a method for determining when the route list is completed and sending additional information to the VCU display for the driver to return to a loading area, as an example.

First, the process will determine whether the "yes" switch has been actuated. If the driver has actuated the attempt to deliver switch 22, then the VCU 12 will continue, normal operation. When the reschedule delivery switch 23 is pressed, a list of the local area deliveries is displayed and the driver is prompted to select the next stop. Moreover, a decision will be made by the BSCU 14 to notify users of the vehicle's impending arrival, if time, distance, previous delivery stop and location for that particular stop has passed. In the preferred embodiment, the delivery vehicle 19 is considered to be following its routing list if the vehicle 19 arrives at the stop on the display. A stop does not determine a delivery was made, but an attempt to deliver a package was made. Furthermore, when a user is not available to receive a package, a stop may be rescheduled automatically from the BSCU 14 or manually from the driver, as shown in FIG. 43. A reschedule delivery is a common occurrence for a delivery driver, so, determining when a second attempt should be made or a route list sequence of stops for a driver is a user preference. In most cases, a driver who becomes familiar with customers and customer schedules is more likely to be accurate and successful on a delivery than a route chosen by location and distance, from a list. Past tracking of actual times of deliveries to a particular stop make the BSCU 14 likely to be close also.

In the event that the vehicle driver has not delivered a package, and an attempt was made, and normally when the driver is not repeating the stop in a given day, the driver can activate an attempt to deliver switch 21 to inform the BSCU 14 to cancel this user stop from a list, and send a second message of the time of attempted delivery and package information to the user computer. Then the process determines whether the driver has actually pressed the reset switch 22 for the rest of the deliveries that day. An attempt to deliver computer message sent to a user computer address might be used to increase revenue for additional services, such as, fees for redeliveries, etc. If the driver has not actuated the reset switch 22, then the process loops back and begins again.

C. Computer Messaging Control Process

When a computer message is initiated by the BSCU 14 as indicated by FIG. 22, the BSCU 14 follows a messaging control process as indicated in flow chart blocks 208, 207, and 206.

Figure 49:
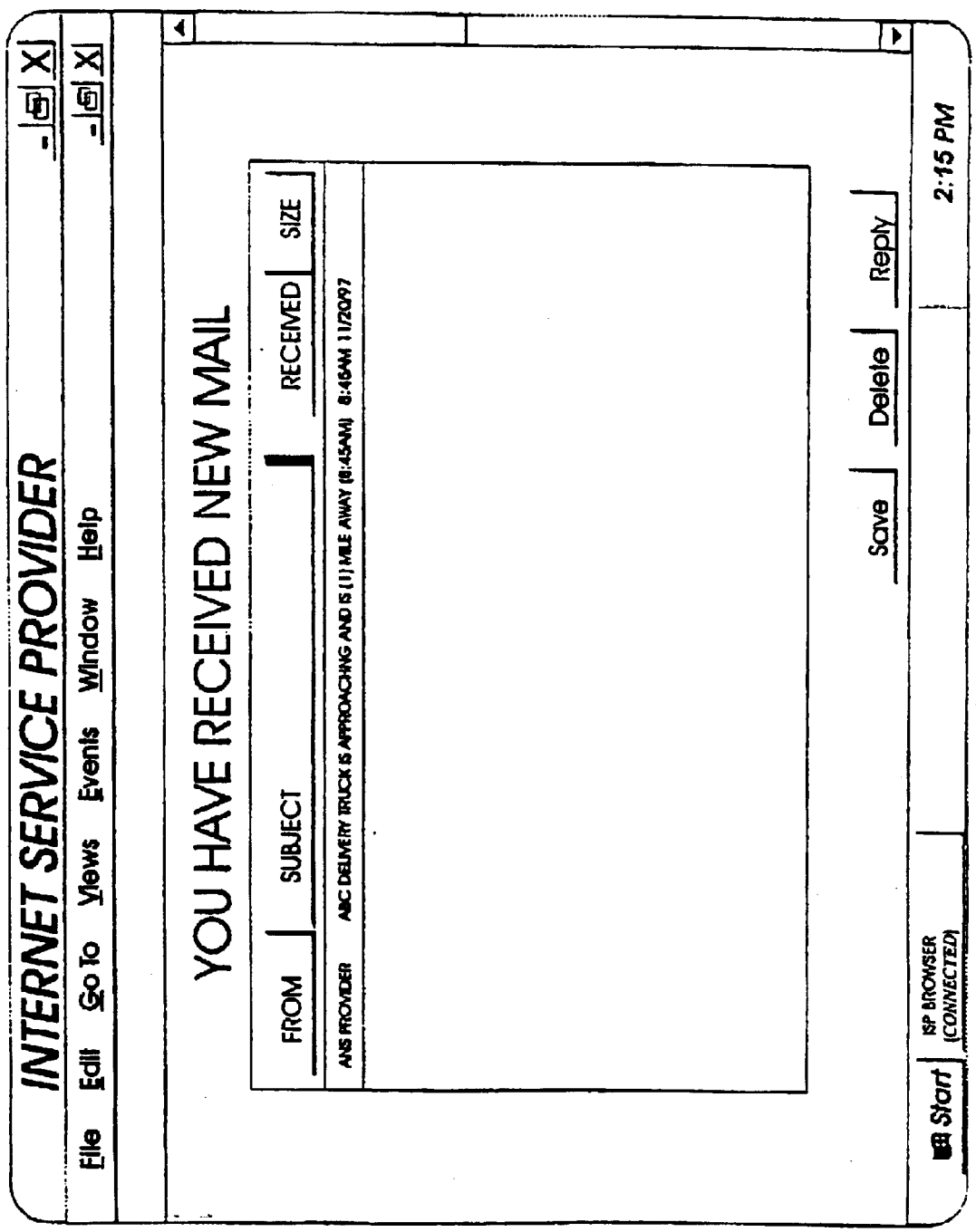
FIG. 49 is an example and diagram of a computer screen connected by software/hardware to an internet service provider and receiving an vehicle's impending arrival message in the form of E-Mail or electronic mail.

Although the description in FIG. 22 is from a BSCU controller, the BSCU 14 or modules in the BSCU 14 may be better incorporated into a user computer. Three examples of different type configurations for displaying impending arrival information on a computer connected to a network are shown in FIG. 7, FIG. 8, FIG. 9, and FIG. 10. For illustration purposes, the system described as a BSCU 14 is considered different than a person's computer, which could be considered part of the BSCU 14 operation. In FIG. 7 the person's computer is equipped with networking software, and is not associated with an advance notification system. In FIG. 8 the person's computer is equipped with all the advance notification modules for activating 14c and 14d impending arrival messages, mapping software 14b for displaying and/or comparing vehicle locations to streets, and a method for getting and/or receiving actual vehicle location from a network address. In FIG. 9 and FIG. 10, the example shows advance notification systems for tracking vehicles without GPS location devices. The BSCU 14 modules in FIG. 9 are set to track delivery stops from a route list and delivery stops within each route, then the vehicle location information is sent to the person's computer or accessed from the person's computer for vehicle location information. The vehicle location is compared in the person's computer, then activated and displayed when the user preferences match the actual vehicle's location. FIG. 10 is placing all modules in the BSCU 14 area and not requiring the person's computer to be equipped with any extra software (FIG. 49). As a note, the main differences between FIG. 7 and FIG. 10 are the methods used for determining vehicle location or stop points.

Additionally, when the user computer has software/hardware for connecting to a computer network and software for displaying messages received by the BSCU 14 for advance notification, the additional software can be an electronic mail reader for activating messages from a computer network, or a connection to a satellite/cable network 501 (FIG. 50) for displaying images onto a television screen. When the impending arrival messages are broadcast through a satellite/cable network 501, a personal computer 504 monitors signals from a broadcast channel 505 and activates an impending arrival message when an identification code is received 506. The impending arrival message is compared to the user preferences 508–511 and sent to a person's television 36d.

Figure 25:
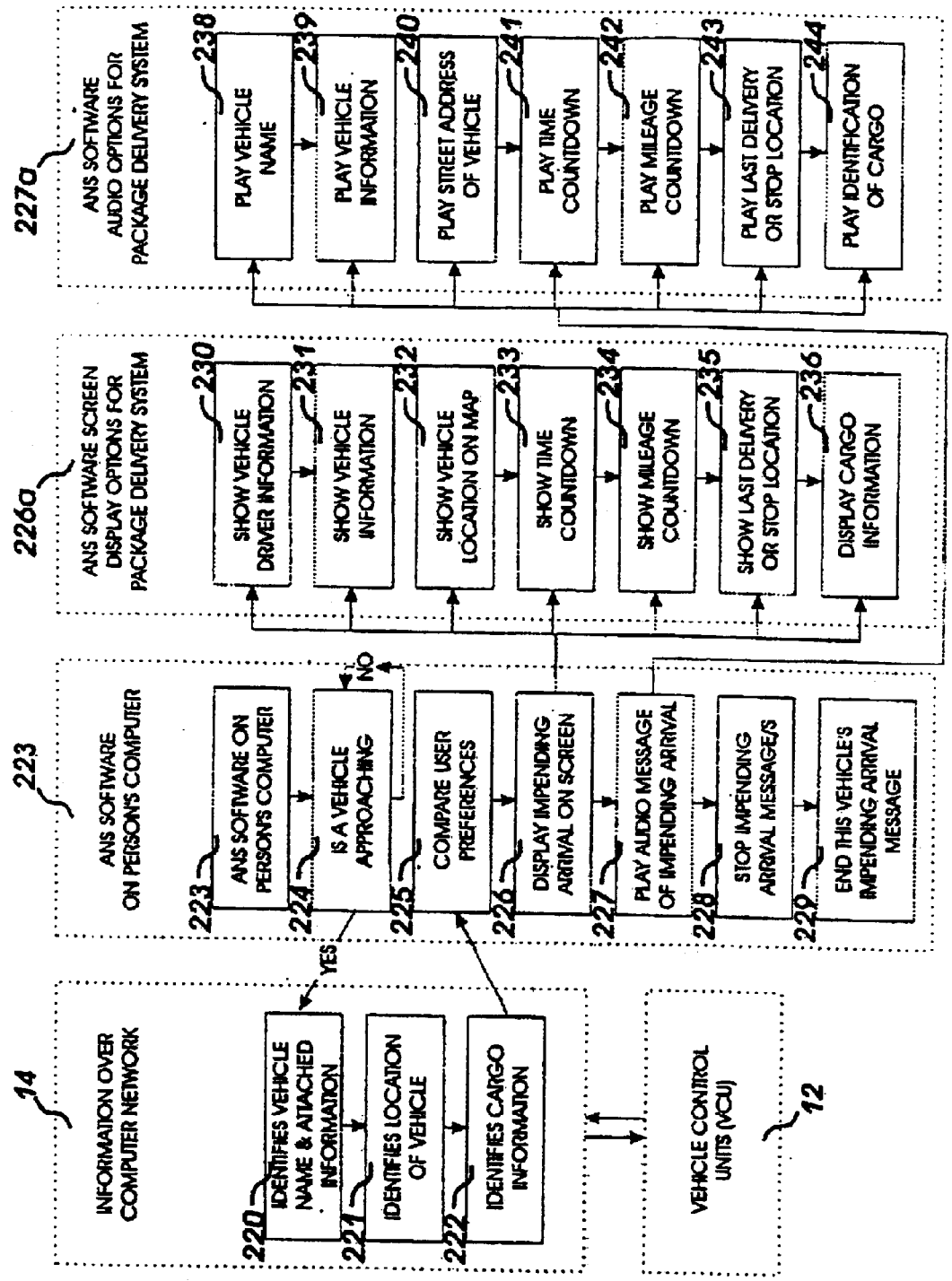
FIG. 25 is a high level flow chart of a user computer equipped with software for displaying audio and video, and moreover, the user preferences for playing audio messages and/or video displays when impending arrival messages are received.
Figure 26:
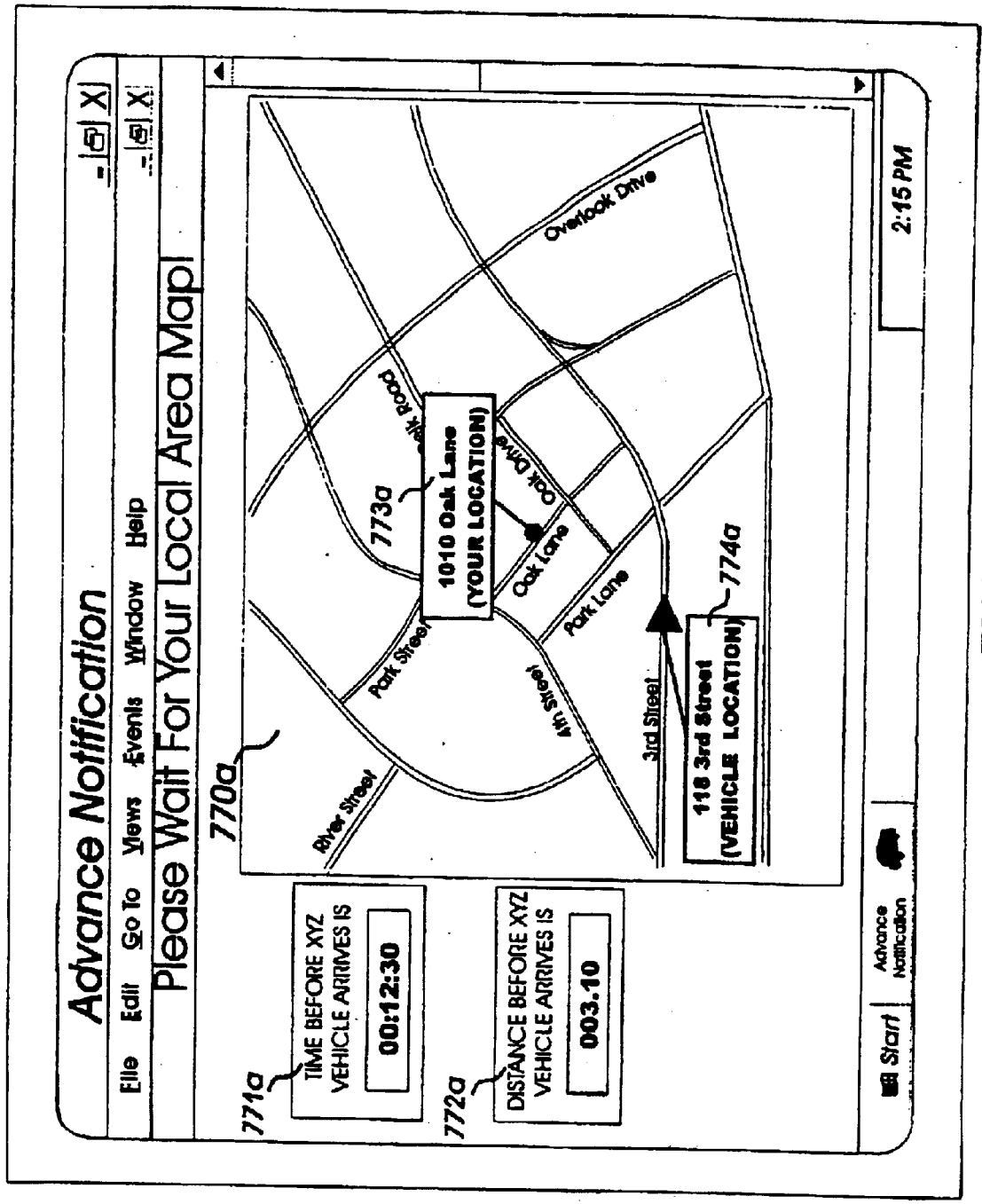
FIG. 26 is a diagram and example for accessing and receiving advance notification information when accessing an Internet or computer site page.

In the preferred embodiment, a person's computer can activate an impending arrival message when software is residing on a person's computer 223 as shown in FIG. 25. The software compares vehicle location 224 and user activation preferences 225 to the user preferences display options 226a and user audio options 227a, each time a vehicle is approaching.

Figure 32:
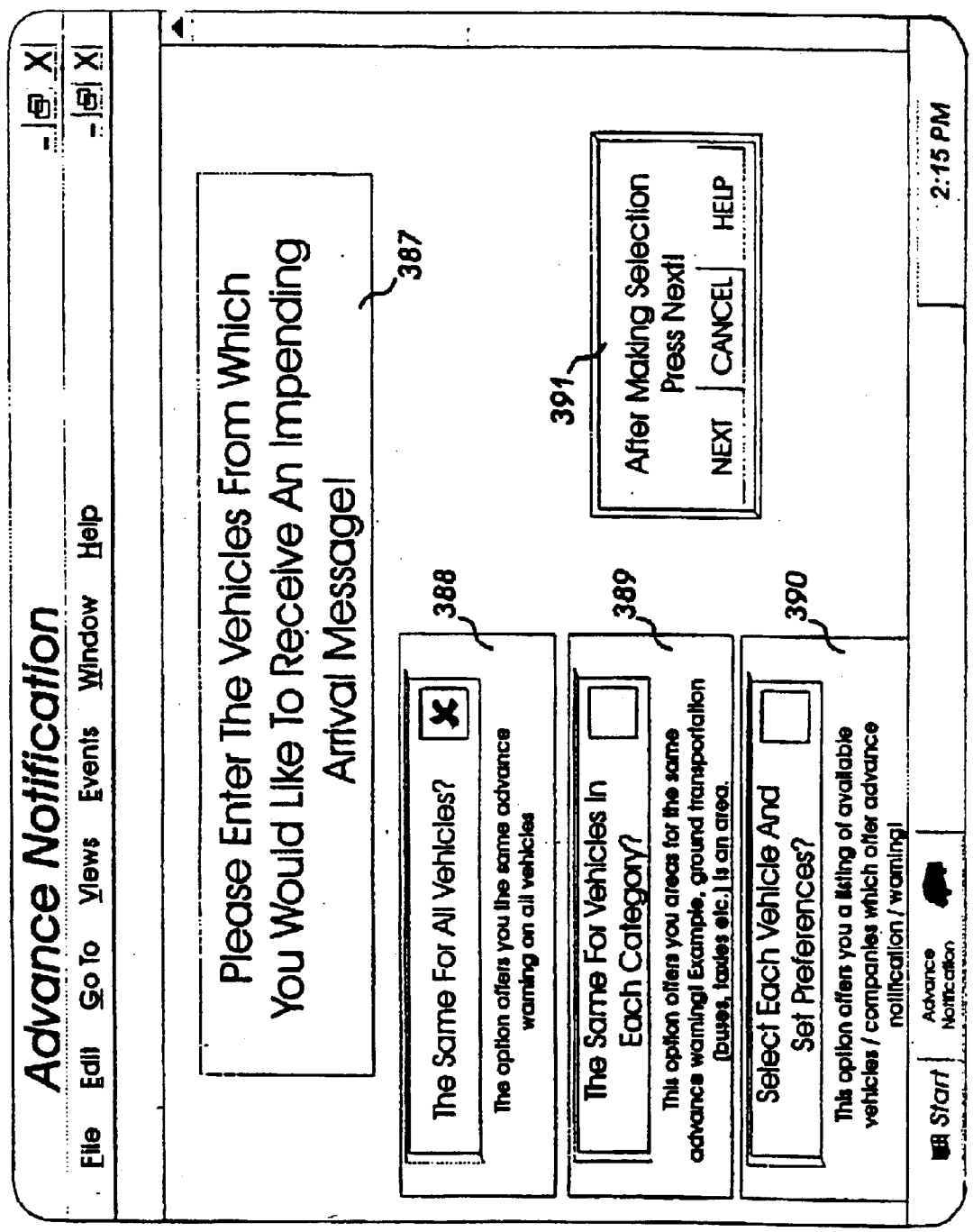
Figure 33:
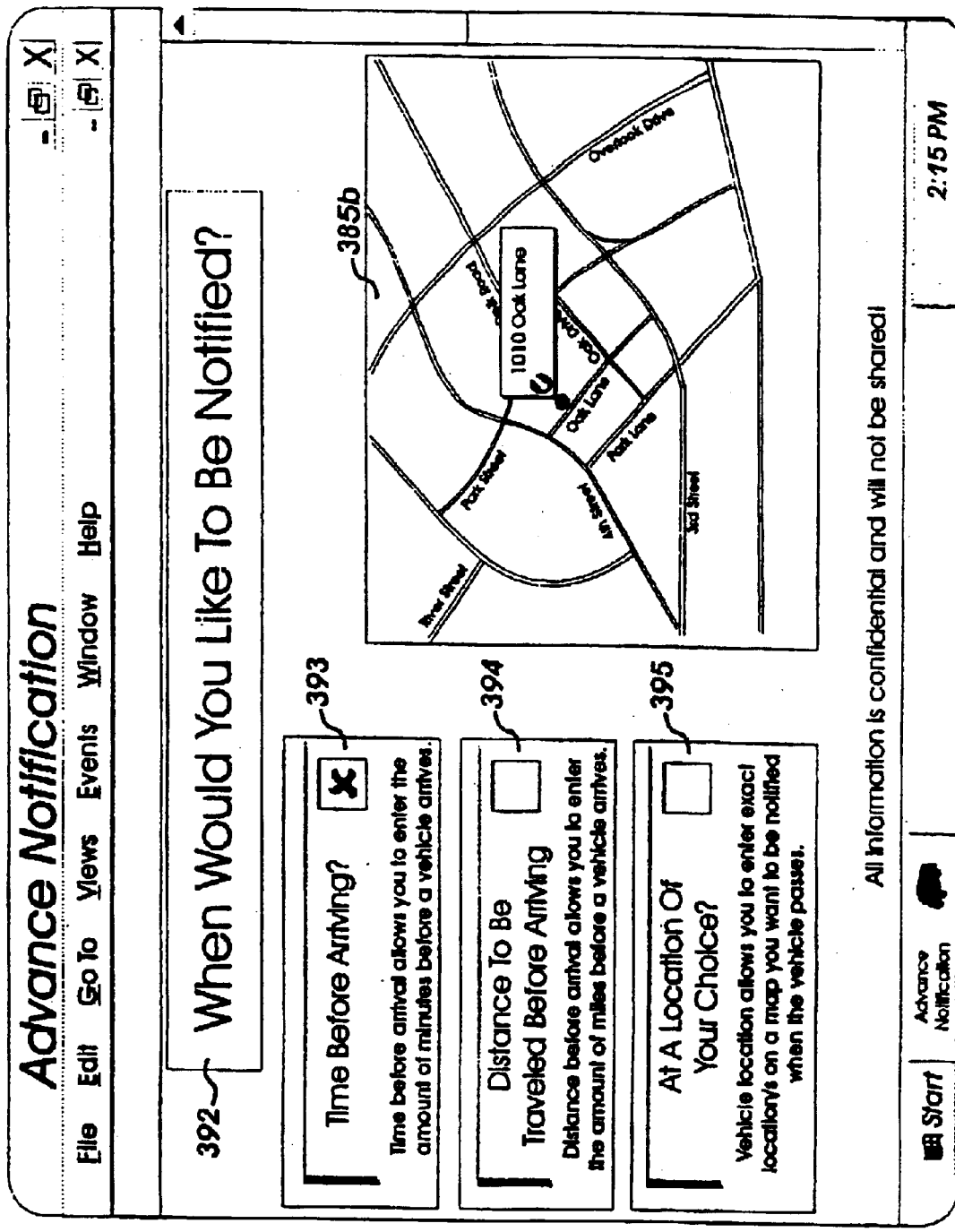
Figure 34:
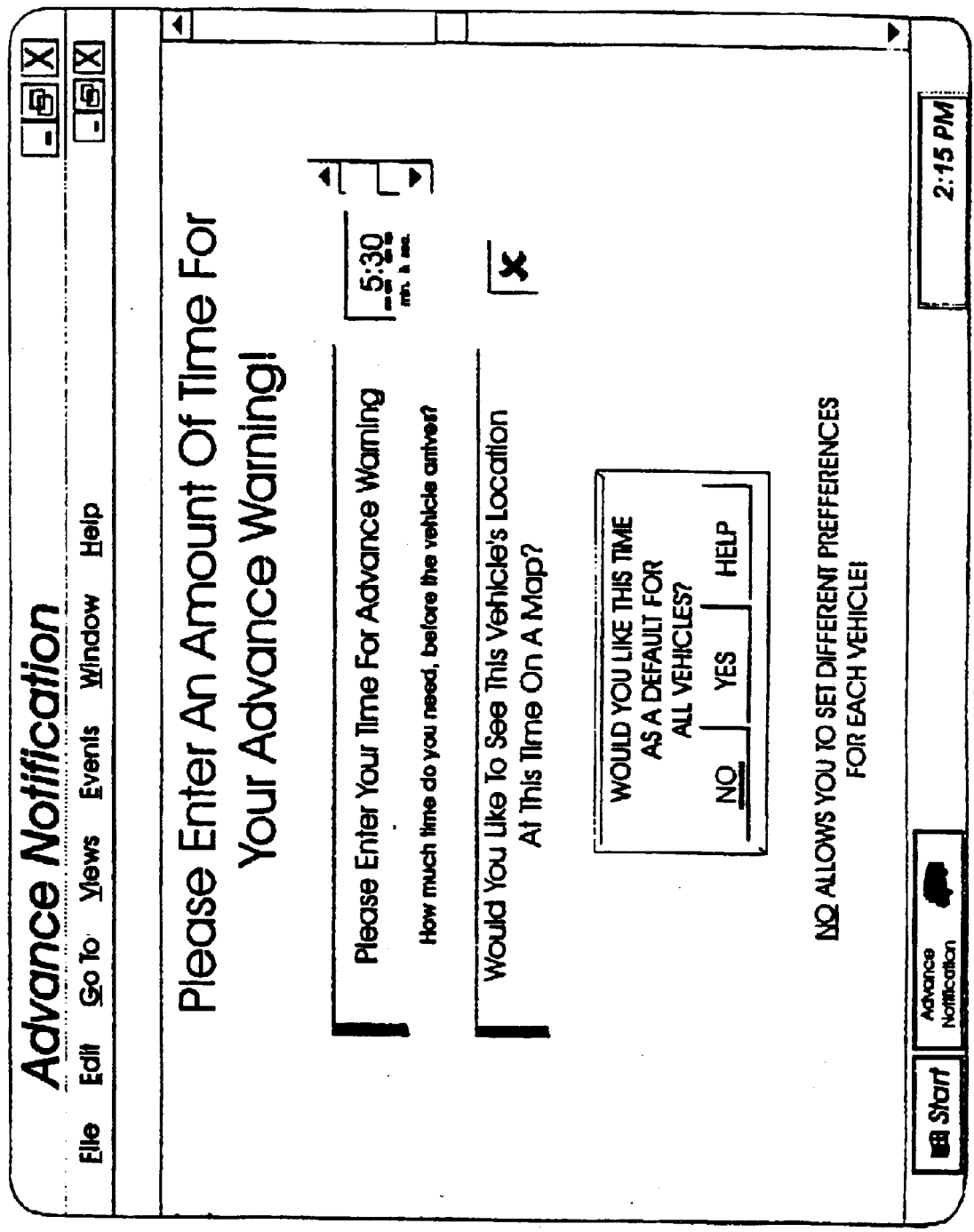
Figure 36:
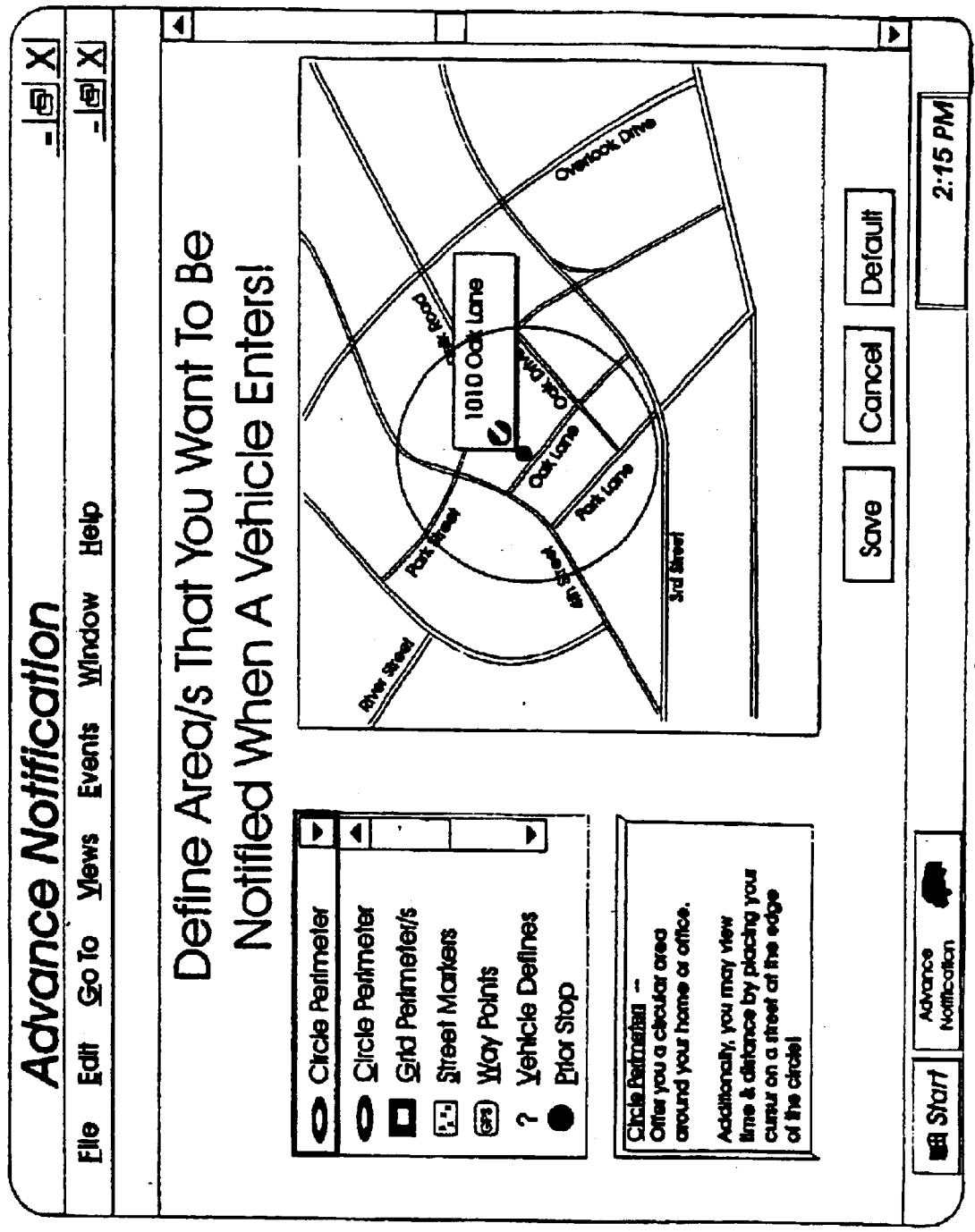
Figure 37:
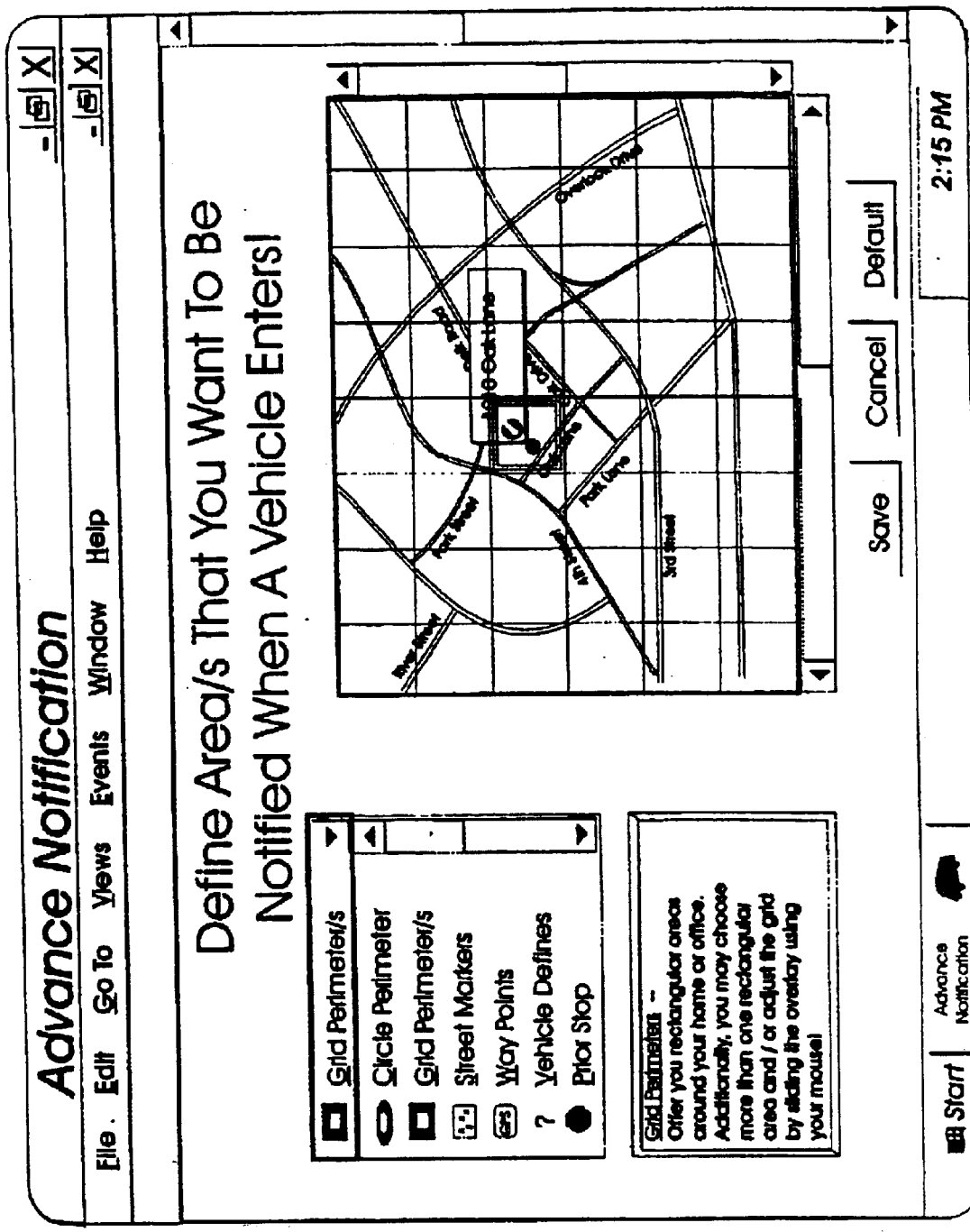
Figure 38:
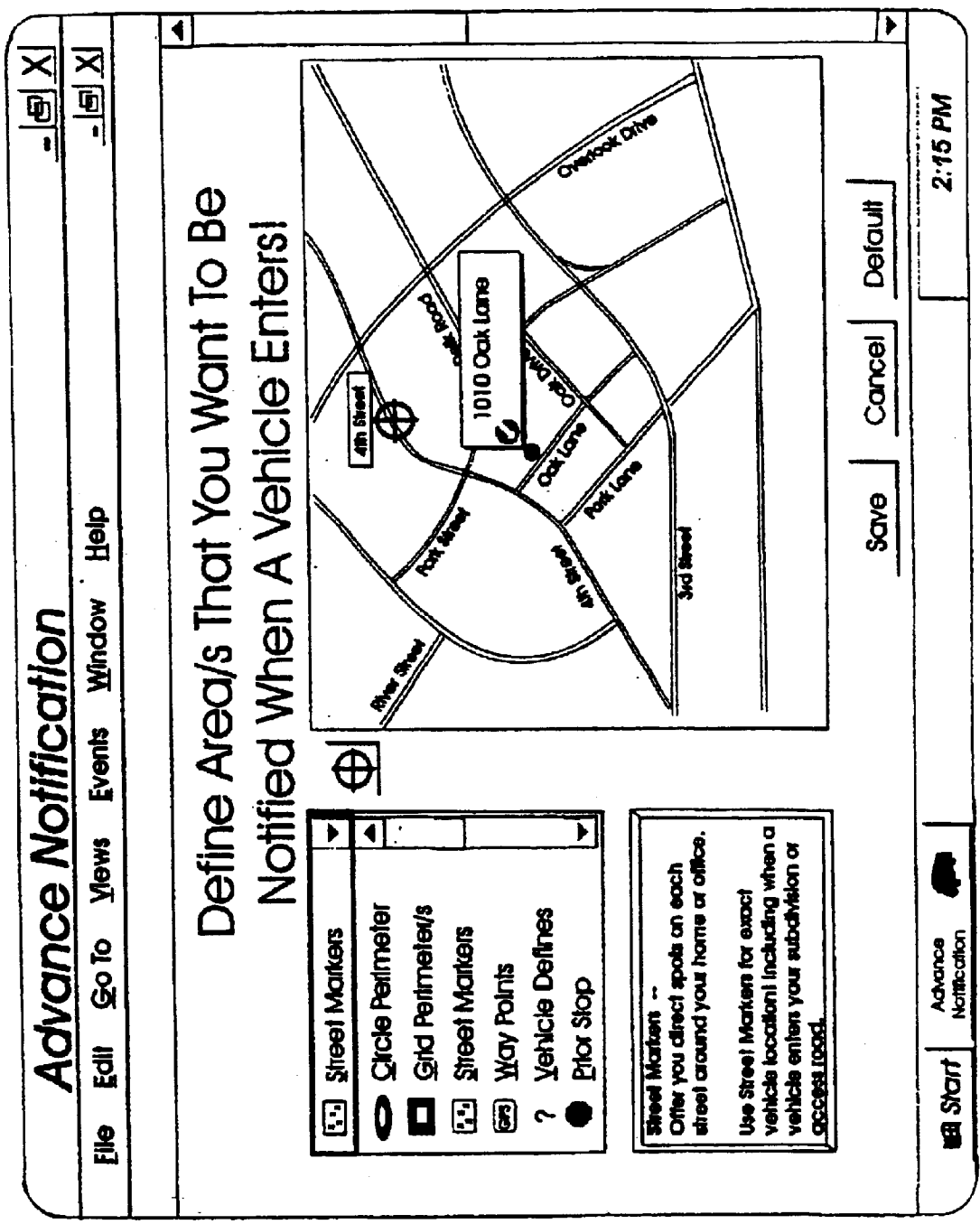
Figure 39:
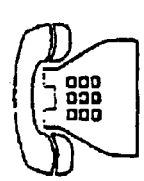

The methods used for signing up and providing the system with messaging preferences is accomplished with software on a person's computer or in the preferred embodiment, linked to a remote computer site FIG. 29. By linking to the site a person wanting to sign up may download software 380 (FIG. 29) to save online time, or sign up from a connection to a remote site 381. The user can only subscribe and make changes from the site to be notified 382, FIG. 30, and the computer address is given before this screen (not shown). This allows the advance notification system to have a level of security. The person is prompted to enter a telephone number 383, then a mailing address 384. This information is stored and compared to mapping software for placing the person's address on a map for display 385b, FIG. 31. After the information is displayed 385b, the user is prompted to agree with the location or choose the next one from a list 386, until their location on a map is agreed upon. The next area allows the user to select different activation and messaging methods for different vehicles 387, FIG. 32. When the same for vehicles in a particular category 389, or each vehicle is different 390, display screens shown as illustrations in FIG. 33 through FIG. 39 are looped for each vehicle/group selected. The next screen prompt asks, "when you would like to be notified?" 392 (FIG. 33) and options for time before arriving 393, distance before arriving 394, or at a location/s of choice 395. When a person entering time before vehicle arrives for notification, the next screen (FIG. 34) allows the minutes and seconds before a stop to be selected. When a person enters distance before a vehicle arrives for an impending arrival message (FIG. 35), the distance can be selected as shown. When a person selects to define a particular area for impending arrival activation, the person can choose a circle around their home/business, as shown in FIG. 36. The circle can be adjusted by pulling the edge with a computer mouse left button held down and releasing when the circle is at a desired size. The activation points are the edges of the circle and/or areas with streets. The next option for selecting an area is the grid perimeter/s (FIG. 37). The actual squares (or other shapes) can be clicked with the left button on a mouse for highlighting areas and adjusting the highlighted areas with the slide bars at the bottom or right for precise positioning for activating impending arrival messages. The next option is placing street markers (FIG. 38) on roads and highways for activation points for impending arrival messaging. The street markers are positioned with a computer's mouse, normal drag and drop operations onto actual areas. Additionally, other areas, such as waypoint/s (longitude/latitude areas), prior vehicle stop/s, letting the vehicle define customer offering services, etc. can be used as well. After defining the locations, the selected preferences are referenced with past route data, mapping software, and other information for placing notification areas in a data base, to be used when a vehicle is approaching this predefined stop. Next the person wanting impending arrival messages should enter how they would like to receive the message/s (FIG. 39). A person may select a telephone call with a voice message 170, a telephone call with a distinctive ringing sound 171, and/or over a computer network/internet 172, with additional software for on screen displays 173 and/or audio messages 174. Additionally worth noting, sending impending arrival messages to other communication devices 36x (FIG. 2) with addresses or activation numbers from the BSCU would be obvious in the scope of this invention and is therefore not discussed in detail, but would be included in the area of FIG. 39.

Figure 4:
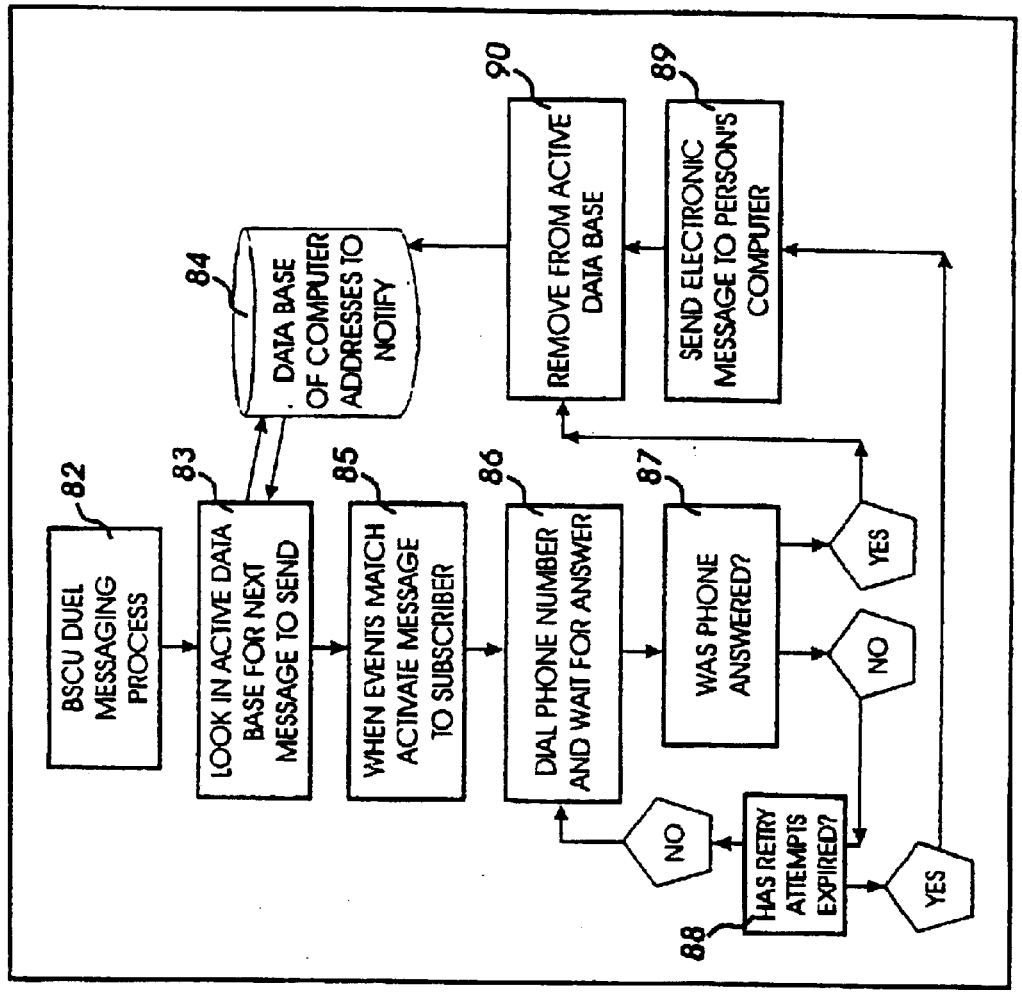
FIG. 4 is a high level flow chart diagram for determining when to use a second method of sending an impending arrival message to a person. This diagram shows how a telephone call can be activated first and if unsuccessful, determined by the retry attempts in this diagram, secondly sends a computer message. Asking an individual receiving an electronic message to respond could reverse this and if no response was received back, a telephone call to the person would be made. Also worth noting, the messaging method to an individual could always be one, both, or others.
Figure 5:
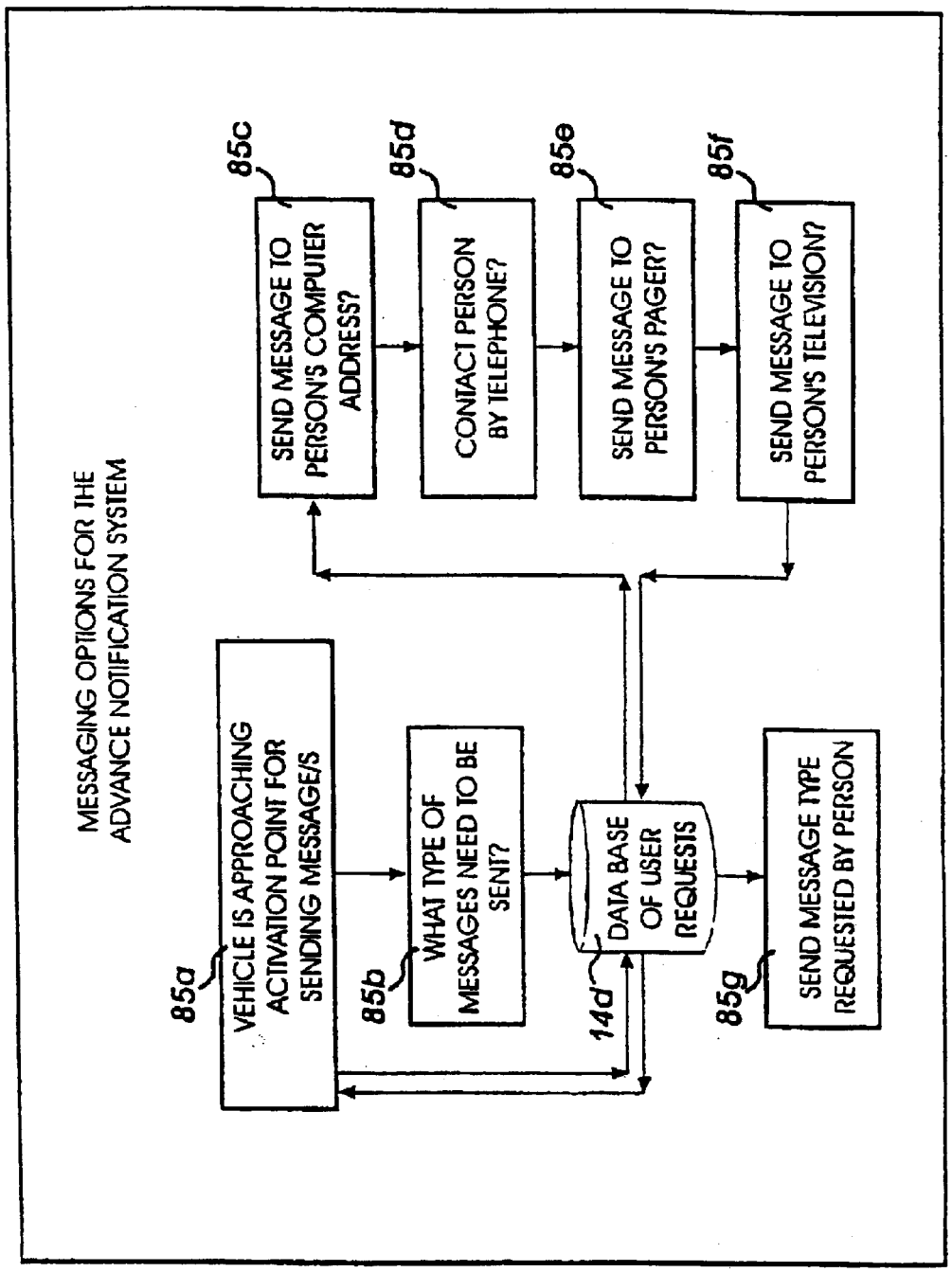
FIG. 5 is a high level flow chart diagram of different messaging options. While one method is suitable for some people, two or more different type messaging methods are more likely to be effective for others. The diagrams show the options for receiving impending arrival messages as a message to a computer address, a telephone call with a message (if answered), a message on a pager, and a message to a person's television address.
Figure 6:
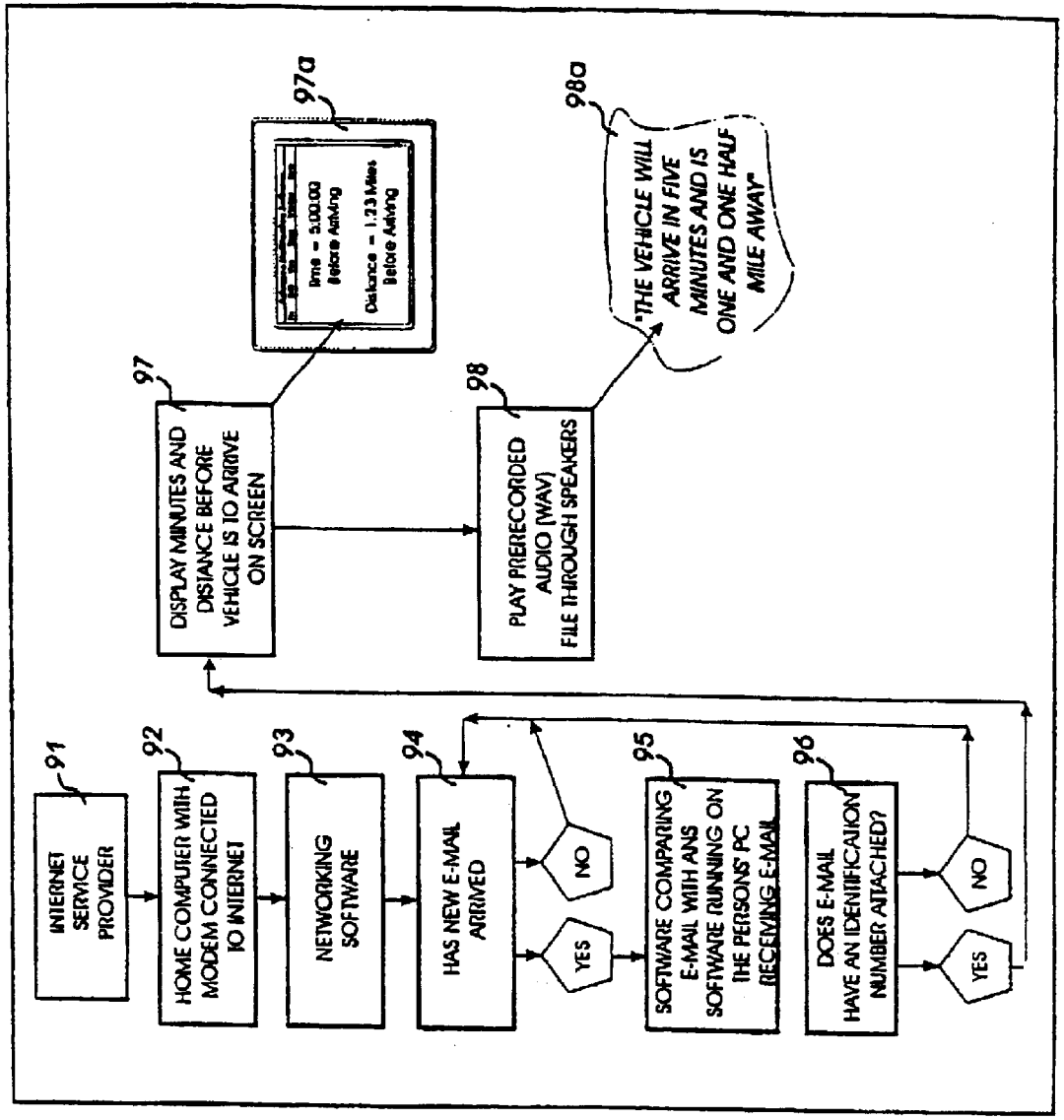
FIG. 6 is a high level flow chart diagram for activating an impending arrival message when electronic mail (E-Mail) is received on a person's computer or at a person's computer address. An impending arrival message in the form of an electronic message or more commonly known as E-Mail, activates additional software, setup with user preferences, for tailored audio announcements and video displays.

The computer address/electronic address number corresponding with the user computer at a particular stop is obtained from the data, as indicated above in FIG. 29 through FIG. 39. Other information can also be obtained, including the ability to send one type of message (telephone, electronic mail, personal pager, television, etc.) over the other, and allowing different vehicles to activate impending arrival messages differently. For example FIG. 4 illustrates a flow chart 82 for activating a telephone call first when a vehicle is approaching 83. First the vehicle's location matches 85 the preferences in the user data base 84 and dials a phone number, if the phone is answered the message is played and additional messages are not sent. In the case where the phone is not answered after a preset number of retries expire 88, then an electronic message is sent 89, and the event is removed from the data base 90. It should be noted that different combinations of messages are obvious to a person experienced in the art without loosing the scope of the present invention, and are therefore not mentioned in greater detail.

Moreover, companies may include the service without acknowledgment of the end user or in some cases notify them on one occasion and offer the service if they respond to the message. In these cases finding the contact information can be achieved by existing and known industry standards for finding computer addresses with telephone numbers and shipping address. Additional resources for obtaining this information are established by (a) a user providing the information to a delivery company, and (b) a user posting this information in an advance notification computer site, and (c) a user listing this information with other published references, such as a telephone book, mapping software, etc. This information may be accessed when a delivery is scheduled. Next, the control process sets a time-out variable for keeping track of successful messages sent and any messages returned from wrong addresses or busy networks. The number n of allowable attempts is predetermined and is stored in the user preferences data base and the person's old address can activate an automatic update for a new telephone number or computer address, when needed.

Furthermore, message timing and activation of impending arrival messages to users can be set at the start of the route or day, or in some cases the day/s before the vehicle is to arrive. By sending impending arrival messages early, users can rearrange their schedules for meeting a delivery vehicle/driver when he arrives. As an example, a person taking a lunch break or leaving a delivery area, will know of particular deliveries scheduled in a certain day and the impending arrival time/s.

Worth noting, actual pictures or live video taken from a vehicle could be sent to the BSCU 14 from the VCU 12 and then used as part of the messaging process of the impending arrival of a particular vehicle to a user. As wireless channels become capable of carrying more and more data (by increased band width and data compression routines), increased information taken from the vehicle can be utilized in the message of the impending arrival of a vehicle to the user.

In the claims hereafter, all "means" and "logic" elements are intended to include any structure, material, or design for accomplishing the functionality recited in connection with the corresponding element.

At least the following is claimed:

1. A method comprising the steps of:
   permitting a user to define a plurality of different predetermined proximities corresponding respectively with a plurality of different mobile vehicles in relation to a location;
   monitoring travel data associated with the plurality of mobile vehicles;
   providing one or more communications to the user based upon the different predetermined proximities associated with the vehicles.

2. The method of claim 1, wherein at least one of the predetermined proximities is a distance between the vehicle and the location.

3. The method of claim 1, wherein at least one of the predetermined proximities is a time period corresponding to the time it will take the vehicle to reach the location.

4. The method of claim 1, wherein at least one of the predetermined proximities is a time of day corresponding to the time it will take the vehicle to reach the location.

5. The method of claim 1, wherein at least one of the predetermined proximities is a geographical vicinity about the location.

6. The method of claim 1, wherein the vehicle travels a predetermined route having the location as a stop along the route and wherein at least one of the predetermined proximities is a particular location prior to the location.

7. The method of claim 1, further comprising the steps of:
   establishing a first communication link between the user and a computer system; and
   performing the permitting step during the first communication link in order to define the plurality of different predetermined proximities corresponding respectively with the plurality of different mobile vehicles in relation to the location.

8. The method of claim 7, further comprising the step of:
   performing the monitoring and providing steps with the computer system.

9. The method of claim 8, further comprising the steps of:
   establishing a second communications link between the computer system and the user;
   during the second communications link, providing a first notification to the user relating to status of a first one of the vehicles;
   establishing a third communications link between the computer system and the user; and
   during the third communications link, providing a second notification to the user relating to status of a second one of the vehicles.

10. The method of claim 9, further comprising the steps of:
    providing a first message from the computer system to the user regarding status of the first one of the vehicles during the second communications link; and
    providing a second message from the computer system to the user regarding status of the second one of the vehicles during the third communications link.

11. The method of claim 7, wherein the computer system is a distributed architecture comprising a plurality of computers that are communicatively coupled.

12. The method of claim 1, further comprising the step of providing at least one of the communications over the Internet.

13. The method of claim 1, wherein the permitting step comprises providing a web page over the Internet via a web server.

14. A notification system comprising:
    means for permitting a user to define a plurality of different predetermined proximities corresponding respectively with a plurality of mobile vehicles in relation to a location;
    means for monitoring travel data associated with the plurality of mobile vehicles;
    means for providing one or more communications to the user based upon the proximities of the vehicles.

15. The system of claim 14, wherein at least one of the predetermined proximities is a distance between the vehicle and the location.

16. The system of claim 14, wherein at least one of the predetermined proximities is a time period corresponding to the time it will take the vehicle to reach the location.

17. The system of claim 14, wherein at least one of the predetermined proximities is a geographical vicinity about the location.

18. The system of claim 14, wherein the vehicle travels a predetermined route having the location as a stop along the route and wherein at least one of the predetermined proximities is a stop location prior to the location.

19. The system of claim 14, further comprising:
    means for establishing a first communication link between the user and a computer system; and
    where the means for permitting enables the user to define the plurality of different predetermined proximities corresponding respectively with the plurality of different mobile vehicles in relation to the location during the first communication link.

20. The system of claim 19, wherein the monitoring and providing means are implemented with the computer system.

21. The system of claim 20, further comprising:
    means for establishing a second communications link between the computer system and the user;
    means for, during the second communications link, providing a first notification to the user relating to status of a first one of the vehicles;
    means for establishing a third communications link between the computer system and the user; and
    means for, during the third communications link, providing a second notification to the user relating to status of a second one of the vehicles.

22. The system of claim 21, further comprising:
- means for providing a first message from the computer system to the user regarding status of the first one of the vehicles during the second communications link; and
- means for providing a second message from the computer system to the user regarding status of the second one of the vehicles during the third communications link.

23. The system of claim 20, wherein the computer system is a single computer or comprises a distributed architecture comprising a plurality of computers that are communicatively coupled.

24. The system of claim 19, wherein at least a part of the first communications link is over the Internet.

25. The system of claim 19, wherein said means for permitting comprises a web server for providing a web page.

26. A method for implementation by a computer system having one or more computers that are communicatively coupled, comprising:
- permitting a user to establish a first communications link between the user and the computer system;
- during the first communication, permitting a user to define a plurality of different predetermined proximities corresponding respectively with a plurality of different mobile vehicles in relation to a location;
- monitoring travel data associated with the plurality of mobile vehicles;
- initiating a first notification communication based upon a first user-defined proximity and a first one of the vehicles; and
- initiating a second notification communication based upon a second user-defined proximity and a second one of the vehicles, the second user-defined proximity being different than the first user-defined proximity.

27. The method of claim 26, wherein at least one of the predetermined proximities is as follows: a distance between the vehicle and the location, a time period corresponding to the time it will take the vehicle to reach the location, a time of day corresponding to the time it will take the vehicle to reach the location, a geographical vicinity about the location, or a particular location along a route that is prior to the location.

28. The method of claim 26, further comprising the steps of:
- providing a first message from the computer system to the user regarding status of the first one of the vehicles during the second communications link; and
- providing a second message from the computer system to the user regarding status of the second one of the vehicles during the third communications link.

29. The method of claim 26, further comprising the step of initiating at least one of the first and second communications over the Internet.

30. The method of claim 26, wherein the permitting step comprises providing a web page over the Internet via a web server.

31. The method of claims 26, wherein at least one of the first and second notification communications is directed to a remote general-purpose computer-based communications device that is designed to communicate with other communications devices that are undedicated to the computer system.

32. The method of claim 26, wherein the travel data is timing information, distance information, or location information.

* * * * *